(12) United States Patent
Baba et al.

(10) Patent No.: US 11,067,746 B2
(45) Date of Patent: Jul. 20, 2021

(54) LIGHT DEFLECTION DEVICE

(71) Applicant: National University Corporation Yokohama National University, Yokohama (JP)

(72) Inventors: Toshihiko Baba, Yokohama (JP); Moe Takeuchi, Kawasaki (JP); Hiroyuki Ito, Yokohama (JP); Yuma Kusunoki, Yokohama (JP)

(73) Assignee: NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 16/641,217

(22) PCT Filed: Aug. 22, 2018

(86) PCT No.: PCT/JP2018/031052
§ 371 (c)(1),
(2) Date: Feb. 21, 2020

(87) PCT Pub. No.: WO2019/039526
PCT Pub. Date: Feb. 28, 2019

(65) Prior Publication Data
US 2020/0225411 A1    Jul. 16, 2020

(30) Foreign Application Priority Data
Aug. 24, 2017    (JP) .............................. JP2017-160825

(51) Int. Cl.
*G02B 6/12*    (2006.01)
*G02B 6/10*    (2006.01)
*G02F 1/29*    (2006.01)

(52) U.S. Cl.
CPC ................. *G02B 6/10* (2013.01); *G02F 1/29* (2013.01)

(58) Field of Classification Search
CPC .. G02B 6/10; G02B 6/12; G02B 6/122; G02F 1/29
See application file for complete search history.

(56) References Cited

U.S. PATENT DOCUMENTS 7,630,604 B2 * 12/2009 Waks ...................... G02F 1/365
372/97
9,798,083 B2 * 10/2017 Mahmoodian ......... G02B 6/305
(Continued)

FOREIGN PATENT DOCUMENTS

JP    2001272555 A    10/2001
JP    2004294517 A    10/2004
(Continued)

OTHER PUBLICATIONS

ISA Japanese Patent Office, International Search Report Issued in Application No. PCT/JP2018/031052, dated Sep. 18, 2018, WIPO, 4 pages.

*Primary Examiner* — Jennifer Doan
(74) *Attorney, Agent, or Firm* — McCoy Russell LLP

(57) ABSTRACT

In a light deflection device, the radiation efficiency of radiated light beams is to be improved. The light deflection device is configured by a photonic crystal waveguide having a lattice array with low refractive index parts periodically arrayed in a surface of a high refractive-index member. The lattice array has a dual-periodic structure consisting of a first periodic array and a second periodic array which differ from each other in periodic arrangement of the low refractive index parts. A line defect where no low refractive index parts are arrayed constitutes a waveguide core for propagating incident light. The cross section of at least either the first periodic array or the second periodic array constituting the periodic arrays of the dual-periodic structure is asymmetrical in the thickness direction of the low refractive index parts.

9 Claims, 65 Drawing Sheets

(56) References Cited

U.S. PATENT DOCUMENTS

| | | |
|---|---|---|
| 2002/0009277 A1 | 1/2002 | Noda et al. |
| 2008/0002931 A1 | 1/2008 | Noda et al. |
| 2015/0086219 A1* | 3/2015 | Li .................... G02F 1/2257 398/200 |
| 2019/0033522 A1 | 1/2019 | Baba et al. |

FOREIGN PATENT DOCUMENTS

| | | |
|---|---|---|
| JP | 2006079706 A | 3/2006 |
| JP | 2006184618 A | 7/2006 |
| JP | 2008511861 A | 4/2008 |
| JP | 2008310065 A | 12/2008 |
| WO | 2003081303 A1 | 10/2003 |
| WO | 2006026001 A1 | 3/2006 |
| WO | 2017126386 A1 | 7/2017 |

* cited by examiner

PARTIAL V-SHAPE TYPE

GRADATION V-SHAPE TYPE

INVERTED GRADATION V-SHAPE TYPE

V-SHAPE/INVERTED V-SHAPE MIXED TYPE

TRANSVERSE DUAL PERIODIC TYPE (a) 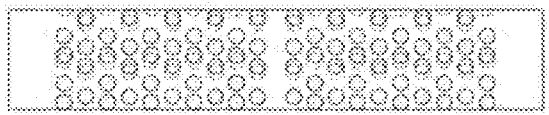 (b) 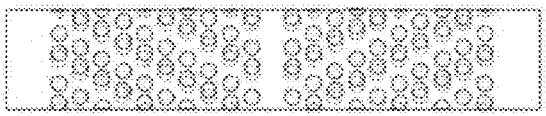
STRUCTURE OF DUAL PERIODICITY IMPLEMENTED ON ENTIRE SURFACE
(c) 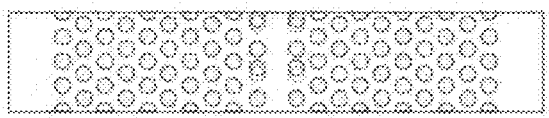 (d) 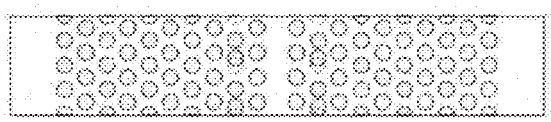
STRUCTURE OF DUAL PERIODICITY IMPLEMENTED ON PARTICULAR LATTICE ROW
(e) 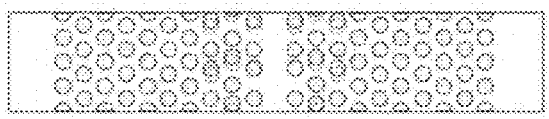 (f) 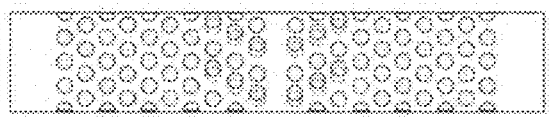
STRUCTURE OF DUAL PERIODICITY IMPLEMENTED ON MULTIPLE LATTICE ROWS
(g) 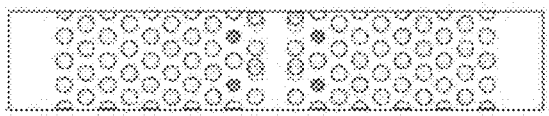 (h) 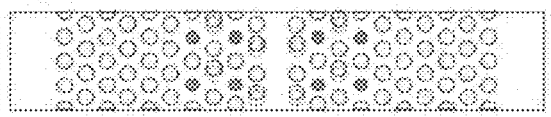
STRUCTURE OF DUAL PERIODICITY IMPLEMENTED ON
BOTH GRATING PITCH AND CIRCULAR HOLE DIAMETER
Fig. 3

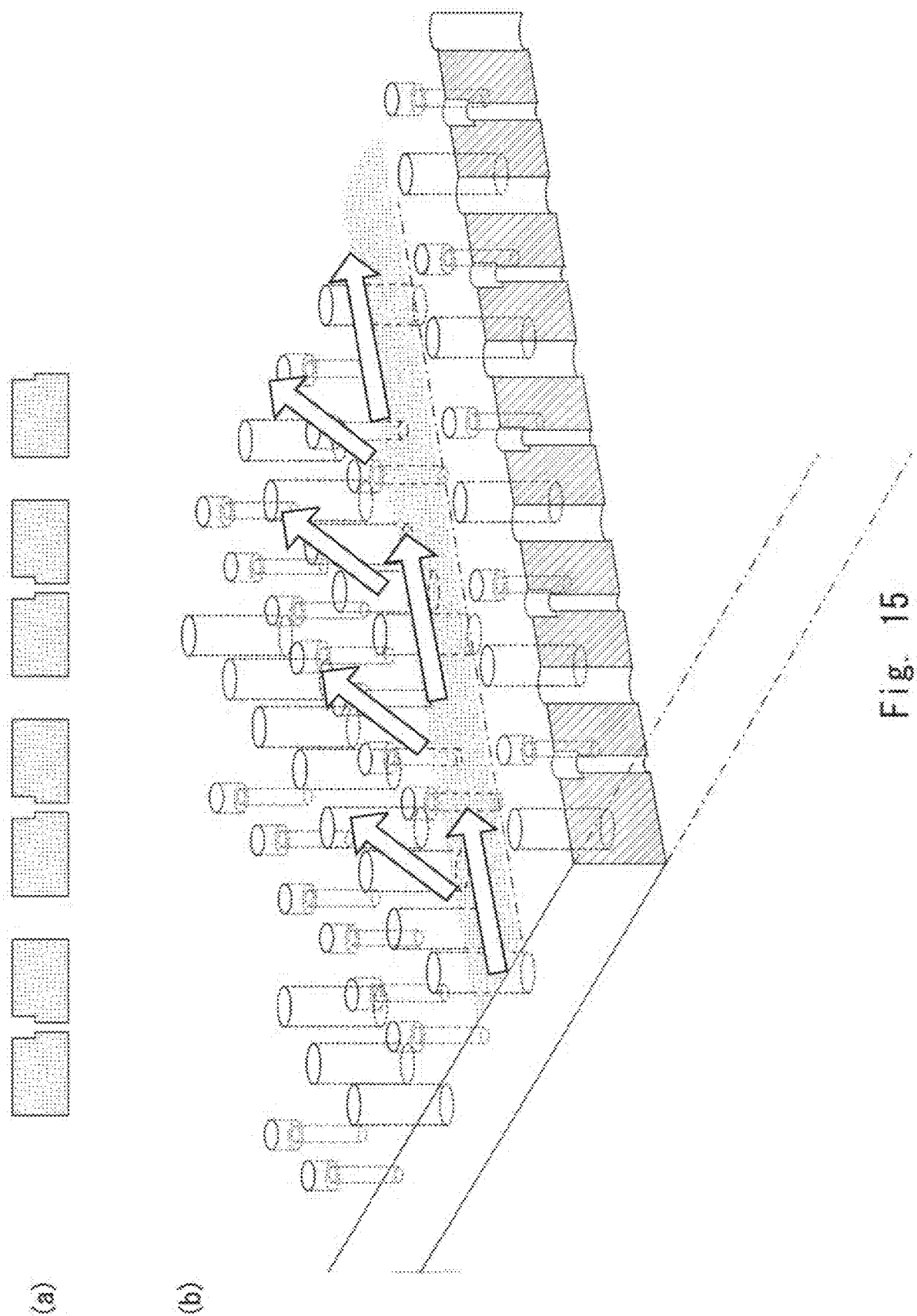

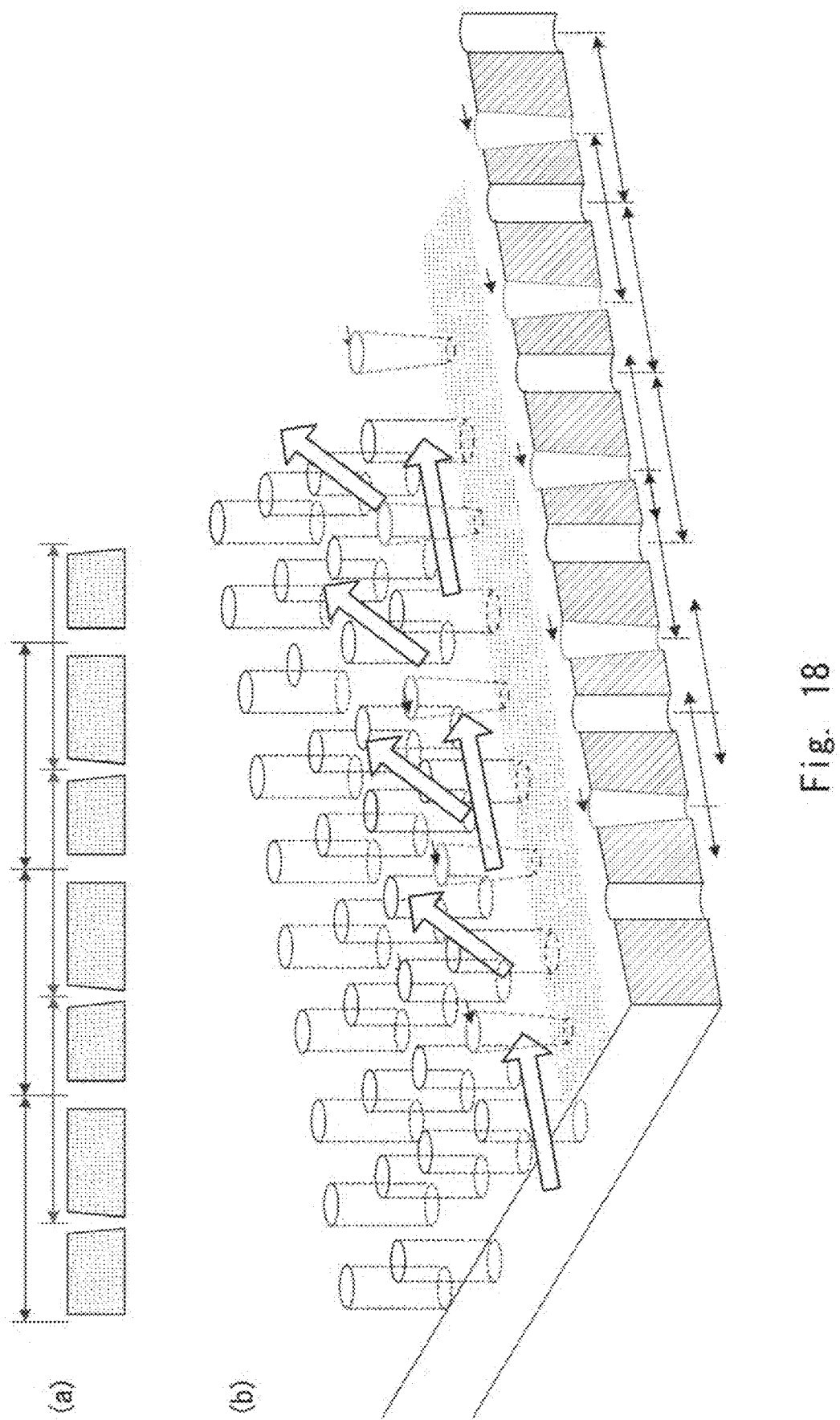

Fig. 25
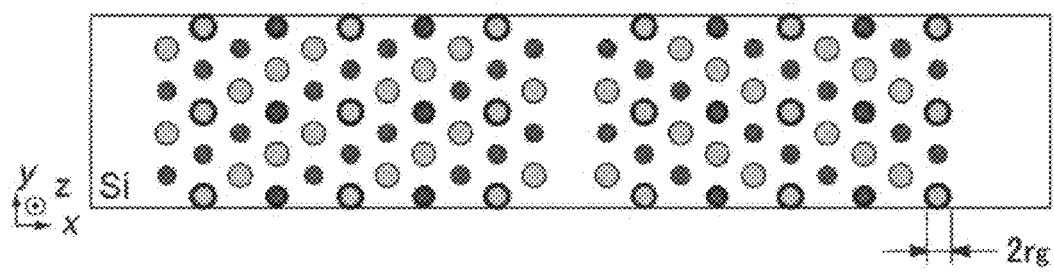
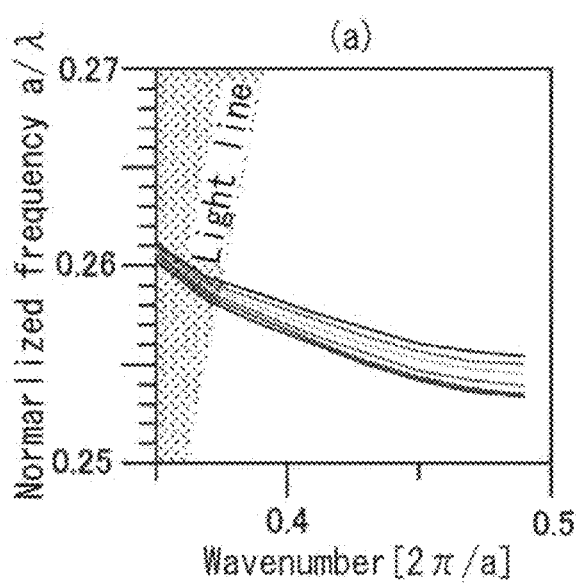
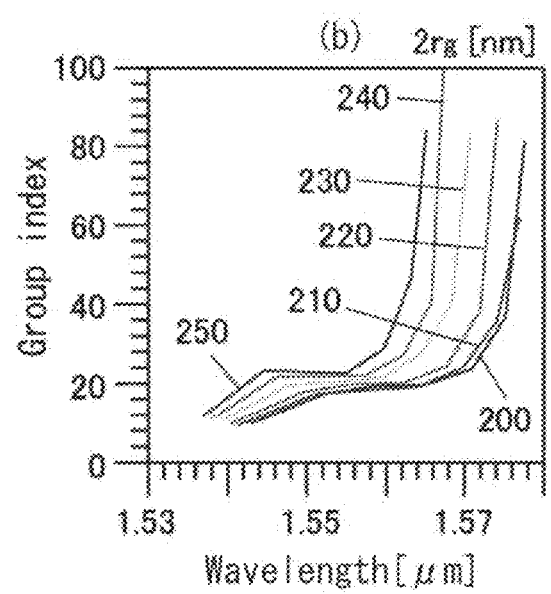
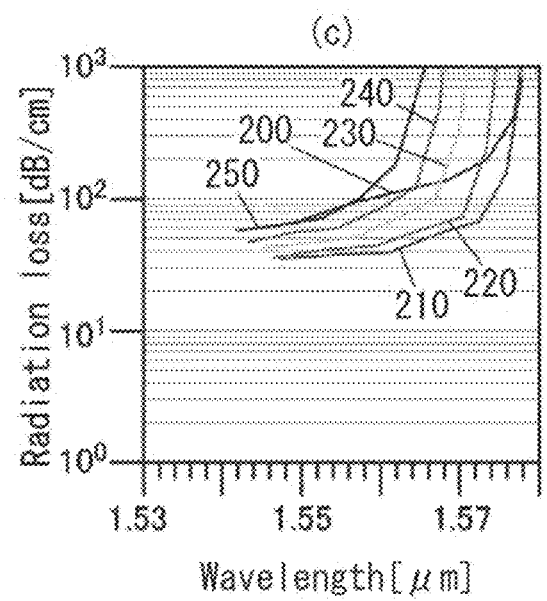
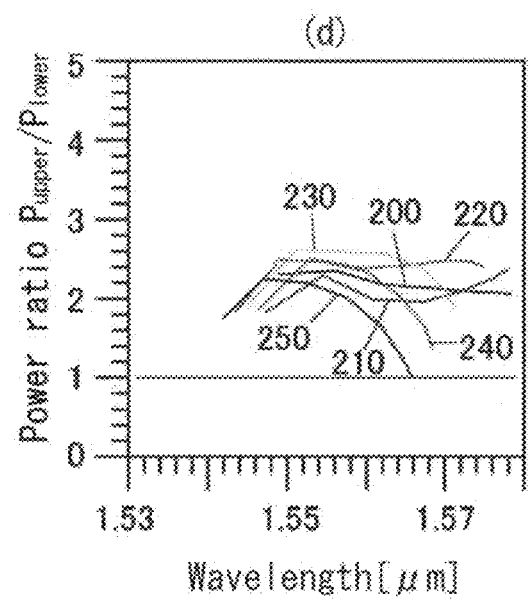

Fig. 27
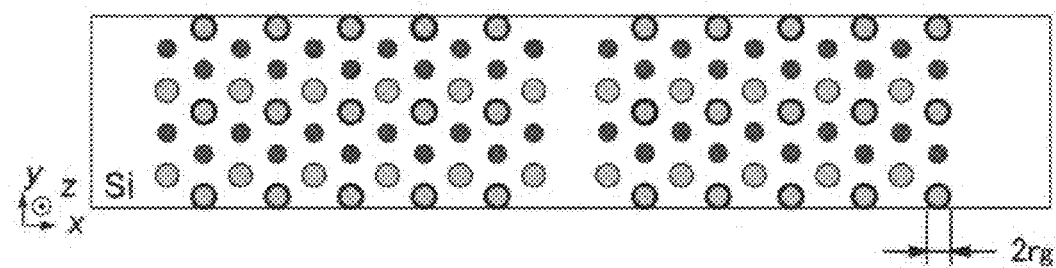
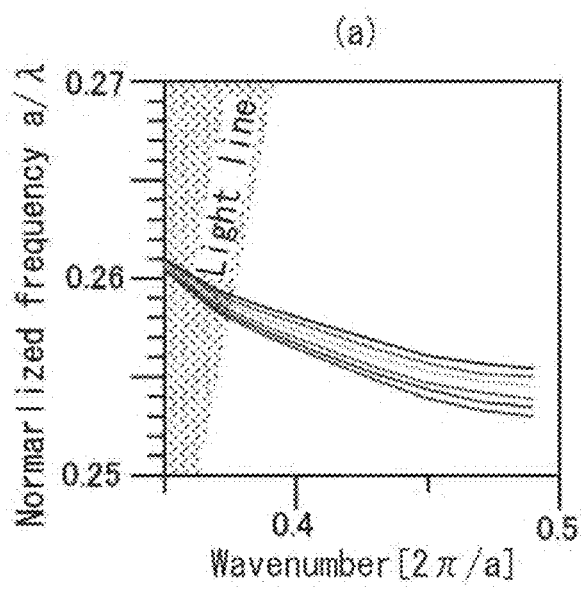
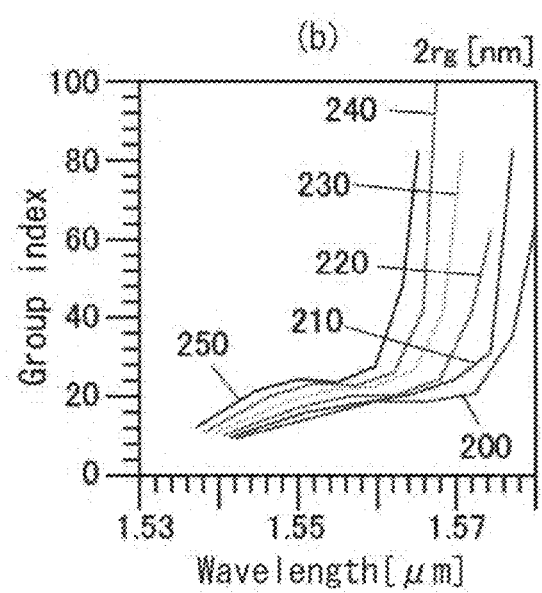
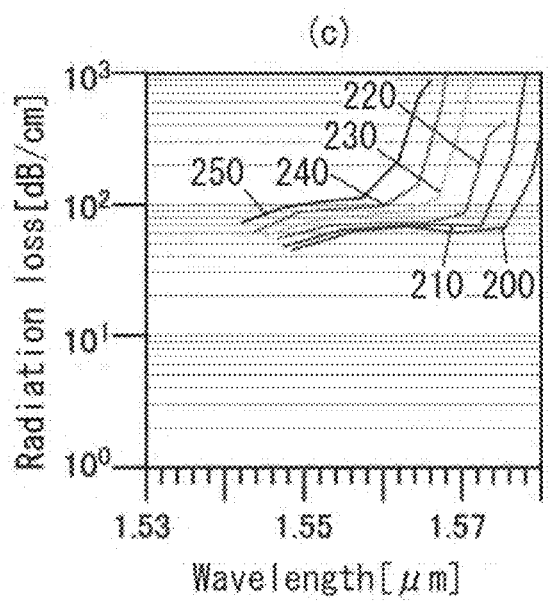
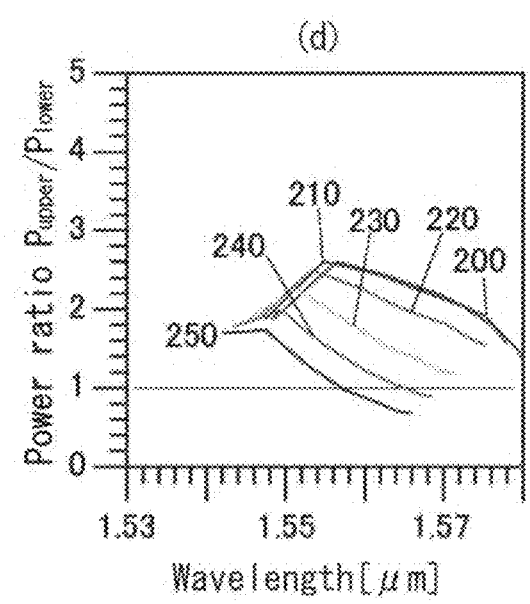

RADIATING LIGHT FROM UP-AND-DOWN SYMMETRICAL STRUCTURE

INTRODUCING LIGHT FROM ABOVE INTO UP-AND-DOWN SYMMETRICAL STRUCTURE

LIGHT DEFLECTION DEVICE

CROSS-REFERENCE TO RELATED APPLICATIONS

The present application is a U.S. National Phase of International Patent Application Serial No. PCT/JP2018/031052 entitled "LIGHT DEFLECTION DEVICE", filed on Aug. 22, 2018. International Patent Application Serial No. PCT/JP2018/031052 claims priority to Japanese Patent Application No. 2017-160825 filed on Aug. 24, 2017. The entire contents of each of the above-referenced applications are hereby incorporated by reference for all purposes.

TECHNICAL FIELD

The present invention relates to a light deflecting device that controls a traveling direction of light.

BACKGROUND ART

In the field of a laser radar or LiDAR (Light Detection and Ranging, Laser Imaging Detection and Ranging) device using laser measurement that acquires the distance to any surrounding object as a two-dimensional image, such devices are used in automatic driving of automobiles, creation of three-dimensional maps, etc., and the basic technologies thereof can also be implemented on laser printers, laser displays, laser processing machines, etc.

In this technical field, a light beam is applied to an object, the reflected light reflected from the object is detected, information on the distance is obtained from the time difference and frequency difference thereof, and the light beam is scanned two-dimensionally so as to obtain wide-angle three-dimensional information.

A light deflection device is essential in light beam scanning. Traditionally used are mechanical mechanisms such as rotation of the entire device, mechanical mirrors such as polygonal mirrors (polygon mirrors) and galvanometer mirrors, and small integrated mirrors using micro machine technology (microelectromechanical system (MEMS) technology). Meanwhile, these mechanisms have problems associated with their large sizes, increased costs, and instability on a moving object that oscillates, in which context, in recent years, researches have been widely conducted on non-mechanical light deflection devices.

As a non-mechanical light deflecting device, devices of a phased array type or a diffraction grating type that realizes light deflection by changing the wavelength of light or the refractive index of the device has been proposed. However, a phased array type light deflection device has a problem that it is very difficult to adjust the phase of a large number of light radiators arranged in an array and it cannot form high-quality sharp light beams. Meanwhile, a diffraction grating type light deflection device can readily form sharp beams, but has a problem that the optical deflection angle is small.

To address the problem of a small light deflection angle, the inventor of the present invention has proposed a technique of increasing the light deflection angle by coupling a slow light waveguide to a diffraction mechanism such as a diffraction grating (Patent Literature 1). Slow light, which is generated in a photonic nanostructure such as a photonic crystal waveguide, is characterized by the fact that it has a low group velocity and causes significant change in the propagation coefficient due to slight change in the wavelength and the refractive index of the waveguide. When a diffraction mechanism is installed inside or in the vicinity of the slow light waveguide, the slow light waveguide is coupled to the diffraction mechanism and becomes a leaky waveguide, which radiates light to free space. At this point, significant change in the propagation constant affects the deflection angle of the radiated light, as a result of which a large deflection angle is realized.

FIG. 36A illustrates a device structure in which a diffraction mechanism is introduced into a photonic crystal waveguide that propagates light (slow light) having a low group velocity, and an outline of a radiated light beam that is radiated from the device structure. The diffraction mechanism is configured, for example, by a dual periodic structure of a circular hole pattern according to which circular holes of two types having different diameters are alternately repeatedly arranged in the surface of the photonic crystal along the waveguide, or a dual periodic structure of a circular hole pattern according to which circular holes having long and short grating pitches are alternately repeatedly arranged with two periods in the surface of the photonic crystal along the waveguide, where the incident light is incident on the slow light waveguide and the propagated light of the slow light is converted so that it satisfies a radiation condition and thus radiated into space as a radiated light beam.

FIG. 36B is a diagram for explanation of the beam intensity distribution of the radiated light beam, FIG. 36B shows the beam intensity distribution in the length direction, where the beam intensity distribution in the length direction reflects uniform sharp beams as the radiated light beams gradually leak along the waveguide. FIG. 36C shows the beam intensity distribution in the transverse direction, where the beam intensity distribution in the transverse direction exhibits a wide angle distribution.

CITATION LIST

Patent Literature

Patent Literature 1: International Patent Application No. WO 2017/126386
Patent Literature 2: Japanese Unexamined Patent Application Publication No. 2001-272555
Patent Literature 3: Japanese Unexamined Patent Application Publication No. 2004-294517

SUMMARY OF INVENTION

Technical Problem

Traditionally, analysis of a radiated light beam by a light deflection device is performed based on a situation in which light is radiated upward from a photonic crystal waveguide as depicted in FIG. 36A. However, the above-described photonic crystal waveguide has a symmetric structure that is symmetrical with respect to the thickness direction of the waveguide. Due to the symmetric structure of the photonic crystal waveguide, even when the side of the waveguide from which the radiated light beam to be used by the light deflection device is radiated is defined as an upward orientation, radiation of light occur in a up-and-down symmetrical manner with respect to the photonic crystal.

FIGS. 37A to 37E illustrate an example of a dual periodic structure of a circular hole pattern configured by, in a traditional photonic crystal waveguide which is symmetrical with reference to a thickness direction of a waveguide, arranging large-diameter holes and small-diameter holes which differ from each other in diameter in a V-shape. FIG. 37E illustrates a cross-sectional shape of a waveguide slab, and is a dual periodic structure in which the diameter of the large-diameter holes is set to 215 nm, the diameter of the small-diameter holes is set to 205 nm and, and the diameter difference $\Delta 2r$ is set to 10 nm. Also, with regard to the cross-sectional shape of them, the side wall is perpendicular and the diameters of the apertures at the upper and lower ends in the thickness direction are identical with each other and the cross-sectional shape is upward- and downward symmetrical in the thickness direction. Also, although not shown in this figure, in the actually manufactured photonic crystal waveguide structure, air exists above an SiO2 cladded material covering the Si slab where the waveguide is formed, and an Si substrate exists below it. In this calculation as well, such air and a substrate are assumed.

FIGS. 37A, 37B, 37C, and 37D illustrate a normalized frequency a/λ, a group refractive index, radiation coefficient (scattering loss), and a ratio of radiation Pupper/Plower, respectively, of the photonic crystal waveguide including the dual periodic structure. FIG. 37D indicates that as the ratio of radiation Pupper/Plower becomes larger than one, the amount of upward radiation becomes larger than the amount of downward radiation and, as the ratio of radiation Pupper/Plower becomes smaller than one, the amount of downward radiation becomes larger than the amount of upper radiation. It should be noted that the ratio of radiation of FIG. 37D is a ratio of the light powers of the transmitted light passing through a clad portions sandwiching the waveguide slab from above and below.

FIG. 37D illustrates the fact that the ratio of radiation Pupper/Plower in the case where the cross-sectional shapes of all the holes are up-and-down symmetrical in the thickness direction is substantially 1 even in a situation where asymmetry due to the presence of the air above the SiO2 cladded material and the substrate below the SiO2 cladded material exists, and this fact implies that light beams of substantially the same amount are emitted upward and downward from the waveguide slab.

FIGS. 38A to 38C is a diagram for explanation of light radiation of photonic crystal waveguide having a up-and-down symmetrical structure. In the above-mentioned FIGS. 36A to 36C, although only the upward light radiation is depicted for simplicity, the light radiated from the waveguide slab of the photonic crystal waveguide having the up-and-down symmetrical structure is actually radiated in the up-and-down direction via the cladded materials laminated on the upper and lower side as depicted in FIGS. 38A to 38C. FIG. 38A schematically illustrates the light radiation of the light radiated upward and downward from the up-and-down symmetrical structure. The light that has been radiated from the waveguide slab of the photonic crystal waveguide having a up-and-down symmetrical structure is radiated not only upward but also downward as the same light beams, so that the half of the radiated light that have been generated will not be utilized.

Also, in the case where this photonic crystal waveguide is used as a light-receiving mechanism, it is not possible to utilize a half of the light being received as depicted in FIG. 38B. The process of receiving reflected light is equivalent to the process of redirecting the radiated light in the opposite direction and, if only the upward light beams are received, there is no light beams that are redirected from below, as a result of which, when the received light is coupled to the waveguide, only the light from above will be coupled to the waveguide while no light from below is coupled thereto. Consequently, only half the amount of light is coupled as compared with the case where both of the upward and downward light beams are to be received. Accordingly, a loss of 3 dB occurs at the time of transmission and at the time of reception, respectively, and a total loss of 6 dB occurs theoretically during transmission and reception.

As described above and as depicted in FIG. 38C, the actual photonic crystal waveguide has a laminated structure in which a cladded material made of SiO2 or the like is provided below a waveguide layer (waveguide slab), and a semiconductor substrate made of Si or the like is provided under the cladded material, so that the light radiated downward from the waveguide slab is partly reflected by the surface of the semiconductor substrate, and merges with the light radiated upward from the waveguide slab, as a result of which the shape of the radiated light beams radiated upward is distorted. For example, even when light beams having monomodality are radiated from the waveguide slab, the reflected light from the surface of the semiconductor substrate merges with them, as a result of which the radiated light beams change into light beams having multimodality with multiple peaks.

In the technical field of light beam scanning, improvement in the use efficiency of the light beams has been sought for. As a result, in the light deflection device, it is required that the radiation efficiency of the radiated light beams, the light reception efficiency of light reception be high and that the beam shape of the radiated light beams be favorable.

Meanwhile, in the photonic crystal waveguide, a configuration is known according to which point-like defects are provided in addition to the linear defect, the cross-sectional shape of these point-like defects are made up-and-down asymmetrical with reference to the slab surface, and thereby the ratio of the amounts of light radiated upward and downward is changed for the radiated light extracted from the linear defect to the point-like defects (Patent Literatures 2 and 3). However, the configuration of Patent Literature 2 is such that the point-like defects are provided independently of the waveguide through the linear defect so as to perform branching and coupling and, the configuration of Patent Literature 3 is directed to improve the efficiency of extraction of light with a particular wavelength. In other words, since these documents are associated with the point-like defects and no mention is made therein to the technical implication associated with improvement in the radiation efficiency of the radiated light beams radiated from the linear defect and the reception efficiency of light reception, improvement in the monomodality of the beam shape of the radiated light beams which are required in the technical field of light beam scanning to which the light deflection device of the present invention pertains.

An object of the present invention is to improve the radiation efficiency of the radiated light beams in a light deflection device.

Solution to Problem

A light deflection device of the present invention is configured by a photonic crystal waveguide having a lattice array with low refractive index parts periodically arranged in a surface of a high refractive-index member. This lattice array includes a dual-periodic structure including a first periodic array and a second periodic array different from each other in periodic arrangement of the low refractive index parts, and a linear defect devoid of the low refractive index parts constitutes a waveguide core that propagates incident light.

The low refractive index parts have an asymmetrical cross-sectional shape with reference to a thickness direction in at least either of the first and second periodic arrays of the dual-periodic structure. By virtue of the asymmetrical cross-sectional shape, the sized on both side in the thickness direction of the low refractive index parts are differentiated from each other and, if the low refractive index parts are circular holes, one side in the thickness direction will have a large diameter and the other side a small diameter.

It should be noted that, in light deflection device, if the side of radiation at which the radiation efficiency of the radiated light beams should be increased is defined as the upper side, then the asymmetrical cross-sectional shape with reference to the thickness direction can be expressed as an up-and-down asymmetrical cross-sectional shape.

The configuration where the cross-sectional shape of the low refractive index parts in the thickness direction is asymmetrical is provided in at least either of the periodic arrays of the dual periodic structure. The periodic array including the asymmetrical cross-sectional shape causes deviation in the radiation efficiency of the radiated light beams radiated from the linear defect of the photonic crystal, increases the radiation efficiency either upward or downward so as to provide unidirectional radiation, by means of which the radiation efficiency of the radiated light beams in one direction is improved. It should be noted here that the unidirectional radiation is not necessarily limited to upward radiation only or downward radiation only, and may encompass such deviation in the radiation efficiency that the radiation efficiency in one direction is higher than the radiation efficiency in other directions.

(A) Modes of the Cross-Sectional Shape

The asymmetrical cross-sectional shape may take multiple forms. The side wall defining the asymmetrical cross-sectional shape may take multiple forms in relation to the wall shape such as a mode (Aa) where the side wall is an inclined wall that is inclined with reference to the thickness direction; a mode (Ab) in which the side wall is a stepped wall defined by at least two walls selected from an inclined wall, a perpendicular wall, and a horizontal wall.

(Aa) According to the mode of the cross-sectional shape of the inclined wall, the wall surface between one end and the other end is defined as a sloping surface in the thickness direction of the low refractive index parts. At this point, the cross-sectional shape of the low refractive index parts will take a trapezoidal shape.

(Ab1) According to the first mode of the cross-sectional shape of the stepped wall, the wall surface between one end and the other end is defined by a sloping surface and a perpendicular surface in the thickness direction of the low refractive index parts, and the sloping surface and the perpendicular surface are coupled and thus a stepped cross section is defined.

(Ab2) According to the second mode of the cross-sectional shape of the stepped wall, the wall surface between one end and the other end in the thickness direction of the low refractive index parts is defined by two perpendicular surfaces and one horizontal surface. The diameters of the openings of the two perpendicular surface differ from each other and these two perpendicular surfaces are coupled via the horizontal surface and thus the stepped cross section is defined.

(Ab3) According to the third mode of the cross-sectional shape of the stepped wall, the wall surface between one end and the other end in the thickness direction of the low refractive index parts is defined by a sloping surface, a perpendicular surface, and a horizontal surface. The sloping surface and the perpendicular surface are coupled via the horizontal surface and thus a stepped cross section is defined.

(Ab4) According to the fourth mode of the cross-sectional shape of the stepped wall, the wall surface between one end and the other end in the thickness direction of the low refractive index parts is defined by two sloping surfaces and one horizontal surface. One sloping surface and the other sloping surface are coupled via the horizontal surface and thus a stepped cross section is defined.

In the context of the cross-sectional shape according to the first to third modes of the cross-sectional shape of the stepped wall, the perpendicular wall surface may be configured by the sidewall of cylindrical circular holes, in addition to which the perpendicular wall surface may be configured by shallowly cutting part of the surfaces of the low refractive index parts and the high refractive-index member to form a groove and the side wall of this groove can be used to define the perpendicular wall surface.

According to the configuration of the perpendicular wall surface by means of the side wall of the groove, the perpendicular walls of multiple circular holes can be formed by one single groove, so that hole diameter adjustment for the circular holes does not need to be performed.

(B) Dual Periodicity

The dual periodicity implemented on the lattice array of the photonic crystal waveguide of the present invention includes the first periodic array and the second periodic array that differ from each other in the periodic arrangement. If the periodically arranged low refractive index parts are configured by circular holes, then the different periodic arrays that achieve the dual periodicity can be configured by the following modes of period modulation (Ba) and (Bb):

(Ba) Mode of period modulation which differentiates the periodic arrangement between the first periodic array and the second periodic array by differentiating the diameters of the circular holes (Bb) Mode of period modulation which differentiates the periodic arrangement between the first periodic array and the second periodic array by differentiating the grating pitch of the circular holes In the following description, the period modulation (Ba) which differentiates the diameters $2r$ of the circular holes is denoted as "$\Delta 2r$ dual periodic modulation" and the period modulation (Bb) which differentiates the circle grating pitches "a" is denoted as "$\Delta a$ dual periodic modulation." Note that "r" is the radius of the circular holes and "a" is the grating constant of the lattice array.

(C) Mode of Asymmetry of the Cross-Sectional Shape in the Dual Periodicity

The asymmetry of the cross-sectional shape in the dual periodicity includes the modes (Ca) and (Cb) according to the above-described period modulations (Ba) and (Bb).

(Ca) Mode of asymmetry of the cross-sectional shape in the dual periodicity of $\Delta 2r$ dual periodic modulation In the dual periodicity by the $\Delta 2r$ dual periodic modulation, in the individual low refractive index parts of the first periodic array and the second periodic array, circular holes differing in the diameter $2r$ are arranged. The circular holes are arranged at predetermined intervals in the propagation direction of the waveguide of the individual periodic arrays, and the circular holes of the first periodic array and the circular holes of the second periodic array are alternately arranged in the row extending in the propagation direction of the waveguide. With regard to the predetermined intervals at which the circular holes are arranged, the circular holes may be arranged at equal intervals for both of the first periodic array and the circular holes of the second periodic array, in addition to which, the circular holes may be arranged at equal intervals within the periodic arrangement of each of the first periodic array and the second periodic array and the first periodic array and the second periodic array may have different intervals.

(Ca1) In the first mode of asymmetry in the $\Delta 2r$ dual periodic modulation, out of large-diameter and small-diameter circular holes differing from each other in diameter, the small-diameter circular holes are configured to have an asymmetrical cross-sectional shape. By virtue of the asymmetrical cross-sectional shape, the aperture diameters of both ends of the circular holes in the thickness direction are differentiated from each other. According to the first mode of asymmetry, in the small-diameter circular holes that are made asymmetrical, the radiation efficiency on the side where the aperture diameter is large is improved.

According to the first mode of asymmetry, in the cross-sectional shape of the small-diameter circular holes, the ratio of radiation and the radiation rate can be controlled by adjusting the angle of inclination of the sloping surface of the radiation side and the depth of the perpendicular surface. Here, the ratio of radiation is a ratio of the light power of the light radiated on both sides in the thickness direction and indicates the unidirectional radiation property. If the thickness direction is expressed as the upward-downward direction of the radiated light of the light deflection device, then the ratio of radiation is expressed as a ratio Pupper/Plower between the upward light power Pupper and the downward light power Plower. The radiation rate is, in the slow light waveguide, the radiation coefficient by which the radiated light beams are radiated in the propagation direction and it is preferable that light is radiated within the range of, for example, 101 dB/cm to 102 dB/cm.

(Ca2) In the second mode of asymmetry, out of large-diameter and small-diameter circular holes differing from each other in diameter, the large-diameter circular holes are configured to have an asymmetrical cross-sectional shape. By virtue of the asymmetrical cross-sectional shape, the aperture diameters of both ends of the circular holes in the thickness direction are differentiated from each other. According to the second mode of asymmetry, the directionality of the unidirectional radiation property can be inverted by adjusting the angle of inclination of the sloping surface on the radiation side in the cross-sectional shape of the large-diameter circular holes. For example, the ratio of radiation according to which the amount of radiation from the side of the large aperture diameter becomes large, if the angle of inclination of the sloping surface is a small angle, can be changed to such a ratio of radiation that the amount of radiation from the side of the small aperture diameter is large by inverting the ratio of radiation by setting the angle of inclination of the sloping surface to a large angle closer to 900 of the perpendicular wall.

(Ca3) In the third mode of asymmetry, out of large-diameter and small-diameter circular holes differing from each other in diameter, both of the small-diameter and large-diameter circular holes are configured to have an asymmetrical cross-sectional shape. According to the third mode of asymmetry, the ratio of radiation from the side of the small aperture diameter can be increased.

(Cb) Mode of asymmetry of the cross-sectional shape in the dual periodicity of the $\Delta a$ dual periodic modulation According to the $\Delta a$ dual periodic modulation, the modulation is achieved by the dual periodic structure in which the intervals of arrangement of the circular holes repeatedly appear with grating pitches with different lengths in the propagation direction. In the $\Delta a$ dual periodic structure, the first periodic array and the second periodic array are arranged with a positional gap relative to each other in the propagation direction of the waveguide, and the circular holes in the lattice array are repeatedly arranged with the grating pitches with different lengths in the propagation direction of the waveguide. In the $\Delta a$ dual periodic modulation as well, in the same manner as in the $\Delta 2r$ dual periodic modulation, the ratio of radiation can be controlled by making the cross-sectional shape of the circular holes asymmetrical and the unidirectional radiation property can be improved.

(D) Modes of Arrangement of Circular Holes in the Dual Periodicity by $\Delta 2r$ Dual Periodic Modulation and $\Delta a$ Dual Periodic Modulation In the dual periodicity of both of the $\Delta 2r$ dual periodic modulation and the $\Delta a$ dual periodic modulation, the following modes of arrangement can be adopted in relation to the arrangement of the circular holes.

(Da) First mode of arrangement

The first mode of arrangement is a mode according to which the circular holes having the asymmetrical cross-sectional shape are adopted for the arrangement of circular holes in a particular row or rows. The circular holes having the asymmetrical cross-sectional shape are adopted for the second row from the linear defect where no circular holes are arranged among the circular hole rows in which circular holes are arranged in the propagation direction of the waveguide.

According to the first mode of arrangement in which periodic arrangement is performed for the second row, dependence of the beam shape of the radiated light beams upon the wave number can be reduced and the beam shape can be made closer to that of a monomodal beam, and high-quality beams with few sidelobes in the radiation direction can be formed.

(Db) Second Mode of Arrangement

The second mode of arrangement is a mode which makes the cross-sectional shape asymmetrical by adjusting the aperture diameter of the circular holes residing at a particular periodic locations.

According to the second mode of arrangement, introduces dual periodic enlargement or reduction of the aperture diameter for the circular holes residing at the locations of the even-number lattice rows from the waveguide in the propagation direction of the waveguide, as compared with the circular holes residing at other locations. According to the second mode of arrangement, by enlarging or reducing the diameters of the circular holes residing at the above-mentioned locations, the ratio of radiation can be increased while maintaining the radiation rate.

According to the light deflection device of the present invention, upward or downward radiation efficiency is improved, and likewise the efficiency of receiving light coming from above or below is improved at the same time. Also, if light is to be extracted upward, disturbance of the radiation pattern of the light emitted upward due to reflection on the substrate surface is suppressed.

Advantageous Effects of Invention

As has been described in the foregoing, the light deflection device of the present invention makes it possible to increase the radiation efficiency of the radiated light beams.

BRIEF DESCRIPTION OF DRAWINGS

FIG. 3 is a diagram for explanation of Δa dual periodic modulation implemented on the photonic crystal waveguide of the light deflection device of the present invention.

FIG. 15 is a diagram for explanation of an example mode where the side walls of the small-diameter circular holes of the first to tenth rows are stepped walls in the Δ2r dual periodic modulation and the lattice array according to the V-shape arrangement.

FIG. 18 is a diagram for explanation of an example mode where only the first row is configured for Δa dual periodic modulation in the lattice array according to the V-shape arrangement and the side walls of the small-diameter circular holes in the first row are inclined walls.

FIG. 25 is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of inverted the V-shape arrangement.

FIG. 27 is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of normal transverse-row arrangement.

DESCRIPTION OF EMBODIMENTS

Embodiments of the present invention will be described in detail below with reference to the drawings. In the following description, the schematic configuration of a light deflection device of the present invention will be described using FIGS. 1A and 1B; a dual periodic structure that constitutes a photonic crystal waveguide of the light deflection device of the present invention will be described using FIGS. 2A to 2H and 3; the asymmetrical cross-sectional shape of the photonic crystal waveguide of the light deflection device of the present invention will be described using FIGS. 4A to 4H; and modes of the asymmetrical cross-sectional shape will be described using FIGS. 5 to 35.

The ratio of radiation of the radiated light beam that is radiated by the light deflection device of the present invention will be described using FIGS. 6 to 21; monomodality of the radiated light beams that are radiated by the light deflection device will be described using FIGS. 21 to 24; a multiple periodic configuration in which additional periodicity is added to the dual periodicity will be described using FIGS. 25 to 32B; and the configuration of the asymmetrical cross-sectional shape by a groove structure will be described using FIGS. 33A to 35.

(1. Schematic Configuration of the Light Deflection Device)

Figure 1A:
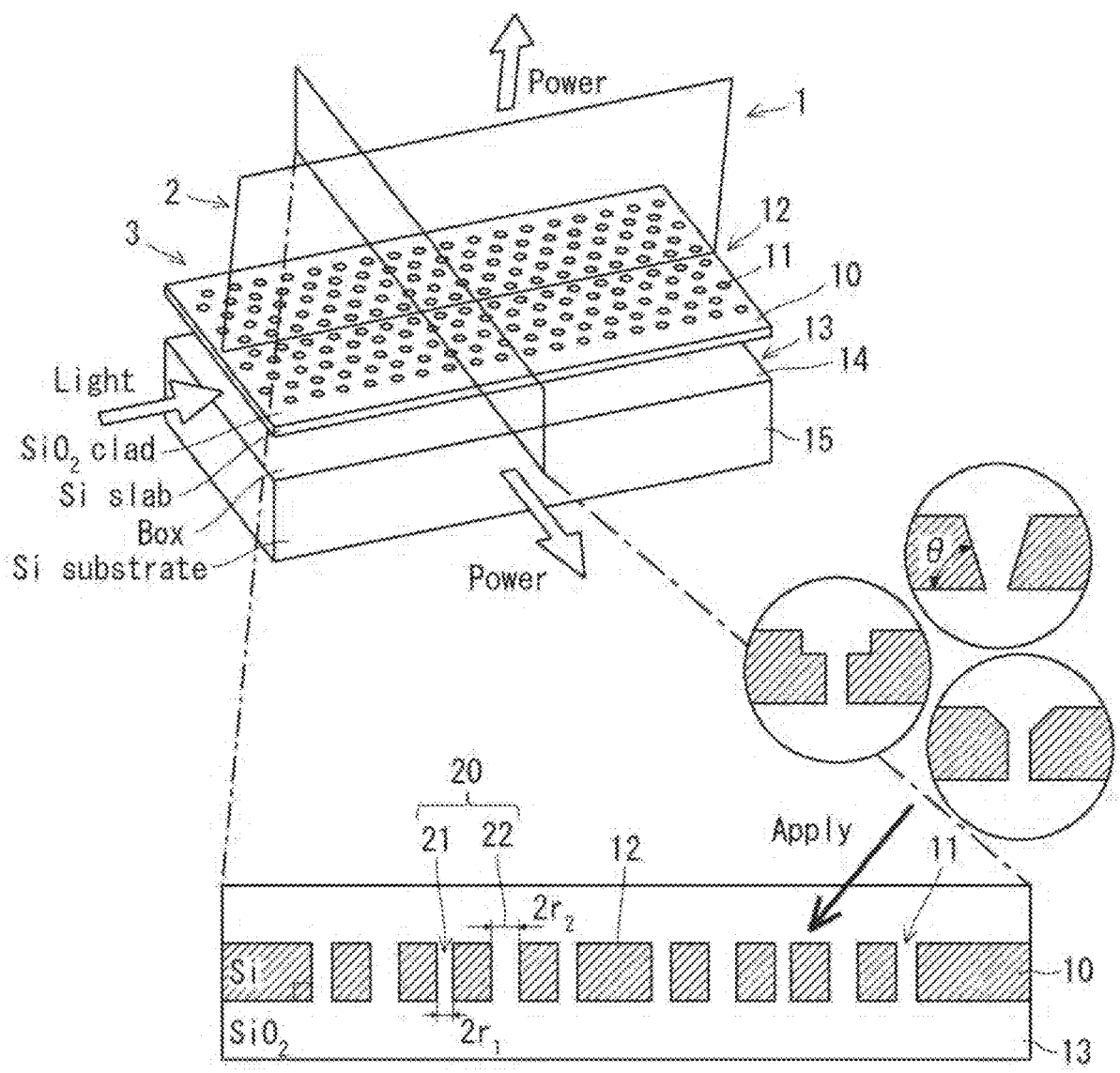
FIG. 1A is a diagram for explanation of a schematic configuration of a light deflection device of the present invention.
Figure 1B:
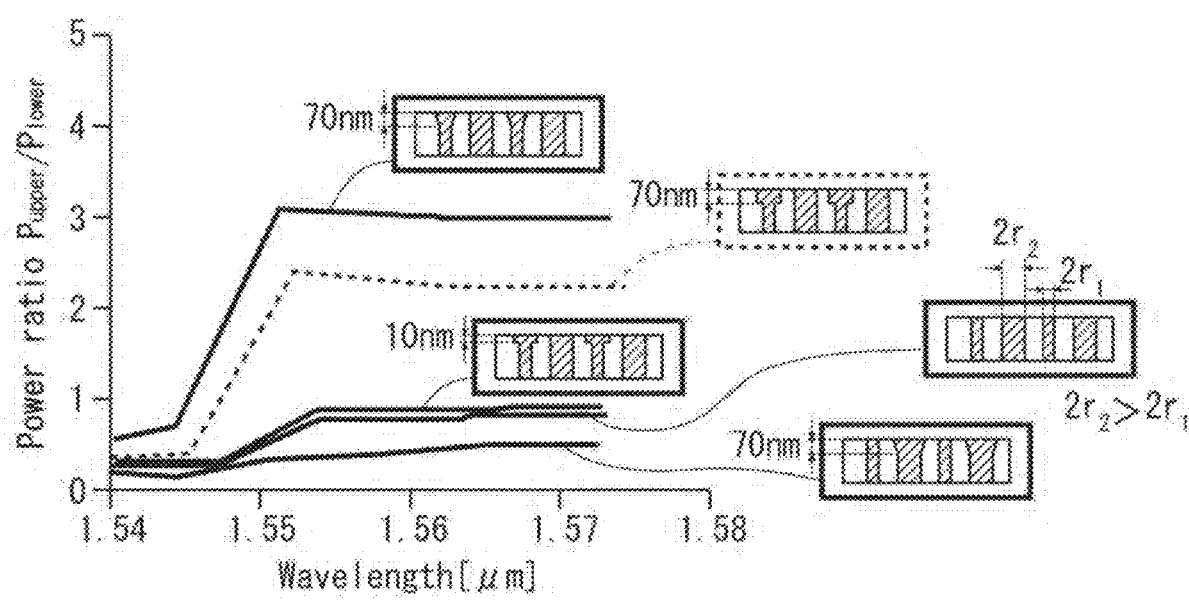
FIG. 1B is a diagram for explanation of the schematic configuration of the light deflection device of the present invention.

First, the schematic configuration of the light deflection device of the present invention will be described with reference to FIGS. 1A and 1B. FIGS. 1A and 1B are diagrams for explanation of the schematic configuration of the light deflection device of the present invention. Referring to the section (a) of FIG. 1A, a light deflection device 1 is illustrated which includes a photonic crystal waveguide 2 with low refractive index parts 11 periodically arranged in the form of a lattice in the surface of a high refractive-index member 10.

The photonic crystal waveguide 2 is formed by a lattice array 3 in which the low refractive index parts 11 are periodically arranged on the high refractive-index member 10 which is made of semiconductor such as Si. The low refractive index parts 11 can be constituted, for example, by circular holes provided in the high refractive-index member 10. The photonic crystal waveguide 2 is provided on a cladded material 13 made of low-refractive-index SiO2 material and arranged on the Si substrate 15 via a buried oxide (BOX) film 14.

A waveguide core 12 that propagates light is formed in the lattice array 3 of the photonic crystal waveguide 2, where the waveguide core 12 is configured by providing a section devoid of the low refractive index parts in a part of an Si slab formed by periodically arranging the low refractive index parts 11 are in the high refractive-index Si member 10. In the configuration in which the low refractive index parts 11 are constituted by the circular holes, the waveguide core 12 is formed by providing a linear defect devoid of circular holes in a part of the lattice array 3. The incident light that is incident on the waveguide core 12 propagates in the waveguide core 12 in the longitudinal direction and radiated to the outside via the waveguide core 12.

The section (b) of FIG. 1A illustrates an example of Δ2r dual periodic structure based on circular holes having different diameters. In the case of this Δ2r dual periodic structure, circular holes 20 having different diameters embedded in SiO2 are arranged with a period twice as long as the grating constant "a" on both side of the Si slab of the photonic crystal waveguide 2 with the waveguide core 12 residing in between. The periodically arranged circular holes 20 includes small-diameter circular holes 21 having a diameter of 2r1 and large-diameter circular holes 22 having a diameter of 2r2 (where r2>r1). The small-diameter circular holes 21 and the large-diameter circular holes 22 are respectively arranged with a period twice as long as the grating constant a.

A cross-sectional shape of traditionally known circular holes is a shape that is perpendicular to and symmetrical with respect to the thickness direction. In contrast, the circular holes 20 provided in the light deflection device 1 of the present invention has a shape that is asymmetrical with respect to the thickness direction and, by virtue of this asymmetrical cross-sectional shape, unidirectional radiation property is imparted to the ratio of radiation. If the waveguide irradiated with the radiated light beams used by the light deflection device is defined as residing on the upper side in the upward orientation, then the ratios of upward and downward radiations are differentiated by the up-and-down asymmetrical cross-sectional shape so as to increase the intensity of radiation in one direction.

The cross-sectional shapes in the upper right circles in the section (b) of FIG. 1A are examples of the asymmetrical cross-sectional shape, where a sloping surface and the like are depicted.

The side walls with an asymmetrical cross-sectional shape can each have a form of an inclined wall or a form of a stepped wall with reference to the thickness direction. The stepped wall is constituted by combination of at least two walls from the inclined wall, a perpendicular wall, and a horizontal wall. The cross-sectional shapes indicated in the circles in FIG. 1A indicate the examples of (i) inclined walls, (ii) combination of perpendicular walls and horizontal walls, and (iii) combination of inclined walls and perpendicular walls.

FIG. 1B illustrates ratios of radiation with respect to the wavelength for each of the examples of the asymmetrical cross-sectional shape. Note that the ratio of radiation refers to the ratio Pupper/Plower of the upward radiation power Pupper to the downward radiation power Plower in relation to the radiated light beams, where a ratio of radiation greater than one indicates that the upward radiation power is stronger than the downward radiation power.

In the example illustrated in FIG. 1B, it will be appreciated that upward (or downward) radiation is intensified if the diameter of the circular holes is decreased (or increased) and the cross-sectional shape of the circular holes is formed to be non-asymmetrical in the up-and-down direction. For example, when circular holes having different diameters are overlaid on each other subject to the angle of inclination θg=75° and the depth in the thickness direction being 70 nm, then the ratio of radiation will be about three times as large as that in the case of the up-and-down symmetrical configuration.

(2. Dual Periodic Modulation)

The light deflection device 1 of the present invention includes, in the lattice array 3, a dual periodic structure including a first periodic array and a second periodic array in which the low refractive index parts 11 are periodically arranged. The dual periodic structure contributes to the diffraction function to modulate the radiated light, deflect the propagating light that propagates in the waveguide core 12, and radiate the radiated light beam to the outside; and the function to reduce the dependence of the transverse angle distribution of the radiated light beam upon the wavelength and the refractive index so as to provide homogeneous light beams in a wide angle in the transverse direction.

The dual periodic structure includes two types, i.e., a dual periodic structure associated with the positional gap of the two periodic arrays, and a dual periodic structure associated with the diameters of the circular holes provided in the two periodic arrays.

In the first dual periodic structure, the first periodic array and the second periodic array are arranged at equal intervals with respect to the propagation direction of the waveguide, and the low refractive index parts of the first periodic array and the second periodic array differ from each other in the diameter of the circular holes. In the first dual periodic structure, low refractive index parts of circular holes having different diameters, i.e., the small-diameter circular holes and the large-diameter circular holes are repeatedly provided in the propagation direction of the waveguide.

In the second dual periodic structure, the first periodic array and the second periodic array are arranged with a positional gap with respect to each other in the propagation direction of the waveguide, and in the rows of the low refractive index parts arranged in the propagation direction of the waveguide, the low refractive index parts of the circular holes having the same diameter are repeatedly arranged with grating pitches of different lengths in the propagation direction of the waveguide.

Accordingly, out of the dual periodic structure of two types, the first dual periodic structure is a periodic array in which the low refractive index parts of the circular holes having different diameters are repeatedly arranged, and the second dual periodic structure is a periodic array in which the circular holes of the low refractive index parts are repeatedly arranged with grating pitches of different lengths. In the following description, the period modulation based on the dual periodic structure in which the diameters of the circular holes are differentiated is referred to as "$\Delta 2r$ dual periodic modulation" and the period modulation based on the dual periodic structure that differentiate the circle grating pitches is referred to as "$\Delta a$ dual periodic modulation," according to which description will be provided. Note that "r" is the radius of the circular holes and "a" is a grating constant of the lattice array.

A double periodic structure of the circular hole pattern requires a small number of processing steps, in addition to which they can change the amount of radiation, without changing the angle of radiation, through changing the grating pitch of the circular holes or the amount of change of the length of the diameters of the circular holes in the surface, so that the length-direction distribution (the distribution in the direction of the waveguide) of the radiated light beams that are radiated gradually in the propagation direction of the waveguide can be made to exhibit a Gaussian distribution and high-quality beams with few sidelobes in the length direction can be formed.

($\Delta 2r$ Dual Periodic Modulation)

The $\Delta 2r$ dual periodic modulation achieves modulation through the dual periodic structure in which circular holes of two types with different diameters appear repeatedly. The dual periodic structure may consist of, for example, a periodic structure in which large-diameter circular holes repeatedly appear and a periodic structure in which small-diameter circular holes repeatedly appear. The large diameter and the small diameter of the circular holes constituting the dual periodic structure reflect their magnitude relationship with respect to the diameter of the reference circular hole or in the context of comparison of these diameters with each other and, with regard to the diameters of the individual circular holes, for example, if the diameter of the reference circular hole is $2r$ and the diameter difference between the diameters is $2\Delta r$, then the diameter $2r1$ of the large-diameter circular holes is $2(r+\Delta r)$ and the diameter $2r2$ of the small-diameter circular holes is $2(r-\Delta r)$.

FIGS. 2A to 2H illustrates examples of the dual periodic structure for performing the $\Delta 2r$ dual periodic modulation. Here, a structure is exhibited in which the periodic sections of the circular holes differing in their diameters are alternately arranged in the propagation direction of the waveguide and they are arranged with an acute angle, an obtuse angle, or in the transverse direction with respect to the propagation direction. In the following description, first to sixth modes of arrangement will be illustrated.

Figure 2A:
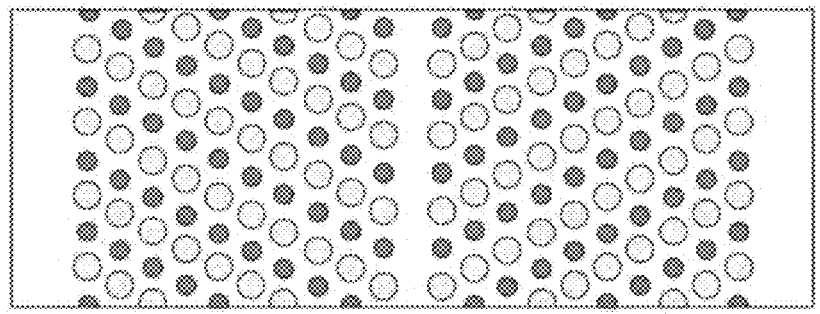
FIG. 2A is a diagram for explanation of Δ2r dual periodic modulation implemented on a photonic crystal waveguide of the light deflection device of the present invention.
Figure 2B:
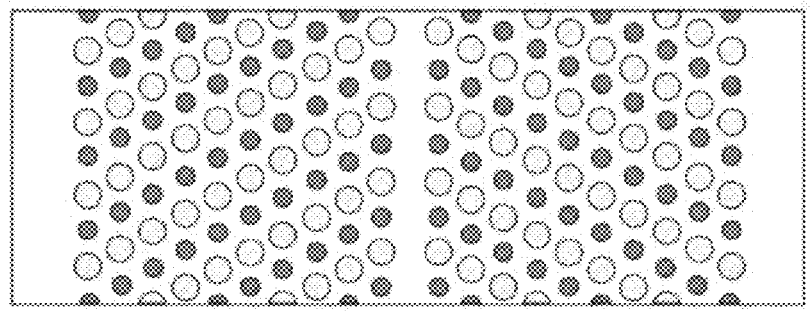
FIG. 2B is a diagram for explanation of the Δ2r dual periodic modulation implemented on the photonic crystal waveguide of the light deflection device of the present invention.

(a) First Mode of Arrangement:

According to the first mode of arrangement, the individual periodic sections are arranged in the form of a V-shape or an inverted V-shape with respect to the propagation direction of the waveguide. FIG. 2A illustrates the V-shape arrangement and FIG. 2B illustrates the inverted V-shape arrangement.

In the mode of arrangement in which the dual periodic structure has a V-shape or an inverted V-shape, exudation of the waveguide mode from the waveguide core in the transverse direction provides such an effect that the enclosure of light into the waveguide core is gradually weakened, and the radiation angle distribution is reduced to about ±25°. Also, the pattern of the periodic sections arranged in this V-shape provides such an effect that radiation with the same sign in the distribution of the waveguide modes in the transverse direction from the electromagnetic field is promoted to suppress interference at remote locations, and monomodal beams are formed.

Figure 2C:
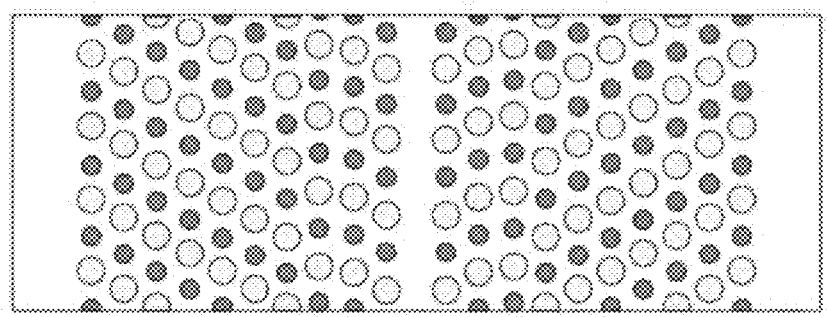
FIG. 2C is a diagram for explanation of the Δ2r dual periodic modulation implemented on the photonic crystal waveguide of the light deflection device of the present invention.

(b) Second Mode of Arrangement:

Referring to FIG. 2C, which illustrates the second mode of arrangement, linear arrangement of the circular holes of some of the low-refractive-index parts of the periodic sections in the lattice array is provided with a positional gap in the propagation direction of the waveguide, which is a mode of arrangement called "lattice shift." The second mode of arrangement equalizes the angle-of-deflection characteristics of the photonic crystal waveguide 2 having no positional gap.

Figure 2D:
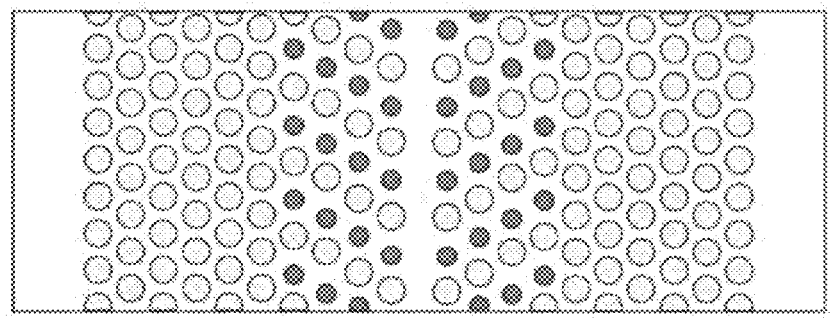
FIG. 2D is a diagram for explanation of the Δ2r dual periodic modulation implemented on the photonic crystal waveguide of the light deflection device of the present invention.

(c) Third Mode of Arrangement:

Referring to FIG. 2D, which illustrates the third mode of arrangement, in the lattice array, the lattice array section in the vicinity of the waveguide core has the dual periodic structure and, in the same manner as in the first mode of arrangement, the circular holes are arranged in the form of a V-shape or an inverted V-shape, and the remaining lattice array sections have the same periodic structure.

By making part of the lattice array 3 in the form of a V-shape of the first mode of arrangement, it is made possible to implement a configuration where the dual periodic structure is only provided in the vicinity of the waveguide core where the waveguide modes mainly concentrate, which provides such an effect that the radiation pattern can be further simplified.

Figure 2E:
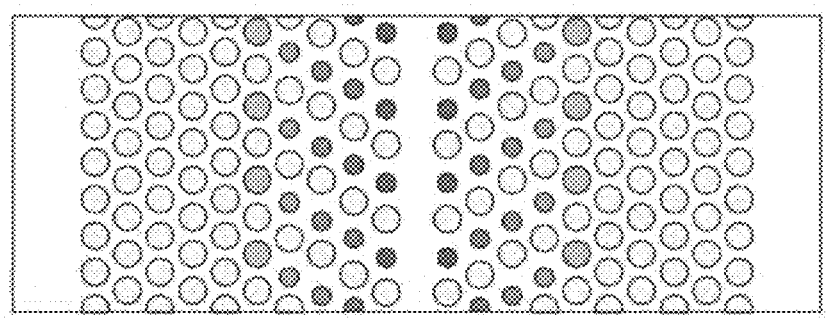
FIG. 2E is a diagram for explanation of the Δ2r dual periodic modulation implemented on the photonic crystal waveguide of the light deflection device of the present invention.
Figure 2F:
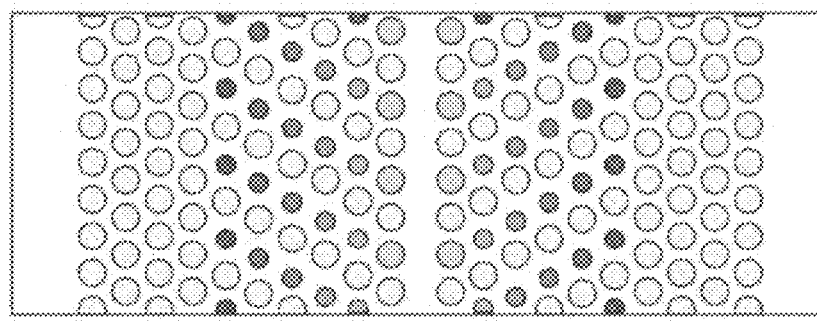
FIG. 2F is a diagram for explanation of the Δ2r dual periodic modulation implemented on the photonic crystal waveguide of the light deflection device of the present invention.

(d) Fourth Mode of Arrangement:

Referring to FIGS. 2E and 2F, which illustrate the fourth mode of arrangement, in the same manner as in the first mode of arrangement, circular holes are arranged in a V-shape or an inverted V-shape, in addition to which, with regard the periodic sections of two types of the dual periodic structure, the sizes of the circular holes of the low refractive index parts are arranged in a gradational fashion so that the V-shape or inverted V-shape and the gradational arrangement are employed in combination with each other.

FIG. 2E illustrates a mode where the V-shape and the gradational arrangement are combined and, as the dual periodic structure becomes away from the waveguide core, the dual periodic structure is gradually homogenized, which provides such an effect that the distribution of the radiated light beams in the transverse direction can be further smoothed. FIG. 2F illustrates a mode where the inverted V-shape and the gradational arrangement are combined, which provides such an effect that the width by which the waveguide mode is radiated is effectively widened, so that the transverse direction distribution can be further narrowed.

Figure 2G:
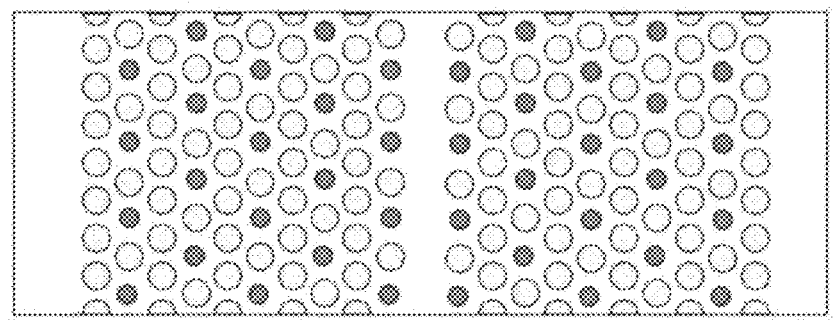
FIG. 2G is a diagram for explanation of the Δ2r dual periodic modulation implemented on the photonic crystal waveguide of the light deflection device of the present invention.
Figure 2H:
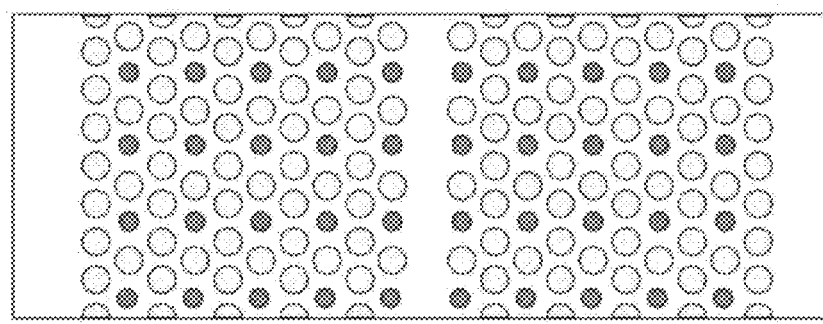
FIG. 2H is a diagram for explanation of the Δ2r dual periodic modulation implemented on the photonic crystal waveguide of the light deflection device of the present invention.

(e) Fifth and Sixth Modes of Arrangement:

Referring to FIG. 2G, the fifth mode of arrangement is illustrated which is a mode of arrangement that merges the forms of a V-shape and an inverted V-shape. Referring to FIG. 2H, the sixth mode of arrangement is illustrated which is a mode in which the linear arrangements of the circular holes of two types are alternately arranged in the transverse direction orthogonal to the propagation direction of the waveguide.

($\Delta a$ Dual Periodic Modulation)

The $\Delta a$ dual periodic modulation achieves modulation by a dual periodic structure in which the intervals of arrangement of the circular holes repeatedly appear with grating pitches of different lengths with respect to the propagation direction. In the Δa dual periodic structure, the first periodic array and the second periodic array are arranged with a positional gap with each other in the propagation direction of the waveguide, and the circular holes in the lattice array repeatedly appear with grating pitches of different lengths with respect to the propagation direction of the waveguide.

FIG. 3 illustrates examples of a dual periodic structure for performing the Δa dual periodic modulation. In FIG. 3, the sections (a) to (f) illustrate examples where circular holes having the same diameter are arranged with different grating pitches, and (g) and (h) of FIG. 3 illustrate examples where circular holes having different diameters are arranged with different grating pitches. In the following description, first to fourth modes of arrangement of the Δa dual periodic modulation will be illustrated.

(a) First Mode of Arrangement:

The first mode of arrangement is a mode of arrangement in which, for the entire lattice array, the circular holes are arranged with different grating pitches, the section (a) of FIG. 3 illustrates an example of the lattice array in which circular holes are triangularly arranged, and the section (b) of FIG. 3 illustrates an example where the circular holes are arranged in a V-shape.

(b) Second Mode of Arrangement:

The second mode of arrangement is a mode of arrangement in which the circular holes are arranged with different grating pitches in one particular lattice row in the lattice array.

In FIG. 3, the section (c) illustrates an example where, grating-pitch dual periodic structure is adopted for the circular holes of the first row adjacent to the waveguide in the lattice array having triangularly arranged circular holes, and the section (d) of FIG. 3 illustrates an example where the grating-pitch dual periodic structure is adopted for the circular holes of the second row from the waveguide in the lattice array having triangularly arranged circular holes.

(c) Third Mode of Arrangement:

The third mode of arrangement is a mode of arrangement in which circular holes are arranged In FIG. 3, the section (e) illustrates an example where the grating-pitch dual periodic structure is adopted for the first to third rows from the waveguide in the lattice array having triangularly arranged circular holes, and the section (f) of FIG. 3 illustrates an example where the grating-pitch dual periodic structure is adopted for the first to third rows from the waveguide in the lattice array of circular holes arranged in a V-shape.

(d) Fourth Mode of Arrangement:

The fourth mode of arrangement is a mode of arrangement in which the dual periodicity based upon the grating pitches and the dual periodicity based upon the diameters of the circular holes are combined on the lattice array.

In FIG. 3, the section (g) illustrates an example where the dual periodic structure based upon the different grating pitches is adopted for the first row from the waveguide in the lattice array having triangularly arranged circular holes, and the different-diameter dual periodic structure is adopted for the second row from the waveguide. In FIG. 3, the section (h) illustrates an example where a dual periodic structure based on different grating pitches is adopted for the first and third rows from the waveguide in the lattice array having triangularly arranged circular holes, and the different-diameter dual periodic structure is adopted with regard to the second and fourth rows from the waveguide.

(3. Asymmetrical Mode)

An example where the low refractive index parts have an asymmetrical cross-sectional shape with reference to the thickness direction in the lattice array of the light deflection device of the present invention, will be described using FIGS. 4A to 4H.

Figure 4A:
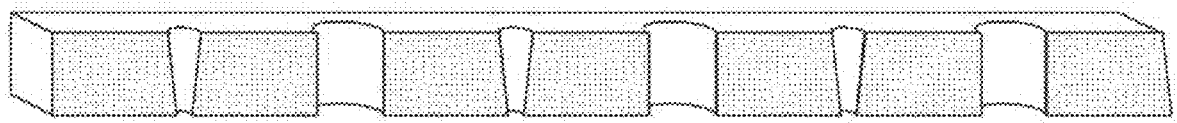
FIG. 4A is a diagram for explanation of an asymmetrical cross-sectional shape of the photonic crystal waveguide of the light deflection device of the present invention.
Figure 4B:
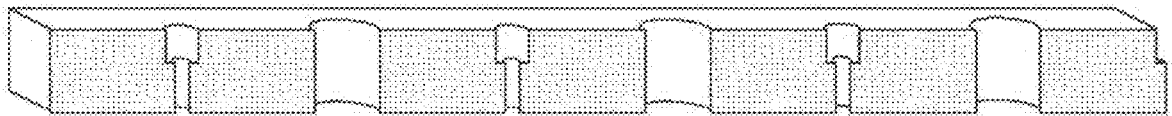
FIG. 4B is a diagram for explanation of the asymmetrical cross-sectional shape of the photonic crystal waveguide of the light deflection device of the present invention.
Figure 4C:
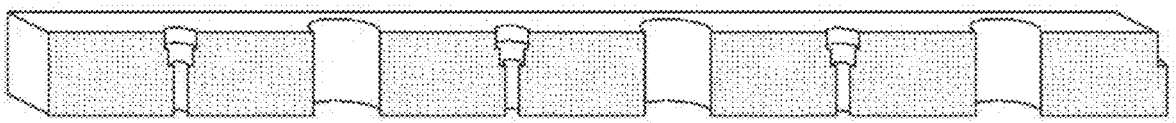
FIG. 4C is a diagram for explanation of the asymmetrical cross-sectional shape of the photonic crystal waveguide of the light deflection device of the present invention.
Figure 4D:
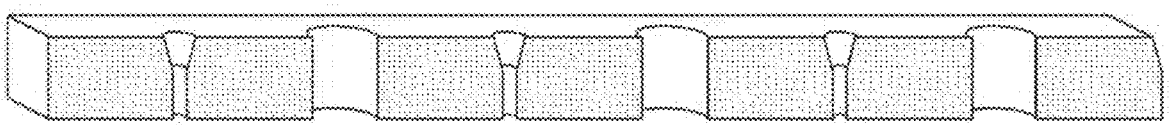
FIG. 4D is a diagram for explanation of the asymmetrical cross-sectional shape of the photonic crystal waveguide of the light deflection device of the present invention.
Figure 4E:
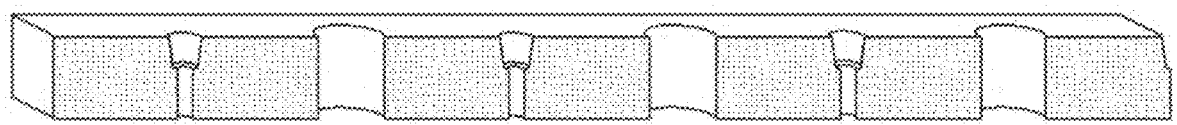
FIG. 4E is a diagram for explanation of the asymmetrical cross-sectional shape of the photonic crystal waveguide of the light deflection device of the present invention.
Figure 4F:
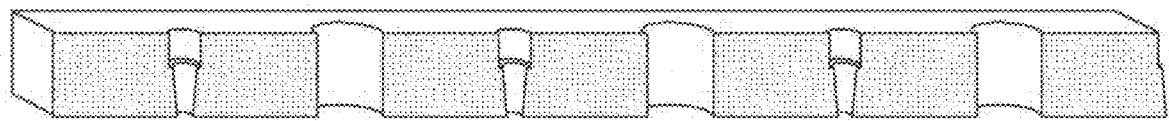
FIG. 4F is a diagram for explanation of the asymmetrical cross-sectional shape of the photonic crystal waveguide of the light deflection device of the present invention.
Figure 4G:
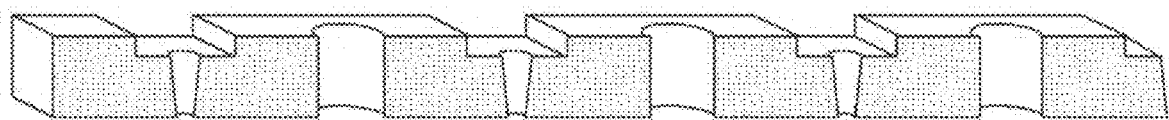
FIG. 4G is a diagram for explanation of the asymmetrical cross-sectional shape of the photonic crystal waveguide of the light deflection device of the present invention.
Figure 4H:
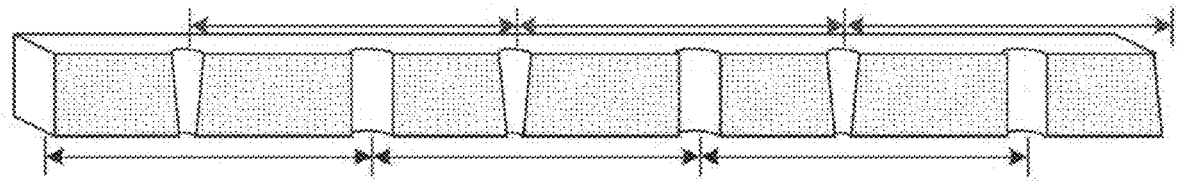
FIG. 4H is a diagram for explanation of the asymmetrical cross-sectional shape of the photonic crystal waveguide of the light deflection device of the present invention.

It should be noted that FIGS. 4A to 4G are examples where the cross-sectional shape of the small-diameter circular holes are asymmetrical in the $\Delta 2r$ dual periodic structure based on the circular holes differing in their diameters, and FIG. 4H is an example where the cross-sectional shape of the small-diameter circular holes is asymmetrical in the Δa dual periodic structure based on the arrangement of the circular holes differing in their grating pitches. It should also be noted that, here, only a part of the cross section with regard to one row in the lattice array is schematically illustrated.

The asymmetrical cross-sectional shape may take multiple forms and the side walls defining the asymmetrical cross-sectional shape may have a wall shape of various forms such as the form of an inclined wall with respect to the thickness direction, a stepped wall defined by at least two walls selected from an inclined wall, a perpendicular wall, and a horizontal wall, and the like.

(a) First Mode

The first mode is a mode in which the side wall defining the asymmetrical cross-sectional shape is defined by an inclined wall that is inclined with respect to the thickness direction. In FIG. 4A, the form of the cross-sectional shape of the inclined wall is configured such that the wall surface between one end and the other end is defined by a sloping surface in the thickness direction of the low refractive index parts, and the cross-sectional shape of the low refractive index parts will take a trapezoidal shape.

(b), (c) Second and Third Modes

The second and third modes are modes in which the side wall defining the asymmetrical cross-sectional shape is defined by a stepped wall that is stepped in the thickness direction and is a mode in which the circular holes whose aperture diameter is large and the circular holes whose aperture diameter is small are combined in the thickness direction. The second mode corresponds to combination of two circular holes and the third mode corresponds to combination of three circular holes.

In FIG. 4B, in the context of the cross-sectional shape of the stepped wall of the second mode, the wall surface between one end and the other end is defined by a perpendicular surface and a horizontal surface in the thickness direction of the low refractive index parts, and the perpendicular surface of the circular holes whose aperture diameter is large and the perpendicular surface of the circular holes whose aperture diameter is small are coupled via the horizontal surface and thus configured.

In FIG. 4C, in the context of the cross-sectional shape of the stepped wall of the third mode, the wall surface between one end and the other end is defined by a perpendicular surface and a horizontal surface in the thickness direction of the low refractive index parts, and the perpendicular surface of the large aperture diameter, the perpendicular surface of the small aperture diameter, and the perpendicular surface defined in the intermediate portion are respectively coupled via two horizontal surfaces and thus configured.

(d) Fourth Mode

The fourth mode is a mode in which the side wall defining the asymmetrical cross-sectional shape is defined by a stepped wall that is stepped in the thickness direction. In FIG. 4D, in the context of the cross-sectional shape of the stepped wall of the fourth mode, the wall surface between one end and the other end is defined by a sloping surface and a perpendicular surface in the thickness direction of the low refractive index parts, and the sloping surface of the large aperture diameter and the perpendicular surface of the small aperture diameter are coupled and thus configured.

(e) Fifth Mode

The fifth mode is a mode in which the side wall defining the asymmetrical cross-sectional shape is defined by a stepped wall that is stepped in the thickness direction. In FIG. 4E, in the context of the cross-sectional shape of the stepped wall of the fifth mode, the wall surface between one end and the other end is defined by a sloping surface, a horizontal surface, and a perpendicular surface in the thickness direction of the low refractive index parts; and the sloping surface of the large aperture diameter and the perpendicular surface of the small aperture diameter are coupled via the horizontal surface and thus configured.

(f) Sixth Mode

The sixth mode is a mode in which the side wall defining the asymmetrical cross-sectional shape is defined by a stepped wall that is stepped in the thickness direction. In FIG. 4F, in the context of the cross-sectional shape of the stepped wall of the sixth mode, the wall surface between one end and the other end is defined by a perpendicular surface, a horizontal surface, and a sloping surface in the thickness direction of the low refractive index parts, and the perpendicular surface of the large aperture diameter and the sloping surface whose aperture diameter is small are coupled via the horizontal surface and thus configured.

(g) Seventh Mode

The seventh mode is a mode in which the side wall defining the asymmetrical cross-sectional shape is defined by a stepped wall that is stepped in the thickness direction. In FIG. 4G, in the context of the cross-sectional shape of the stepped wall of the seventh mode, by providing a groove section on one side in the sloping surface coupling the upper side and the lower side in the thickness direction of the low refractive index parts, the diameter of one side of the sloping surface is enlarged to impart asymmetry thereto.

(h) Eighth Mode

The eighth mode is a mode in which the side wall defining the asymmetrical cross-sectional shape is defined by an inclined wall that is inclined with respect to the thickness direction in the Δa dual periodic structure based on the arrangement of the circular holes differing in their grating pitches. In FIG. 4H, in the context of the small-diameter circular holes, the wall surface between one end and the other end is defined by a sloping surface in the thickness direction, and the cross-sectional shape of the low refractive index parts has a trapezoidal shape. Meanwhile, in the context of the large-diameter circular holes, the wall surface between one end and the other end is defined by a perpendicular surface in the thickness direction, and the cross-sectional shape of the low refractive index parts has a rectangular shape. The small-diameter circular holes and the large-diameter circular holes are arranged with repetition of different grating pitches.

In FIGS. 4A to 4H, in the context of the large-diameter circular holes, the wall surface between one end and the other end in the thickness direction are defined by a perpendicular surface, the low refractive index parts has a cylindrical shape, and the cross-sectional shape has a rectangular shape.

It should be noted that, in FIGS. 4A to 4H, examples are illustrated where the cross-sectional shape of the small-diameter circular holes is asymmetrical, but the configuration may be such that the cross-sectional shape of the large-diameter circular holes is a shape asymmetrical in the thickness direction and, alternatively, the configuration may be such that the cross-sectional shape of both of the small-diameter and large-diameter circular holes is a shape asymmetrical in the thickness direction. It should be noted that, in this case, the radiation efficiency will exhibit different unidirectional radiation property.

(4. Calculation Model of the Light Deflection Device)

Figure 5:
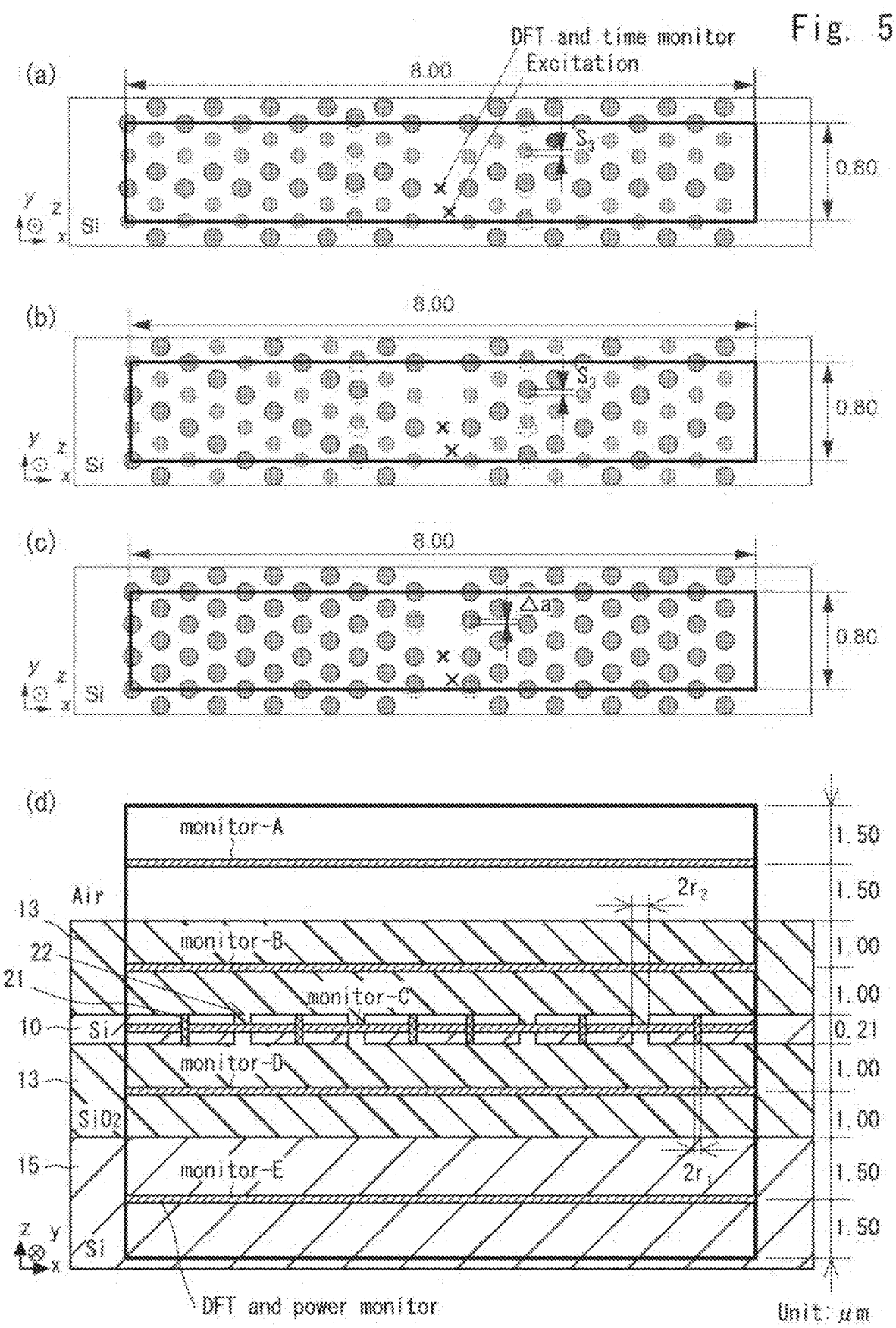
FIG. 5 is a schematic diagram for explanation of a calculation model of the light deflection device of the present invention.

FIG. 5 is a schematic diagram for explanation of a calculation model of the light deflection device of the present invention. In the following description, on the basis of this calculation model, the radiation efficiency of the radiated light beams, the beam shape of monomodality, and the like will be illustrated.

In FIG. 5, the section (d) depicts the cross section of the light deflection device of the present invention, where the x-direction is a direction orthogonal to the propagation direction of the slow light propagating in the waveguide and the z-direction is the thickness direction of the lamination constituting the light deflection device. In the light deflection device, on the Si substrate 15, the lattice array 3, sandwiched by SiO2 cladded materials 13 on the upper and lower sides, is provided. The lattice array 3 is configured by arranging the low refractive index parts 11 at predetermined intervals within the high refractive-index member 10. In the Δ2r dual periodic modulation, the low refractive index parts 11 are configured by 2r1 small-diameter circular holes 21 and the 2r2 large-diameter circular holes 22 having different diameters. It should be noted that, in the lattice array 3, the linear defect in which no low refractive index parts are arranged constitutes the waveguide.

According to this calculation model, at the locations indicated by "monitor-A" to "monitor-E" in the figure, the power of the radiated light is calculated by numerical calculation using discrete Fourier transform (DFT) and finite-difference time-domain (FDTD) techniques.

In FIG. 5, the sections (a) to (c) are diagrams in which the lattice array 3 of the light deflection device is viewed in the x-y plane, and the sections (a) and (b) of FIG. 5 illustrates examples of a traditional transverse-row array and a V-shape arrangement in the Δ2r dual periodic modulation, and the section (c) of FIG. 5 illustrates an example of the Δa dual periodic modulation. Also, the locations on which DFT analysis and monitoring are performed and the locations to be subjected to excitation during the calculation are indicated by the symbol "x." It should be noted that, in the sections (a) and (b) of FIG. 5, the symbol S3 indicates the amount of the lattice shift performed on the third row so as to ensure wideband low dispersion of the slow light. Since this lattice shift amount S3 has no relevance to radiation of light, presence or absence of the lattice shift does not cause significant impact on the effects of the present invention.

(5. Ratio of Radiation)

In the following description, contribution of the ratio of radiation by the asymmetrical cross-sectional shape in the thickness direction of the low refractive index parts will be described in relation to the Δ2r dual periodic modulation and the Δa dual periodic modulation.

5.1: Δ2r Dual Periodic Modulation

In the following description, examples will be illustrated where, in the Δ2r dual periodic modulation, the side wall defining the asymmetrical cross-sectional shape is an inclined wall and a stepped wall. With regard to the inclined wall, its wall surface is inclined with reference to the thickness direction, and the aperture diameter at one end of the circular holes is larger than the aperture diameter at the other end, which defines a trapezoidal shape. The stepped wall is constituted by at least two walls selected from an inclined wall, a perpendicular wall, and a horizontal wall. It should be noted that, in the context of the perpendicular wall, its wall surface is perpendicular to the thickness direction and the circular holes define a cylindrical shape. Also, in the context of the horizontal wall, its wall surface is horizontal to the thickness direction and a ring-like flange shape is seen in the circular holes.

5.1a: Mode of the Δ2r Dual Periodic Modulation, the V-Shape Arrangement, and the Inclined Wall In the following description, examples will be illustrated where, in the context of the modes in which, in the Δ2r dual periodic modulation and the lattice array according to the V-shape arrangement, the side wall defining the asymmetrical cross-sectional shape is an inclined wall for the case where the asymmetric shape is applied in the small-diameter circular holes, the case where it is applied to the large-diameter circular holes, and the case where it is applied to both of the small-diameter and large-diameter circular holes.

Figure 6:
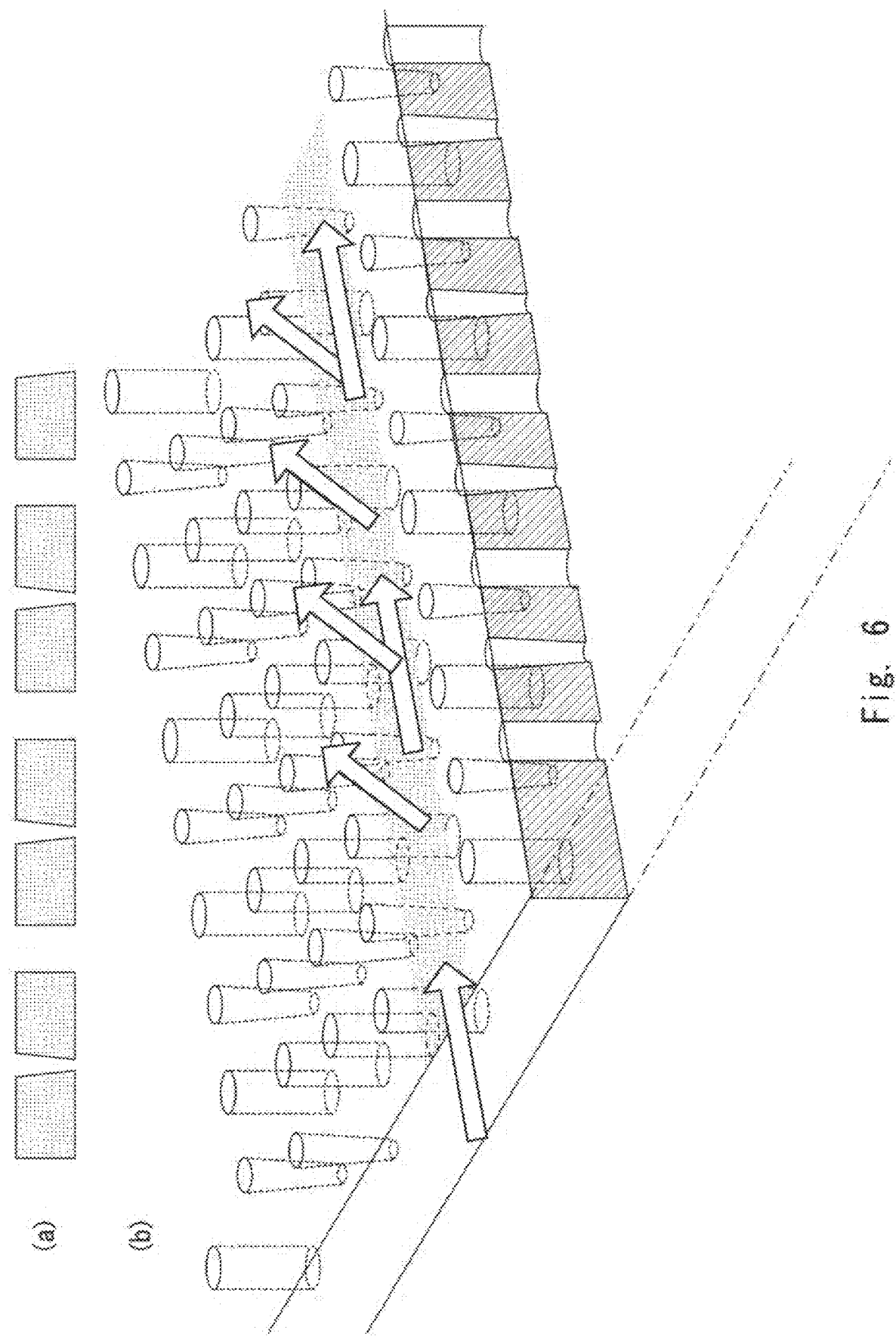
FIG. 6 is a diagram for explanation of an example mode where side walls of small-diameter circular holes are inclined walls in Δ2r dual periodic modulation and the lattice array according to V-shape arrangement.

(a) Example Mode in which the Asymmetric Shape is Applied in the Small-Diameter Circular Holes FIG. 6 illustrates an example mode where the side walls of the small-diameter circular holes are inclined walls in the Δ2r dual periodic modulation and the lattice array according to the V-shape arrangement. The section (a) of FIG. 6 is a cross-sectional view, and the section (b) of FIG. 6 is a schematic perspective view. In the example mode of FIG. 6, amongst the circular holes having different diameters in the lattice array that is arranged in the V-shape, the side walls are provided as inclined walls only for the small-diameter circular holes and the cross-sectional shape thereof is made asymmetrical.

The characteristic data shown in FIGS. 7A to 7E indicates the case where the diameter difference Δ2r of the Δ2r dual-periodicity diameter is 10 nm and the angle of inclination θg of the inclined wall is changed in the range between 65° and 90°.

Figure 7A:
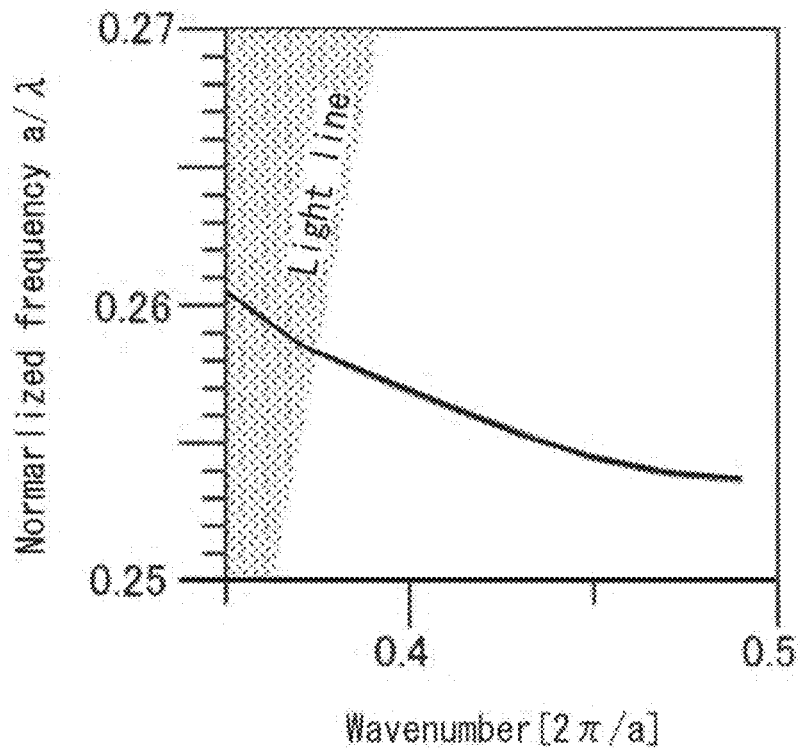
FIG. 7A is a diagram that illustrates characteristic data of the mode where the asymmetric shape is defined in the small-diameter circular holes.
Figure 7B:
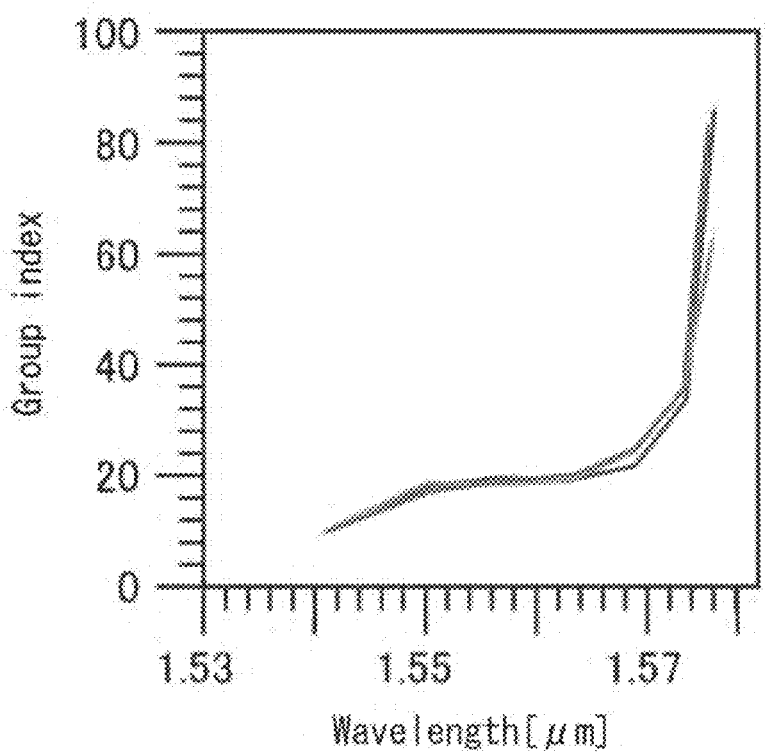
FIG. 7B is a diagram that illustrates characteristic data of the mode where the asymmetric shape is defined in the small-diameter circular holes.
Figure 7C:
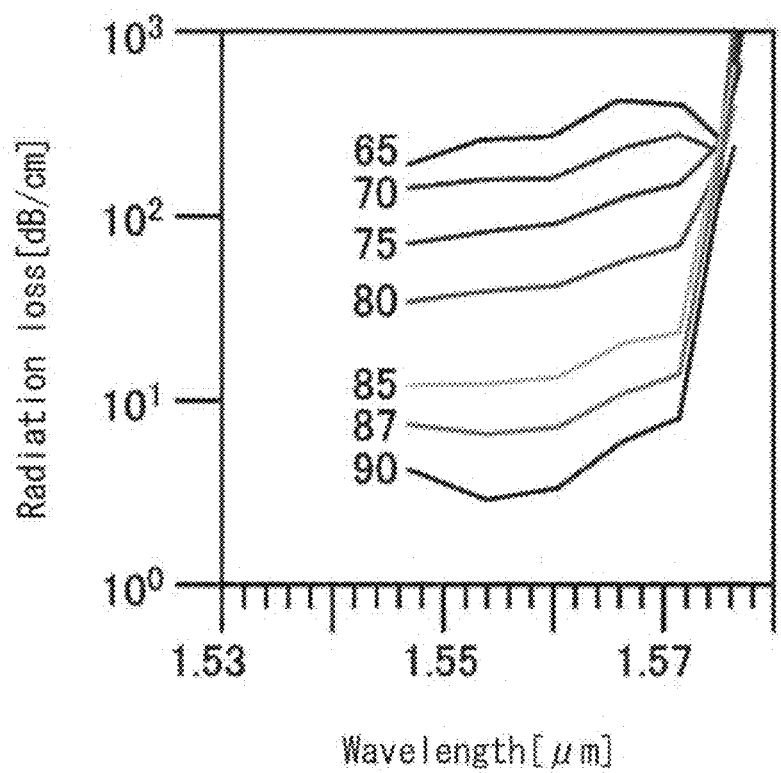
FIG. 7C is a diagram that illustrates characteristic data of the mode where the asymmetric shape is defined in the small-diameter circular holes.
Figure 7D:
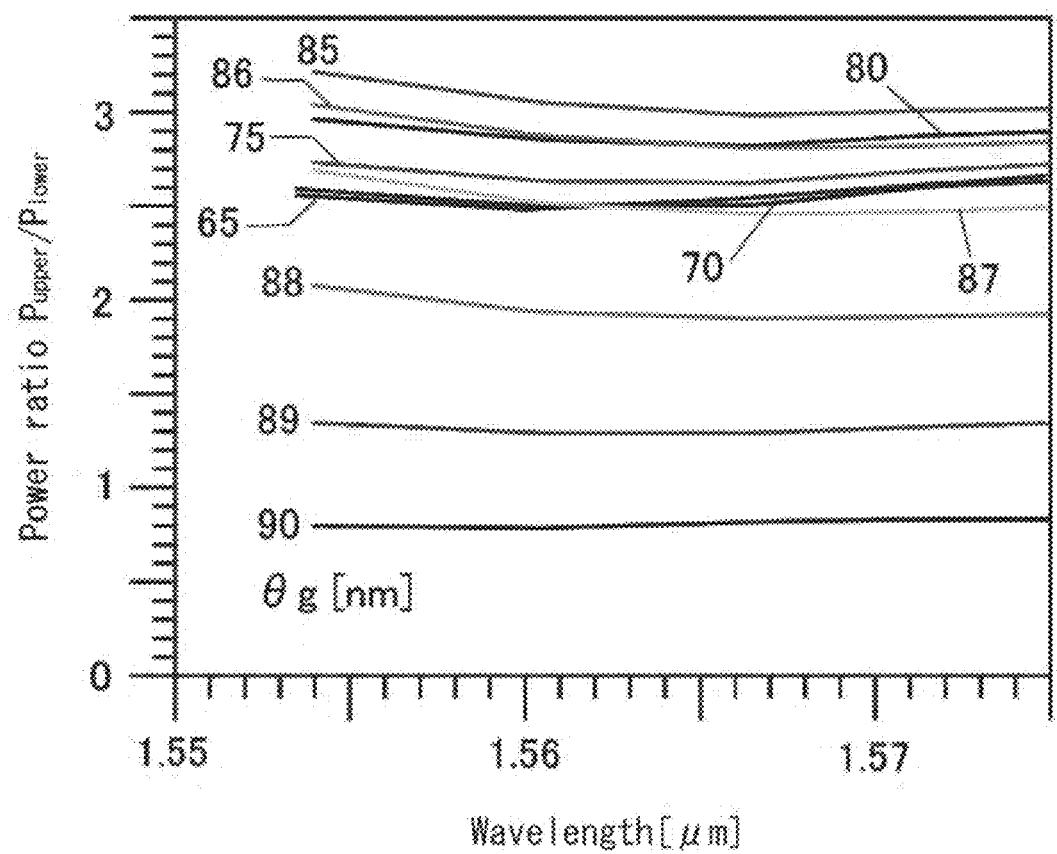
FIG. 7D is a diagram that illustrates characteristic data of the mode where the asymmetric shape is defined in the small-diameter circular holes.
Figure 7E:
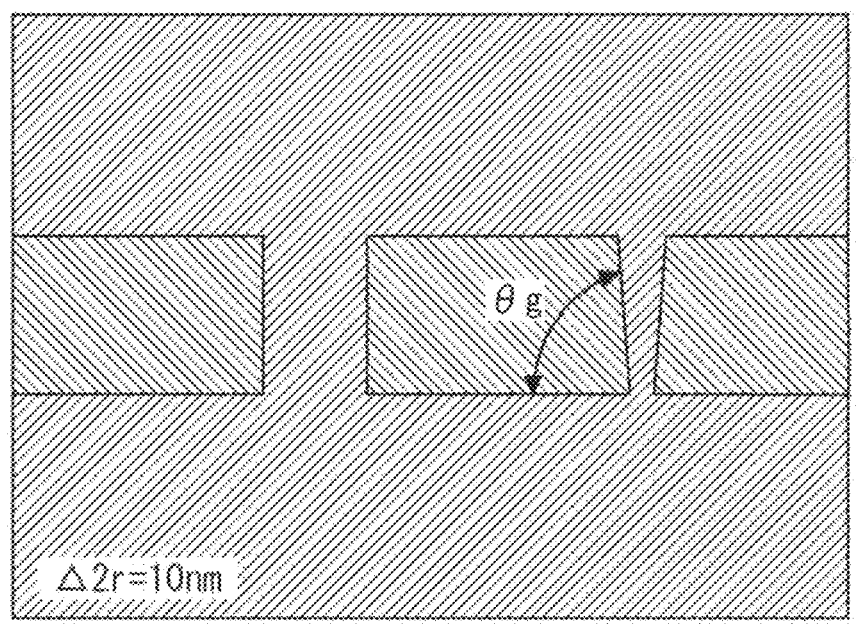
FIG. 7E is a diagram that illustrates characteristic data of the mode where the asymmetric shape is defined in the small-diameter circular holes.

FIG. 7A indicates normalized frequency a/λ for wave number (2π/a), FIG. 7B indicates group refractive index for wavelength (μm), FIG. 7C indicates radiation coefficient (scattering loss) (dB/cm) for wavelength (μm), and FIG. 7D indicates ratio of radiation Pupper/Plower for wavelength (μm). FIG. 7E indicates the cross-sectional shape.

According to the characteristics of the ratio of radiation of FIG. 7D, a ratio of 2.5:1 or more is obtained when the angle of inclination θg falls within the range of 65° to 87°.

The radiated light beams of the light deflection device need to have a high ratio of radiation considering the need of unidirectional radiation and the slow light propagating in the waveguide needs to be gradually radiated so that the radiated beams are distributed in the length direction (propagation direction). In order that the radiated beams exhibit a favorable length-direction distribution, it is necessary to provide the range of 10 to 100 dB/cm in the characteristics of radiation coefficient of FIG. 7C.

Accordingly, when both of the characteristics of the ratio of radiation and the characteristics of the radiation coefficient are taken into account, radiated light beams whose ratio of radiation is as high as or higher than 2.5:1 and whose radiation coefficient falls within the range of 10 to 100 dB/cm can be obtained if the angle of inclination θg of the circular holes falls within the range of 75° to 85°.

Figure 8:
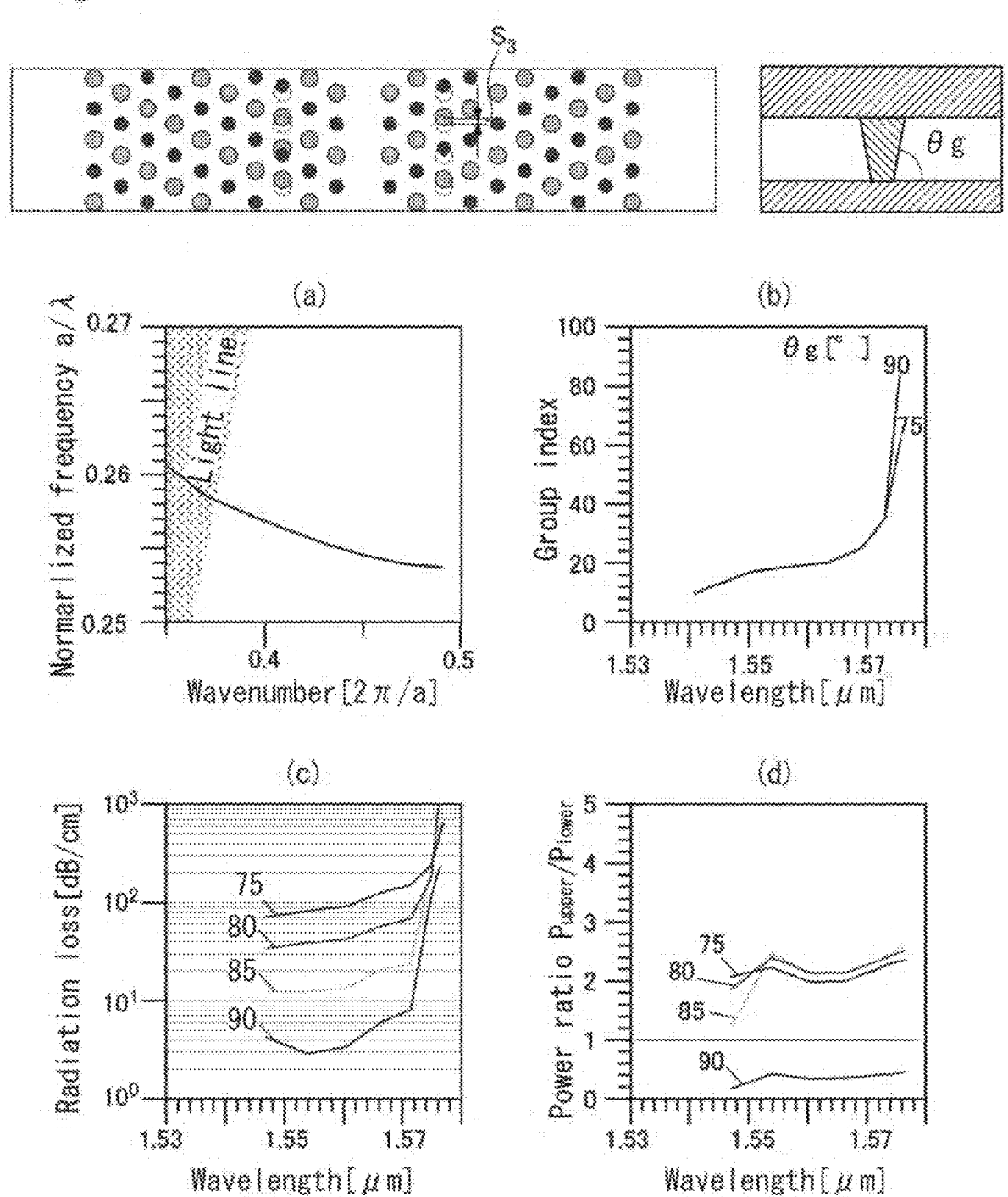
FIG. 8 is a diagram that illustrates characteristic data in the case where the angle of inclination θg is in the range of 75° to 90° in the same structure as in FIGS. 7A to 7E.
Figure 9A:
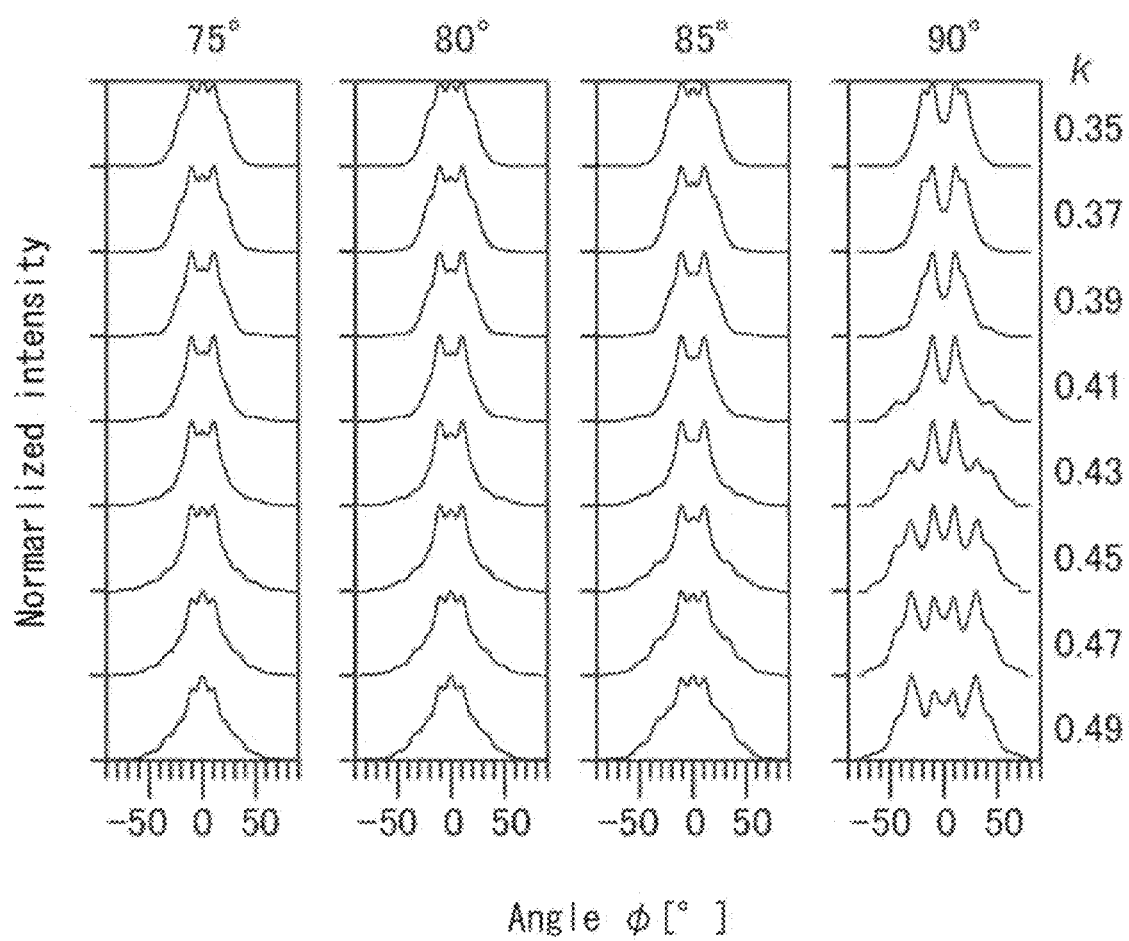
FIG. 9A is a diagram that illustrates characteristic data in the case where the angle of inclination θg is in the range of 75° to 90° in the same structure as in FIGS. 7A to 7E.
Figure 9B:
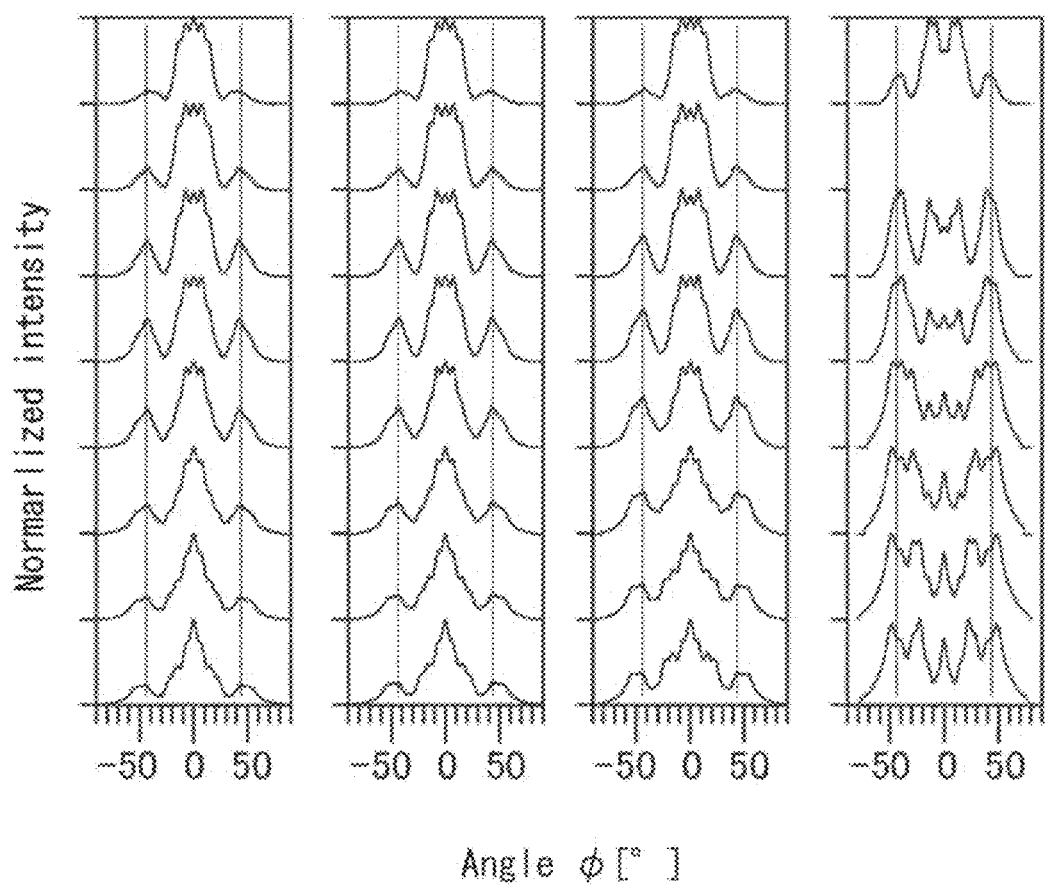
FIG. 9B is a diagram that illustrates characteristic data in the case where the angle of inclination θg is in the range of 75° to 90° in the same structure as in FIGS. 7A to 7E.

FIGS. 8, 9A, and 9B illustrate the case where the angle of inclination θg is in the range of 75° to 90° in the same structure as in FIGS. 7A to 7E, where the section (a) of FIG. 8 indicates the normalized frequency a/λ for wave number (2π/a), the section (b) of FIG. 8 indicates the group refractive index for wavelength (jam), the section (c) of FIG. 8 indicates the radiation coefficient (scattering loss) (dB/cm) for wavelength (jam), and the section (d) of FIG. 8 indicates the ratio of radiation Pupper/Plower for wavelength (m). In FIG. 8, the symbol S3 indicates the amount of the lattice shift performed on the third row so as to ensure wideband low dispersion of the slow light. Since this lattice shift amount S3 has no relevance to radiation of light, presence or absence of the lattice shift does not cause significant impact on the effects of the present invention.

According to the characteristics of the ratio of radiation of the section (d) of FIG. 8, a substantially 2:1 ratio can be obtained when the angle of inclination θg falls within the range of 75° to 85°.

FIGS. 9A and 9B illustrate the emitted beam pattern analysis (FFP: Far Field Pattern). FIG. 9A indicates the FFP pattern of the aperture distribution in air in monitor-A in the section (d) of FIG. 5, and FIG. 9A indicates the FFP pattern of the aperture distribution in the cladded material in monitor-B in the section (d) of FIG. 5.

Referring to FIGS. 9A and 9B, while the radiated light beams are substantially unimodal in the case where the inclined wall whose angle of inclination θg falls within the range of 75 to 85°, the radiated light beams will have multimodality in the case where the angle of inclination θg is 90° (perpendicular wall). This is because, in the case where the angle of inclination θg is 90°, the downward radiation becomes slightly stronger and the radiation occur downward and upward in the thickness direction, so that the light radiated downward is reflected by the substrate and this reflected light causes the radiated light beams to be bi-modal and exhibit multimodality.

It should be noted that, "k" in FIGS. 9A and 9B represents the wave number of light, change of which corresponds to changing the wavelength of the light, or changing the deflection angle of the light in the traveling direction. In a light deflector, it is desirable that this change in wave number k be small.

(b) Example Mode where an Asymmetric Shape is Applied in the Large-Diameter Circular Holes FIGS. 10A to 10E illustrate an example mode where the side walls of the large-diameter circular holes are inclined walls in the Δ2r dual periodic modulation and the lattice array according to the V-shape arrangement. The pieces of characteristic data shown in FIGS. 10A to 10E reflect the case where the diameter difference Δ2r of the Δ2r dual-periodicity diameter is set to 10 nm, and the angle of inclination θg of the inclined wall is changed within the range of 60° to 90°.

Figure 10A:
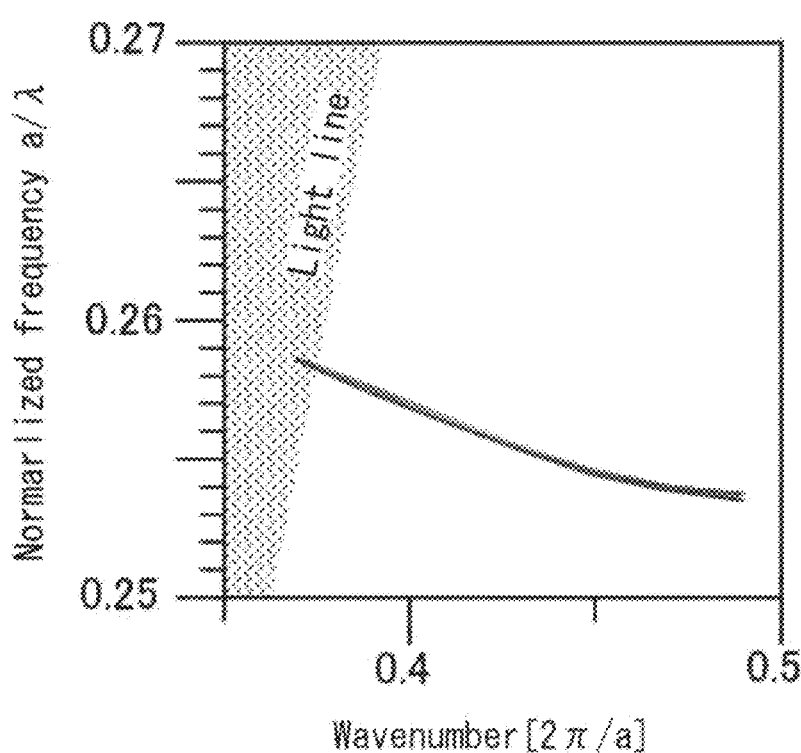
FIG. 10A is a diagram that illustrates characteristic data in the case where an example mode where the side walls of the large-diameter circular holes are inclined walls in the Δ2r dual periodic modulation and the lattice array according to the V-shape arrangement.
Figure 10B:
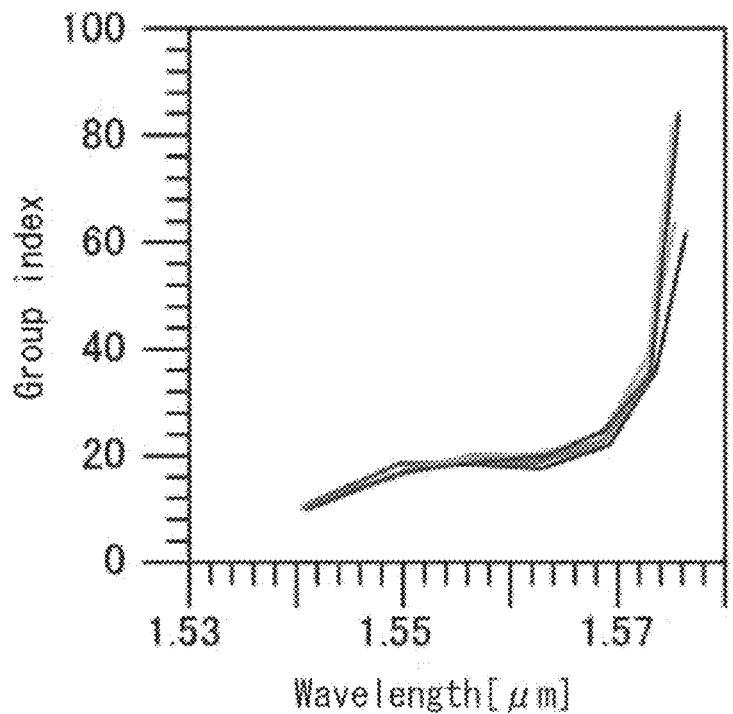
FIG. 10B is a diagram that illustrates characteristic data in the case where an example mode where the side walls of the large-diameter circular holes are inclined walls in the Δ2r dual periodic modulation and the lattice array according to the V-shape arrangement.
Figure 10C:
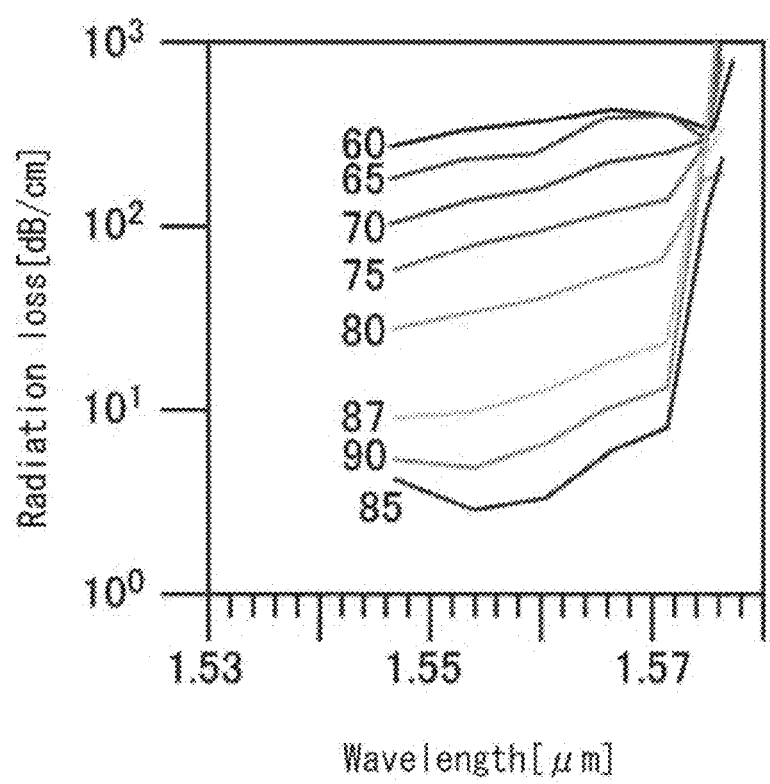
FIG. 10C is a diagram that illustrates characteristic data in the case where an example mode where the side walls of the large-diameter circular holes are inclined walls in the Δ2r dual periodic modulation and the lattice array according to the V-shape arrangement.
Figure 10D:
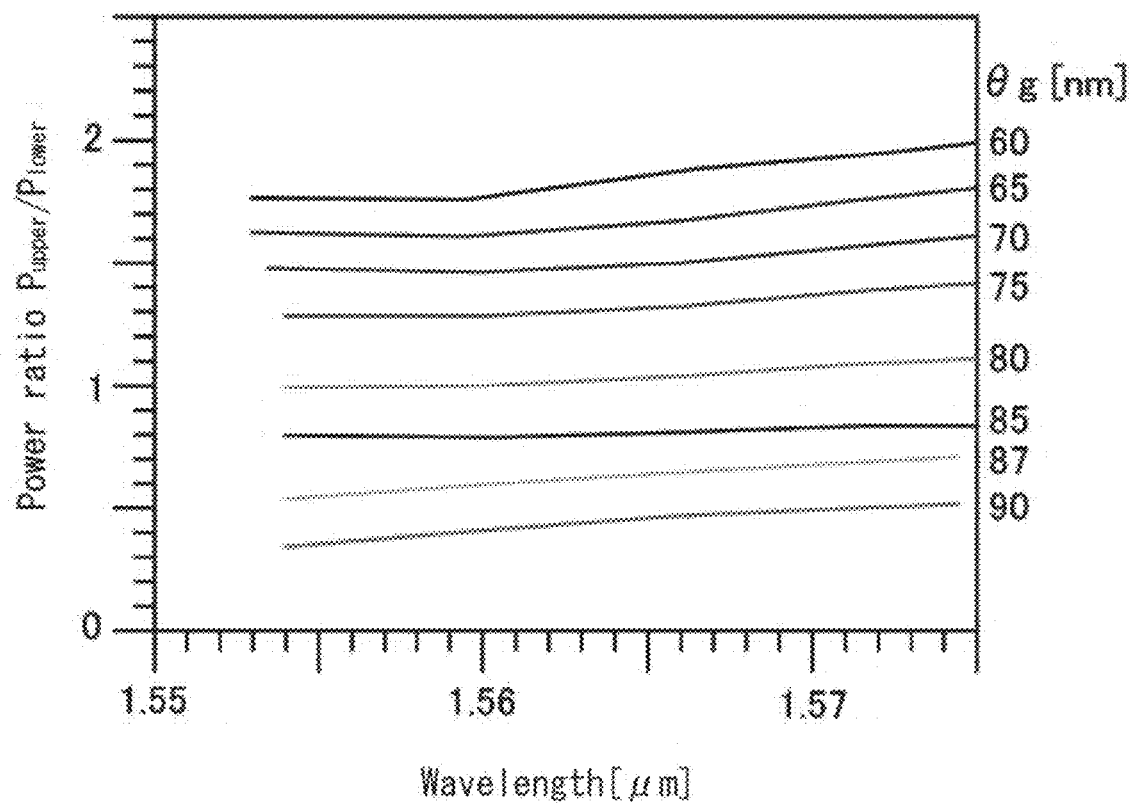
FIG. 10D is a diagram that illustrates characteristic data in the case where an example mode where the side walls of the large-diameter circular holes are inclined walls in the Δ2r dual periodic modulation and the lattice array according to the V-shape arrangement.
Figure 10E:
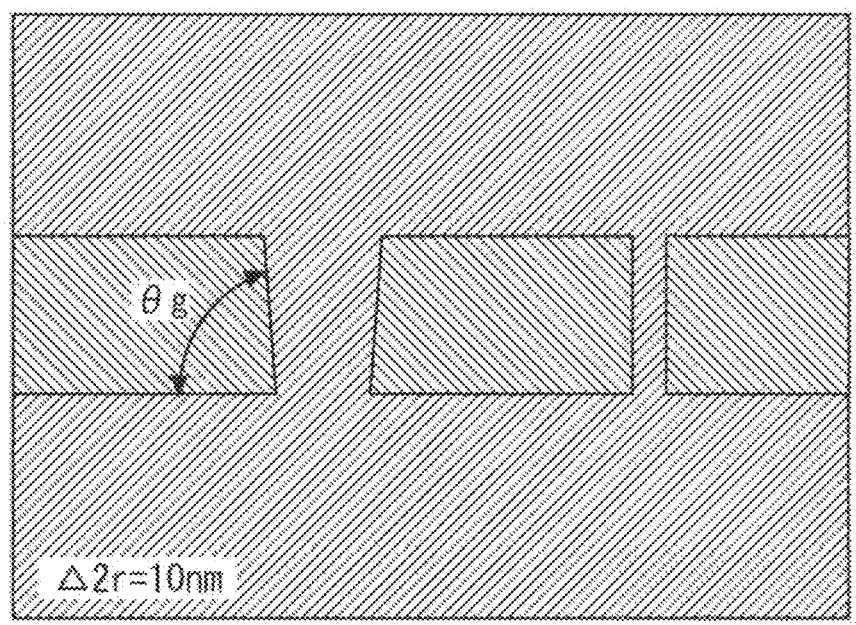
FIG. 10E is a diagram that illustrates characteristic data in the case where an example mode where the side walls of the large-diameter circular holes are inclined walls in the Δ2r dual periodic modulation and the lattice array according to the V-shape arrangement.

FIG. 10A indicates the normalized frequency a/for wave number (2π/a), FIG. 10B indicates the group refractive index for wavelength (m), FIG. 10C indicates the radiation coefficient (scattering loss) (dB/cm) for wavelength (m), and FIG. 10D indicates the ratio of radiation Pupper/Plower for wavelength (m). FIG. 10E illustrates the cross-sectional shape.

According to the characteristics of the ratio of radiation of FIG. 10D, the upward and downward radiation can be deflected when the angle of inclination θg falls within the range of 60° to 75°, but the effect of deflection of the radiation is small as compared with the case where the small-diameter circular holes side wall is configured as an inclined wall.

Also, the angle of inclination θg that satisfies the condition that the radiation coefficient be 10 to 100 dB/cm is 75° to 80°. The ratio of radiation with the angle of inclination of 80° is almost 1:1, and the power of the light beams radiated from above and below will have substantially the same level, so that this is suitable for applications that require light beams of the substantially same level be radiated in the up-and-down direction.

(c) Example mode where an asymmetric shape is applied in both of the small-diameter and large-diameter circular holes FIGS. 11A to 11E illustrate an example mode where the side walls of the small-diameter and the large-diameter circular holes are inclined walls in the Δ2r dual periodic modulation and the lattice array according to the V-shape arrangement. The pieces of characteristic data shown in FIGS. 11A to 11E reflect the case where the diameter difference Δ2r of the Δ2r dual-periodicity diameter is set to 10 nm, and the angle of inclination θg of the inclined wall is changed within the range of 60° to 90°.

Figure 11A:
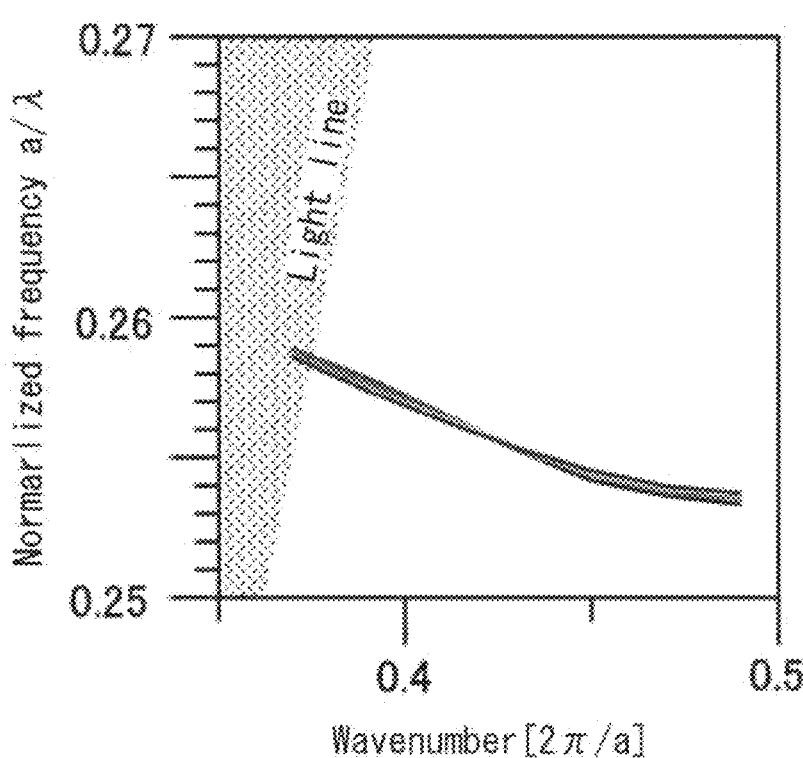
FIG. 11A is a diagram that illustrates characteristic data in the case where an example mode where the side walls of the small-diameter and the large-diameter circular holes are inclined walls in the Δ2r dual periodic modulation and the lattice array according to the V-shape arrangement.
Figure 11B:
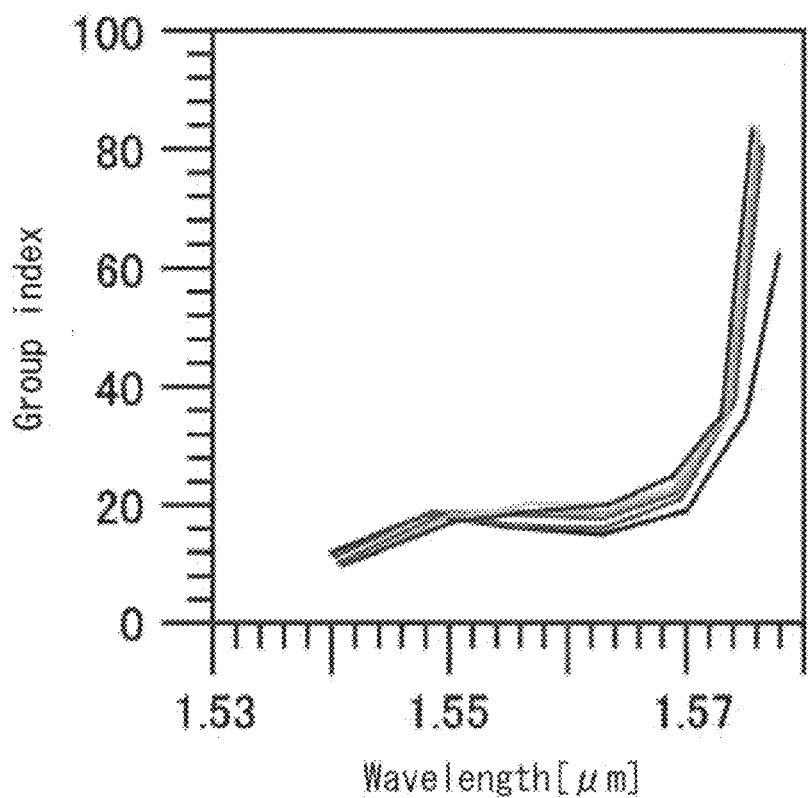
FIG. 11B is a diagram that illustrates characteristic data in the case where an example mode where the side walls of the small-diameter and the large-diameter circular holes are inclined walls in the Δ2r dual periodic modulation and the lattice array according to the V-shape arrangement.
Figure 11C:
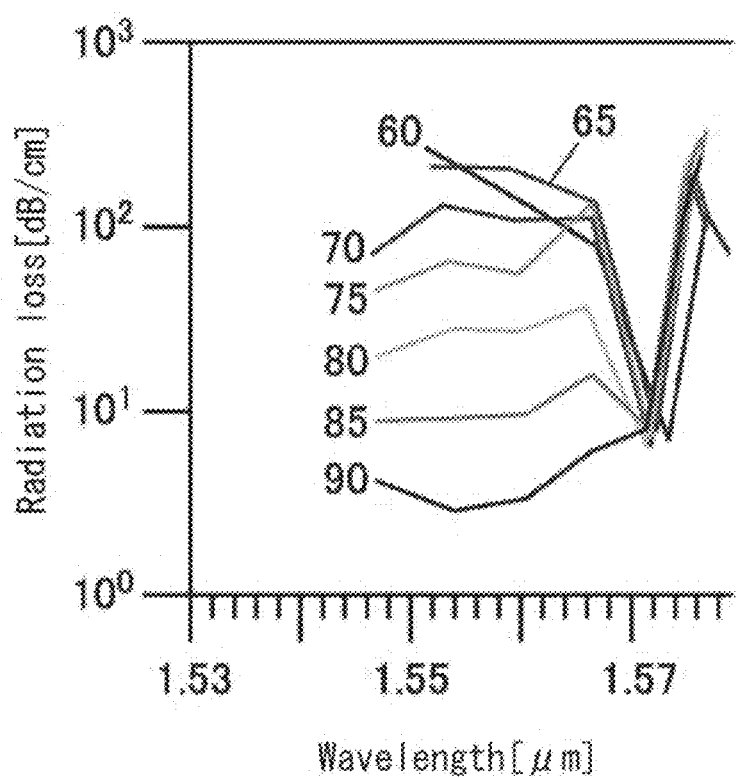
FIG. 11C is a diagram that illustrates characteristic data in the case where an example mode where the side walls of the small-diameter and the large-diameter circular holes are inclined walls in the Δ2r dual periodic modulation and the lattice array according to the V-shape arrangement.
Figure 11D:
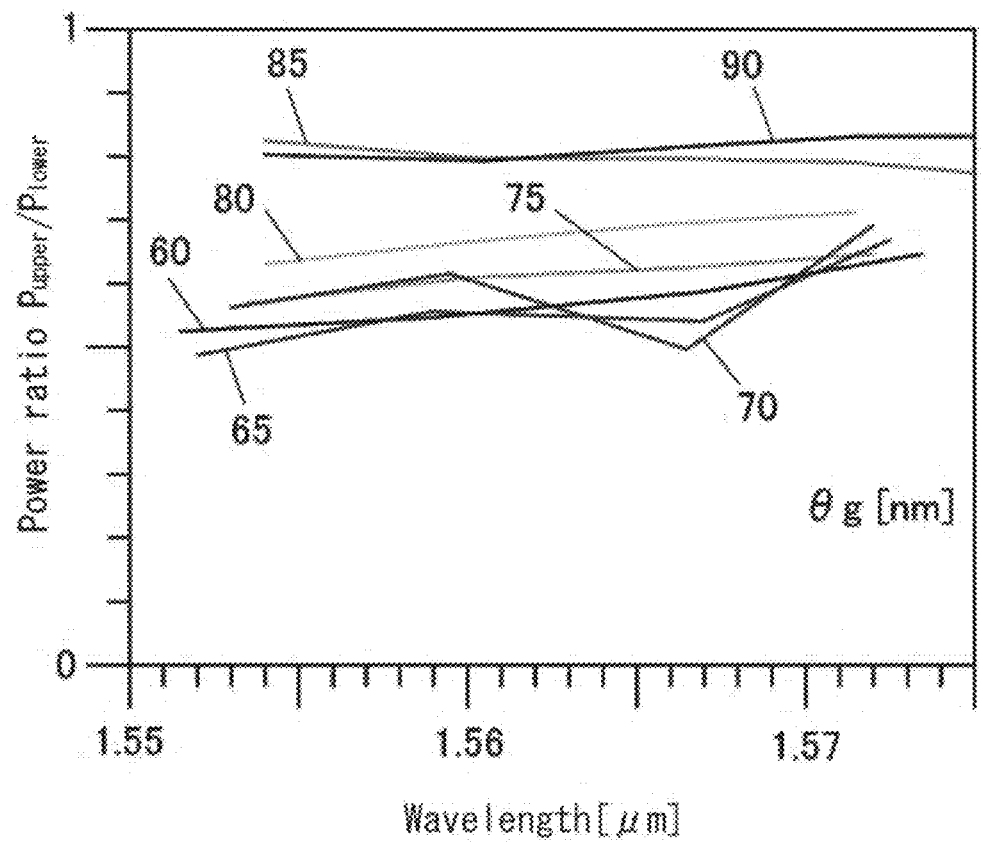
FIG. 11D is a diagram that illustrates characteristic data in the case where an example mode where the side walls of the small-diameter and the large-diameter circular holes are inclined walls in the Δ2r dual periodic modulation and the lattice array according to the V-shape arrangement.
Figure 11E:
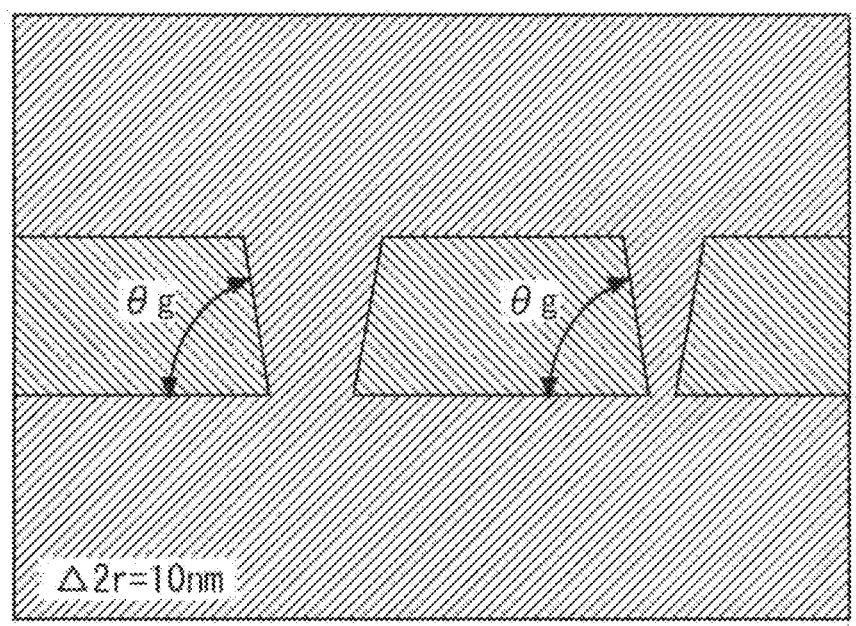
FIG. 11E is a diagram that illustrates characteristic data in the case where an example mode where the side walls of the small-diameter and the large-diameter circular holes are inclined walls in the Δ2r dual periodic modulation and the lattice array according to the V-shape arrangement.

FIG. 11A indicates the normalized frequency a/for wave number (2π/a), FIG. 11B indicates the group refractive index for wavelength (jam), FIG. 11C indicates the radiation coefficient (scattering loss) (dB/cm) for wavelength (jam), FIG. 11D indicates the ratio of radiation Pupper/Plower for wavelength (jam). FIG. 11E illustrates the cross-sectional shape.

According to the characteristics of the ratio of radiation of FIG. 11D, when the angle of inclination θg falls within the range of 60° to 90°, the ratio of radiation is not larger than 1, and radiation takes place mainly downward.

Also, the angle of inclination θg that satisfies the condition that the radiation coefficient be 10 to 100 dB/cm is 70° to 80°. With this angle of inclination, downward radiation twice as large as upward radiation can be obtained, so that this can be applied to the radiation downward. Also, the radiation efficiency in the up direction can be increased by a configuration in which the asymmetric shape is inverted up and down and the side at which the diameter of the opening is small is oriented upward.

5.1b: Mode of Δ2r Dual Periodic Modulation, Transverse-Row Array, and an Inclined Wall In the following description, in the lattice array of Δ2r dual periodic modulation and transverse-row array, in the context of a mode where the side wall defining the asymmetrical cross-sectional shape is an inclined wall, an example will be illustrated in which the asymmetric shape is applied in the small-diameter circular holes.

Figure 12:
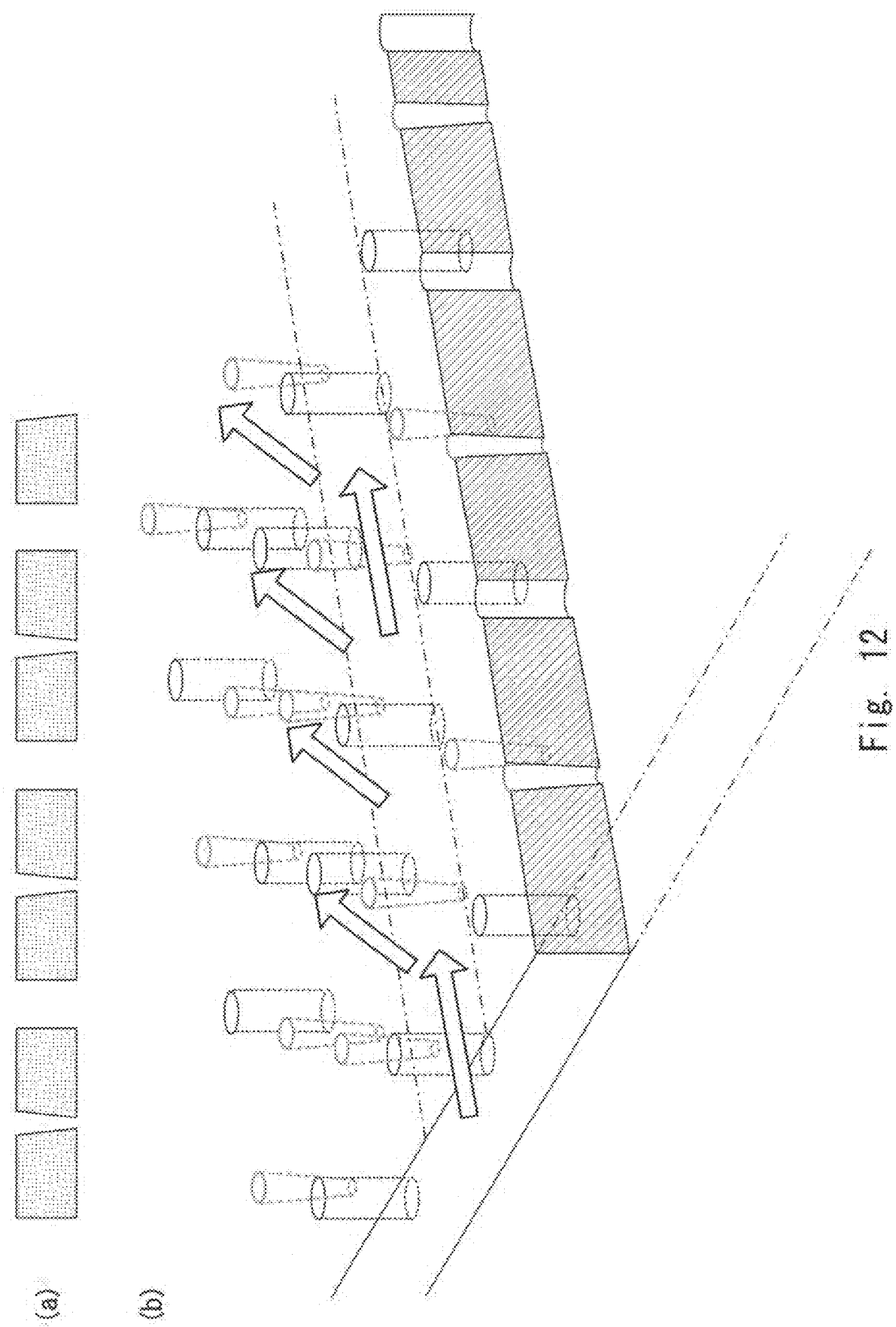
FIG. 12 is a diagram for explanation of an example mode where the side walls of the small-diameter circular holes are inclined walls in the Δ2r dual periodic modulation and the lattice array of transverse-row array.

FIG. 12 illustrates an example mode where the side walls of the small-diameter circular holes are inclined walls in the Δ2r dual periodic modulation and the lattice array of transverse-row array. It should be noted that, in the transverse-row array, the circular holes are triangularly arranged, and the small diameters and large diameters are arranged in the transverse direction orthogonal to the propagation direction.

In FIG. 12, the section (a) is a cross-sectional view, and the section (b) of FIG. 12 is a schematic perspective view. In the example mode of FIG. 12, amongst the circular holes having different diameters in the lattice array that is arranged in the transverse row, the side walls are provided as inclined walls only for the small-diameter circular holes and the cross-sectional shape thereof is made asymmetrical.

Figure 13:
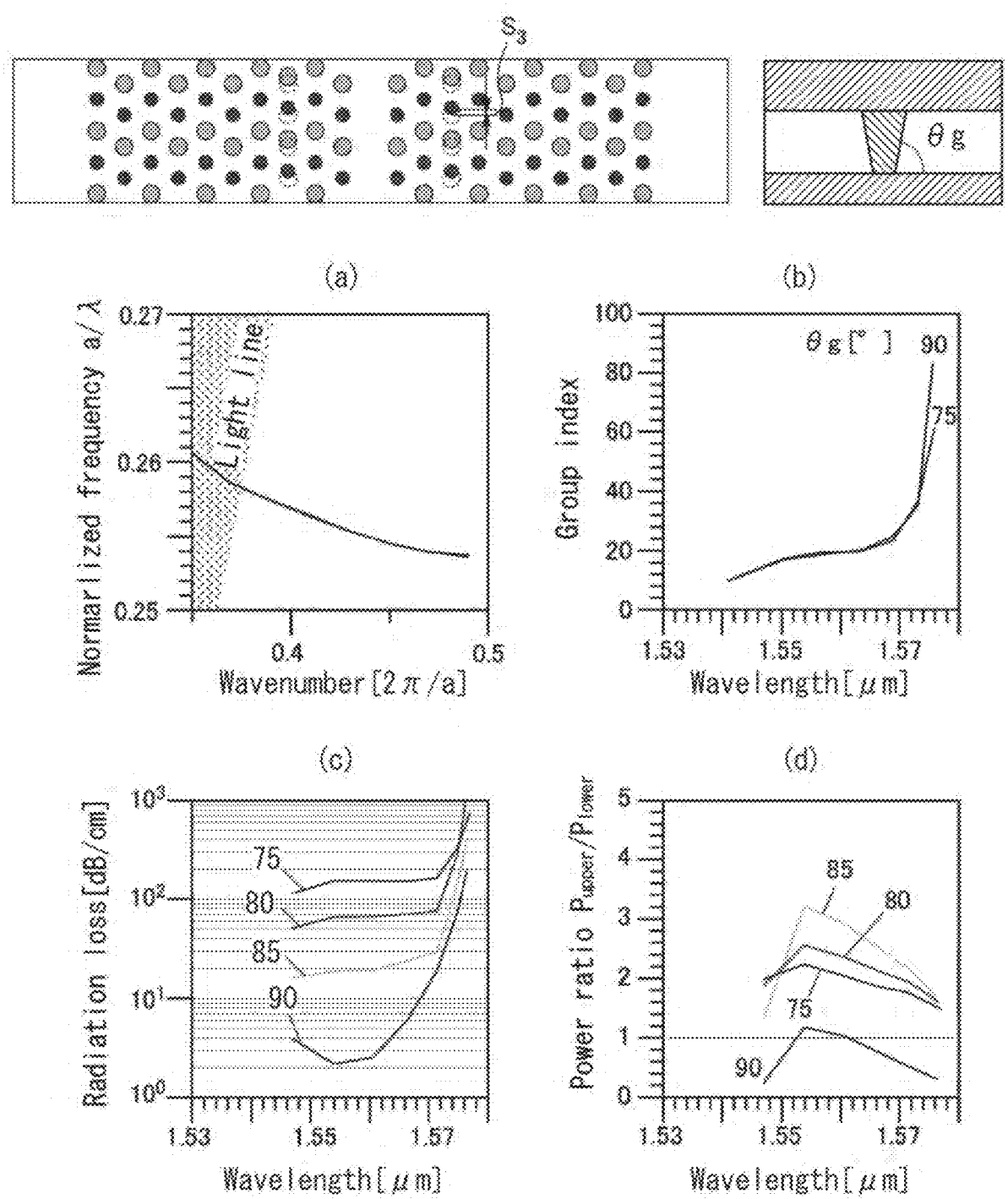
FIG. 13 is a diagram that illustrates characteristic data in the case where the angle of inclination θg is in the range of 75° to 90° in the same structure as in FIG. 12.
Figure 14A:
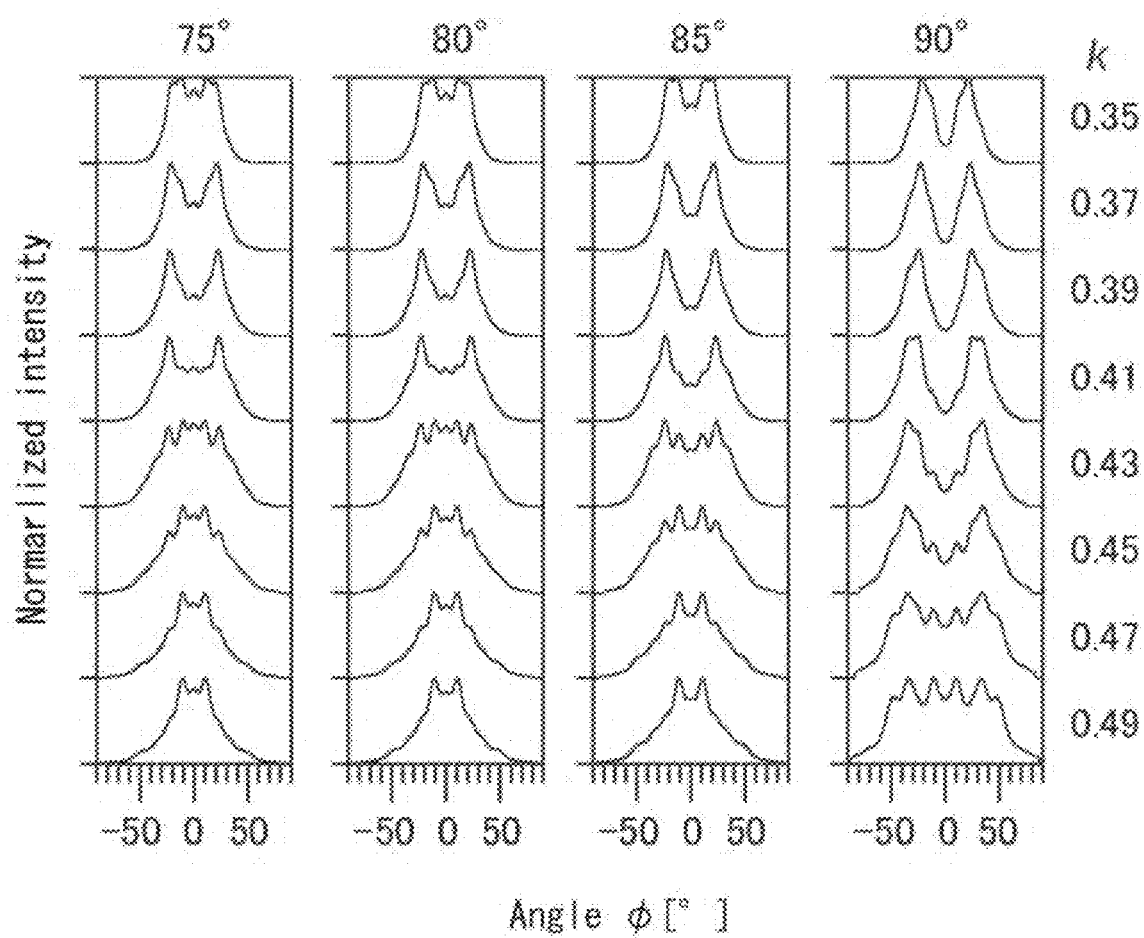
FIG. 14A is a diagram that illustrates characteristic data in the case where the angle of inclination θg is in the range of 75° to 90° in the same structure as in FIG. 12.
Figure 14B:
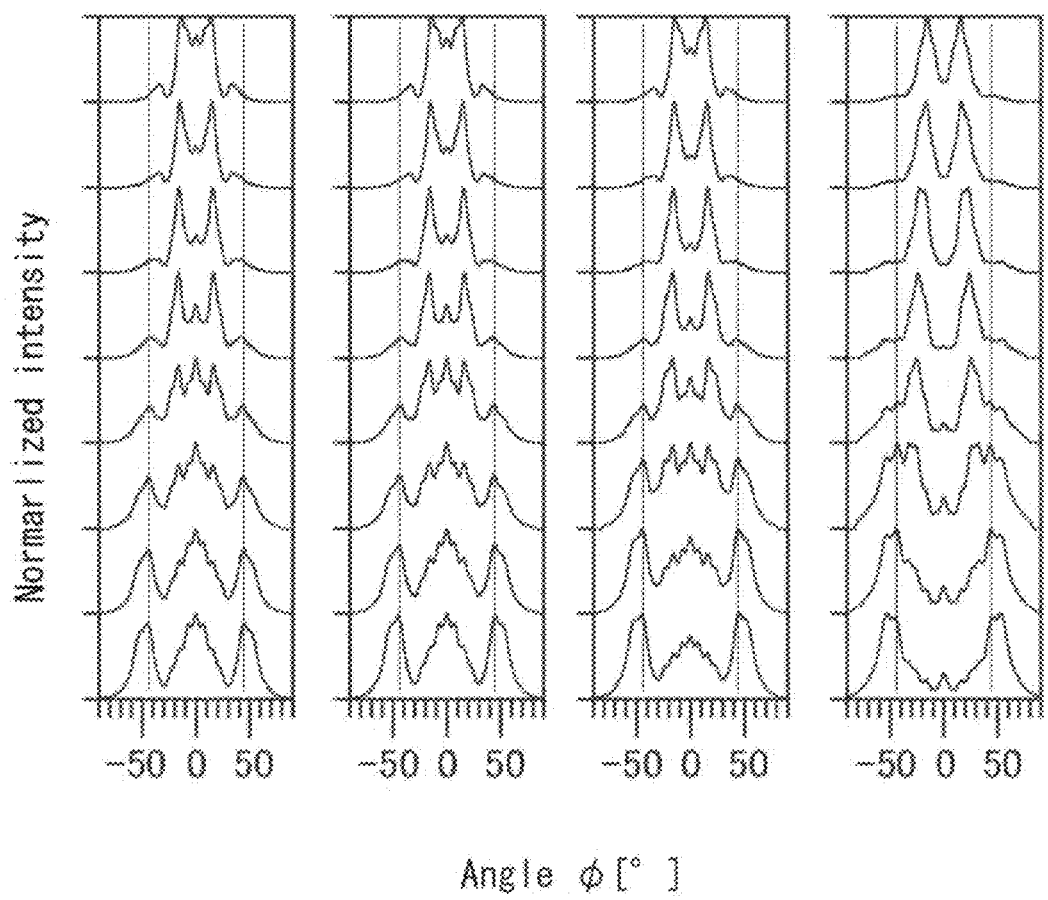
FIG. 14B is a diagram that illustrates characteristic data in the case where the angle of inclination θg is in the range of 75° to 90° in the same structure as in FIG. 12.

FIGS. 13, 14A, and 14B illustrates the case where the angle of inclination θg is in the range of 75° to 90° in the same structure as in FIG. 12, where the section (a) of FIG. 13 indicates the normalized frequency a/for wave number (2π/a), the section (b) of FIG. 13 indicates the group refractive index for wavelength (m), the section (c) of FIG. 13 indicates the radiation coefficient (scattering loss) (dB/cm) for wavelength (m), and the section (d) of FIG. 13 indicates the ratio of radiation Pupper/Plower for wavelength (m). In FIG. 13, the symbol S3 indicates the amount of the lattice shift performed on the third row so as to ensure wideband low dispersion of the slow light. Since this lattice shift amount S3 has no relevance to radiation of light, presence or absence of the lattice shift does not cause significant impact on the effects of the present invention.

According to the characteristics of the ratio of radiation of the section (d) of FIG. 13, a substantially 2:1 ratio can be obtained when the angle of inclination θg falls within the range of 75° to 85°.

FIGS. 14A and 14B illustrate the emitted beam pattern analysis (FFP: Far Field Pattern). FIG. 14A indicates the FFP pattern of the aperture distribution in air in monitor-A in the section (d) of FIG. 5, and FIG. 14B indicates the FFP pattern of the aperture distribution in the cladded material in monitor-B in the section (d) of FIG. 5.

Referring to FIGS. 14A and 14B, if the inclined wall whose angle of inclination θg falls within the range of 75 to 85°, the radiated light beam exhibit the tendency of high monomodality as compared with the case where the angle of inclination θg is 90° (perpendicular wall). It should be noted that "k" of FIGS. 14A and 14B represents the wave number of light, and change of wave number k corresponds to change of the wavelength of the light, or changing the light deflection angle in the traveling direction.

In a mode where a normal transverse-row arrangement is used instead of the V-shape arrangement depicted in FIGS. 7A to 9B, monomodality of the radiated light beam is low as compared with the case of the V-shape arrangement, and the tendency of bimodality is intensified.

5.1c: Mode of Δ2r Dual Periodic Modulation, V-Shape Arrangement, and a Stepped Wall In the following description, an example mode is illustrated where, in the Δ2r dual periodic modulation and the lattice array according to the V-shape arrangement, and the side wall defining the asymmetrical cross-sectional shape is a stepped wall.

FIG. 15 illustrates an example mode where, in the Δ2r dual periodic modulation and the lattice array according to the V-shape arrangement, the side walls of the small-diameter circular holes of the first to tenth rows are stepped walls. Here, as the stepped wall, an example of stepwise asymmetrical cross-sectional shape is illustrated in which two perpendicular walls are coupled by a horizontal wall, and the low refractive index parts has a shape obtained by combination of two cylinders having different diameters in the thickness direction.

In FIG. 15, the section (a) is a cross-sectional view, and the section (b) of FIG. 15 is a schematic perspective view. In the example mode of FIG. 15, in the lattice array that is arranged in the V-shape, amongst the small-diameter and large-diameter circular holes having different diameters, the side walls are provided as stepped walls only for the small-diameter circular holes, and the cross-sectional shape thereof is made asymmetrical.

FIGS. 16A to 16E illustrate, in the same structure as in FIG. 15, an example of the asymmetric stepped side wall and the characteristic data. With regard to this asymmetrical stepped side wall, in the small-diameter circular holes, the diameter on the side where the aperture diameter is small is set to 205 nm and the diameter on the side where the aperture diameter is large is set to 215 nm. In the context of the stepped asymmetrical side wall, a case is illustrated where the depth in the thickness direction of the perpendicular wall on the side where the aperture diameter is small is "tg" and "tg" is 0 nm to 190 nm.

Figure 16A:
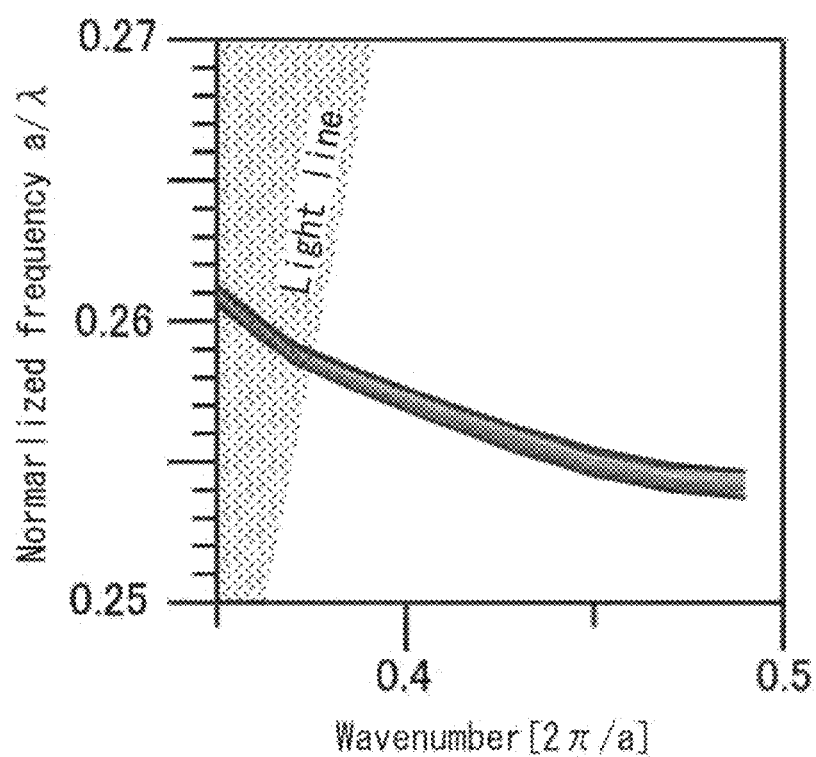
FIG. 16A is a diagram that illustrates an example of the asymmetric stepped side wall and the characteristic data in the same structure as in FIG. 15.
Figure 16B:
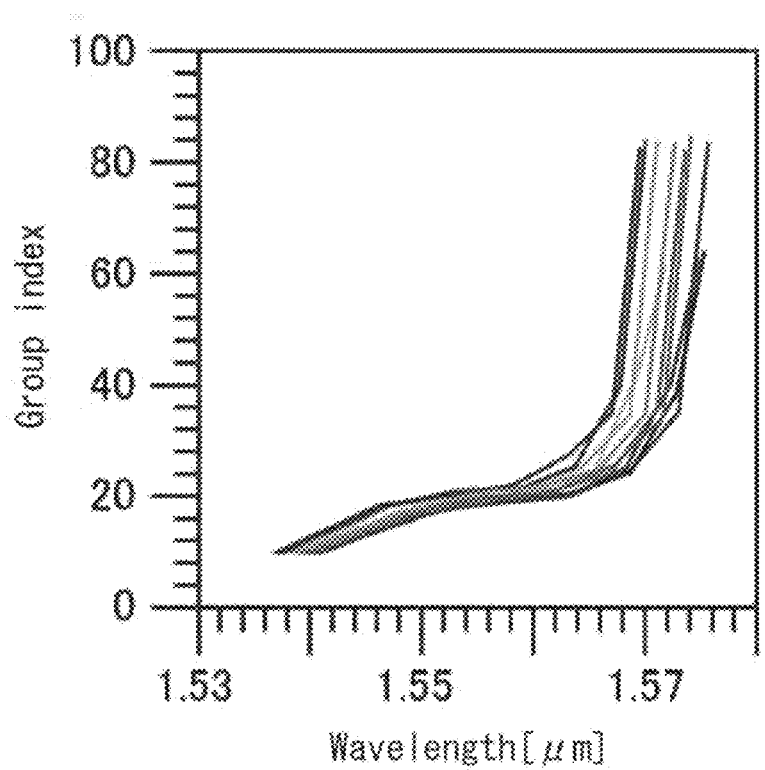
FIG. 16B is a diagram that illustrates an example of the asymmetric stepped side wall and the characteristic data in the same structure as in FIG. 15.
Figure 16C:
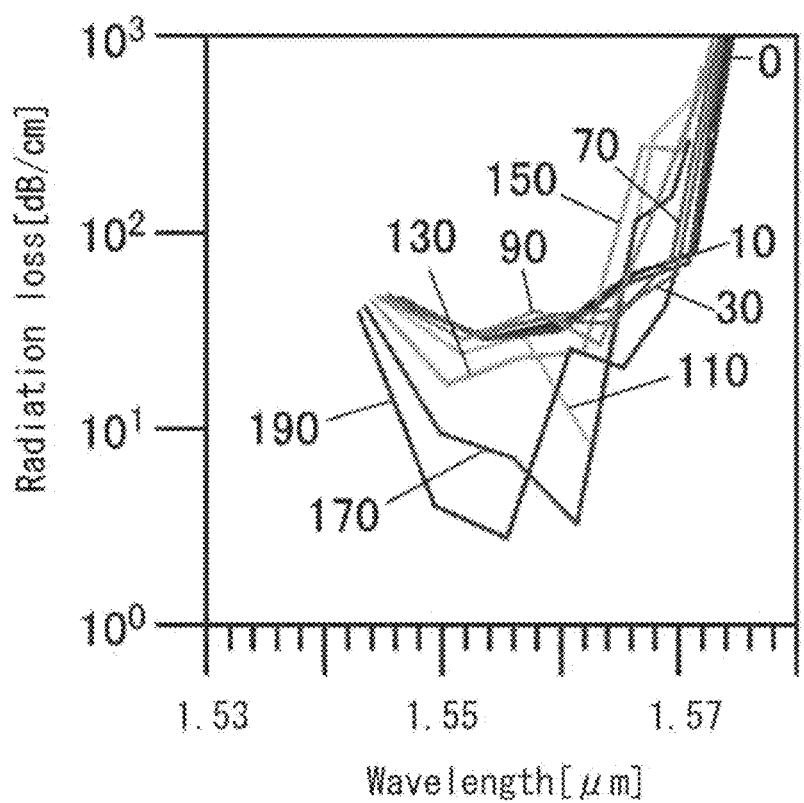
FIG. 16C is a diagram that illustrates an example of the asymmetric stepped side wall and the characteristic data in the same structure as in FIG. 15.
Figure 16D:
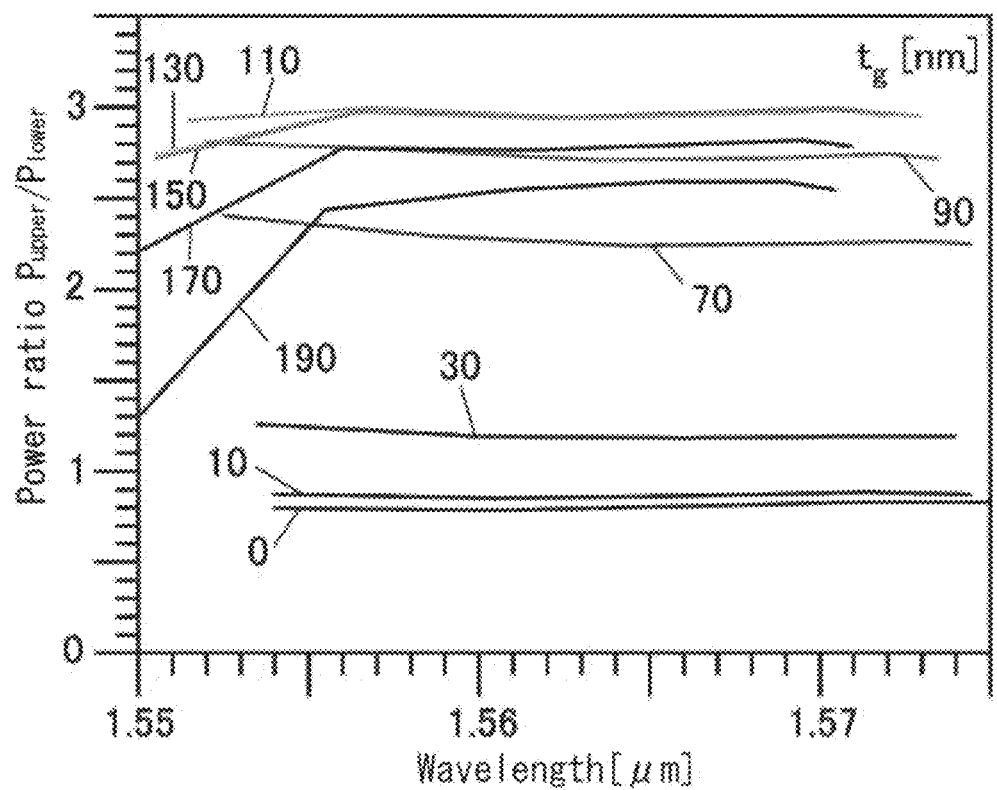
FIG. 16D is a diagram that illustrates an example of the asymmetric stepped side wall and the characteristic data in the same structure as in FIG. 15.
Figure 16E:
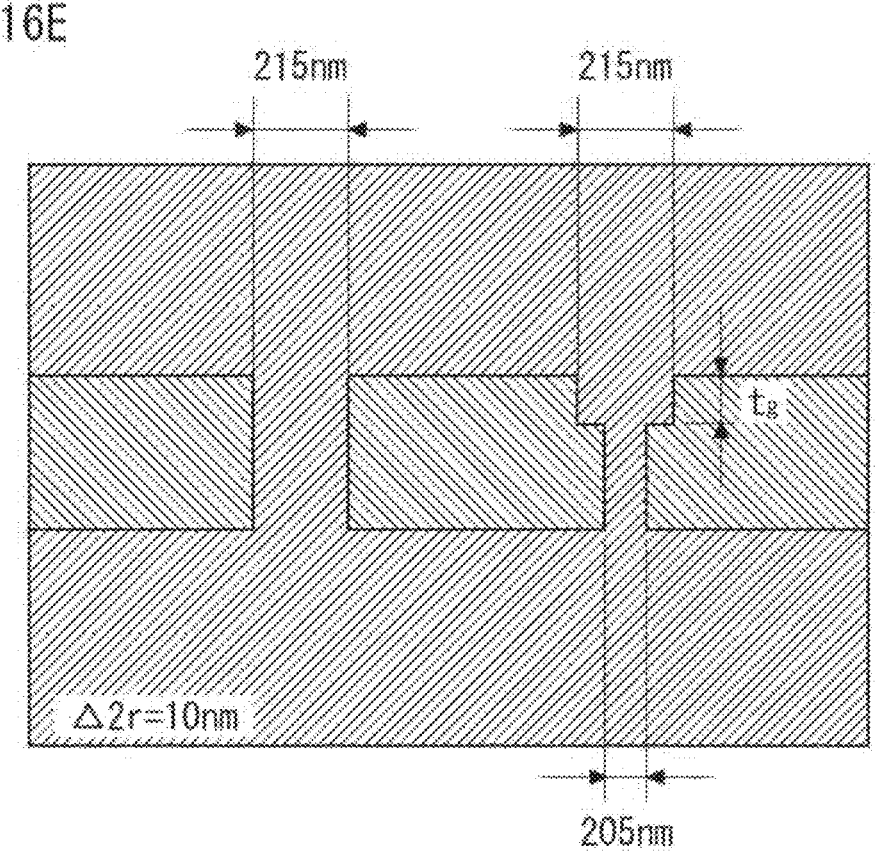
FIG. 16E is a diagram that illustrates an example of the asymmetric stepped side wall and the characteristic data in the same structure as in FIG. 15.

FIG. 16A indicates the normalized frequency a/for wave number (2π/a), FIG. 16B indicates the group refractive index for wavelength (μm), FIG. 16C indicates the radiation coefficient (scattering loss) (dB/cm) for wavelength (μm), and FIG. 16D indicates the ratio of radiation Pupper/Plower for wavelength (μm). FIG. 16E illustrates the cross-sectional shape. According to the characteristics of the ratio of radiation of FIG. 16D, a ratio of substantially 2:1 or higher is obtained when the depth tg falls within the range of 70 nm to 190 nm.

FIGS. 17A to 17E are an example where the small-diameter circular holes is configured through combination of an inclined wall and a perpendicular wall, in the structure in which the cross-sectional shape is stepped. With regard to the small-diameter circular holes, one side in the thickness direction (upper side) is configured as a funnel shaped inclined wall with an angle of inclination θg, and the other side (lower side) is configured as a cylindrical perpendicular wall and thereby a stepped cross-sectional shape is defined. Here, a case is illustrated where the depth of the inclined wall is 70 nm.

Figure 17A:
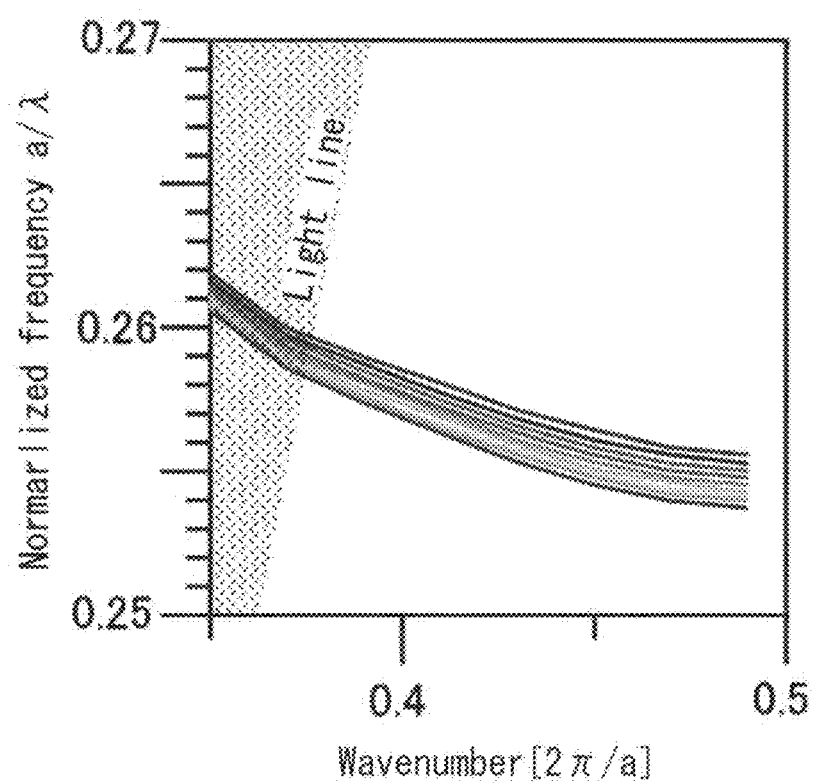
FIG. 17A is a diagram that illustrates an example where, in the context of in a side wall the cross-sectional shape of which is a stepped shape, the side walls of the small-diameter circular holes is configured through combination of an inclined wall and a perpendicular wall.
Figure 17B:
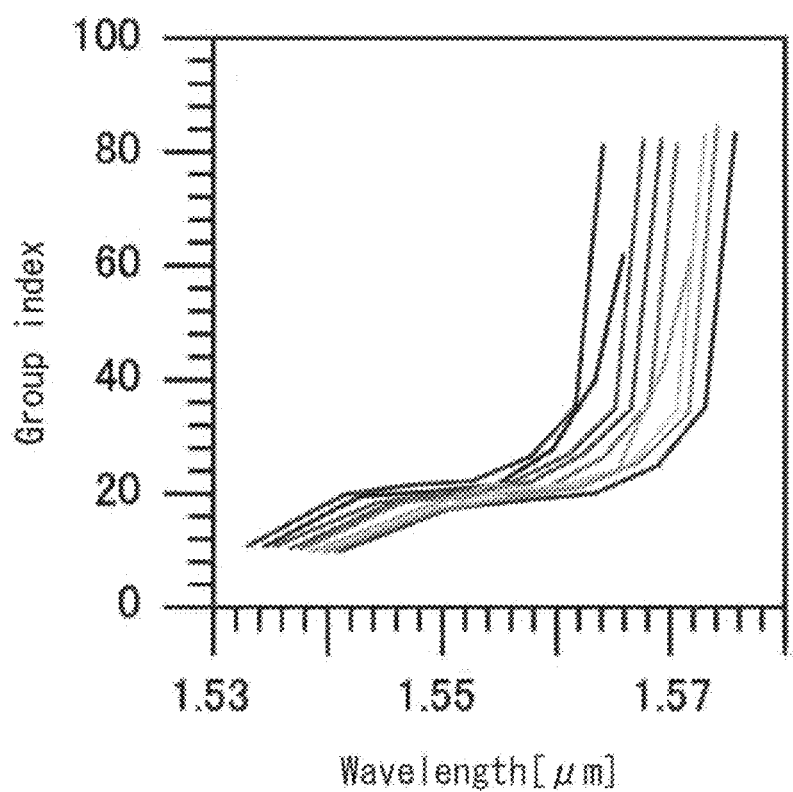
FIG. 17B is a diagram that illustrates an example where, in the context of in a side wall the cross-sectional shape of which is a stepped shape, the side walls of the small-diameter circular holes is configured through combination of an inclined wall and a perpendicular wall.
Figure 17C:
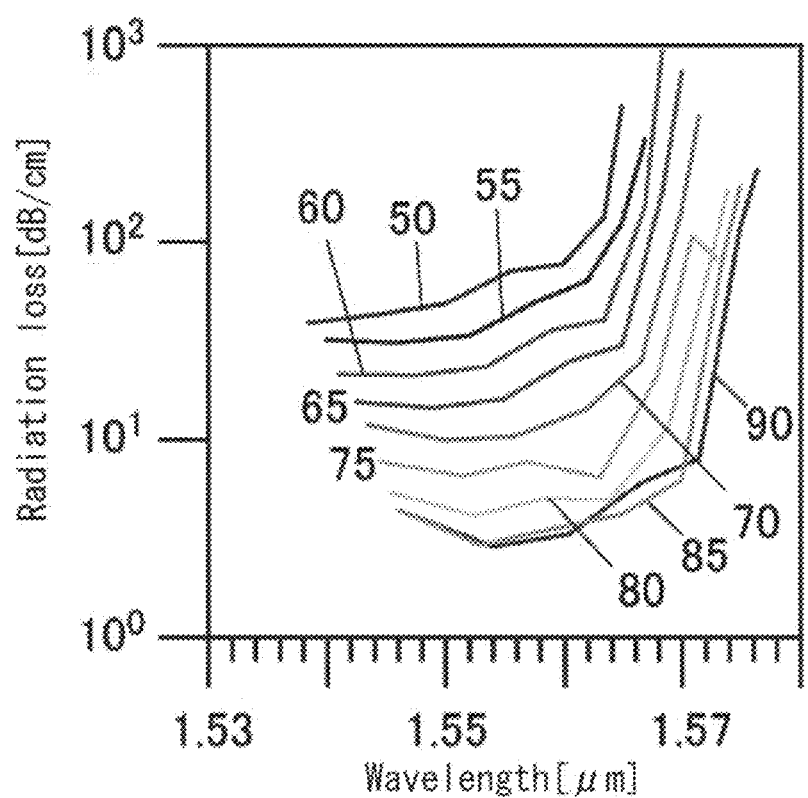
FIG. 17C is a diagram that illustrates an example where, in the context of in a side wall the cross-sectional shape of which is a stepped shape, the side walls of the small-diameter circular holes is configured through combination of an inclined wall and a perpendicular wall.
Figure 17D:
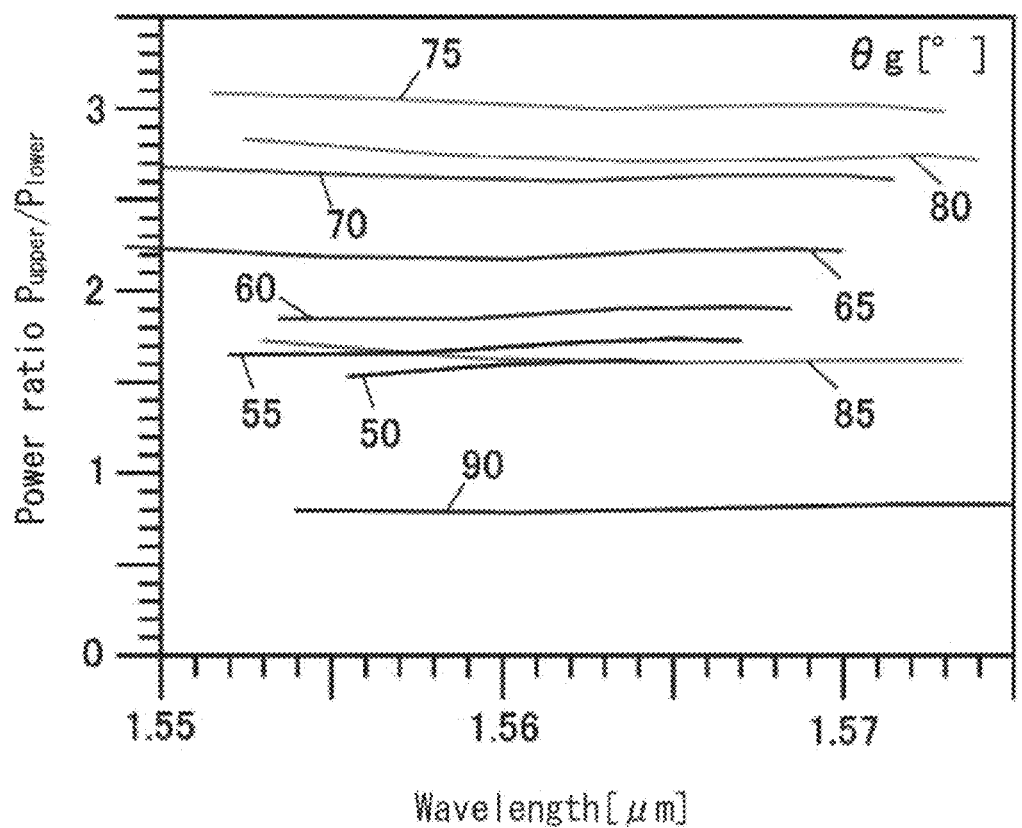
FIG. 17D is a diagram that illustrates an example where, in the context of in a side wall the cross-sectional shape of which is a stepped shape, the side walls of the small-diameter circular holes is configured through combination of an inclined wall and a perpendicular wall.
Figure 17E:
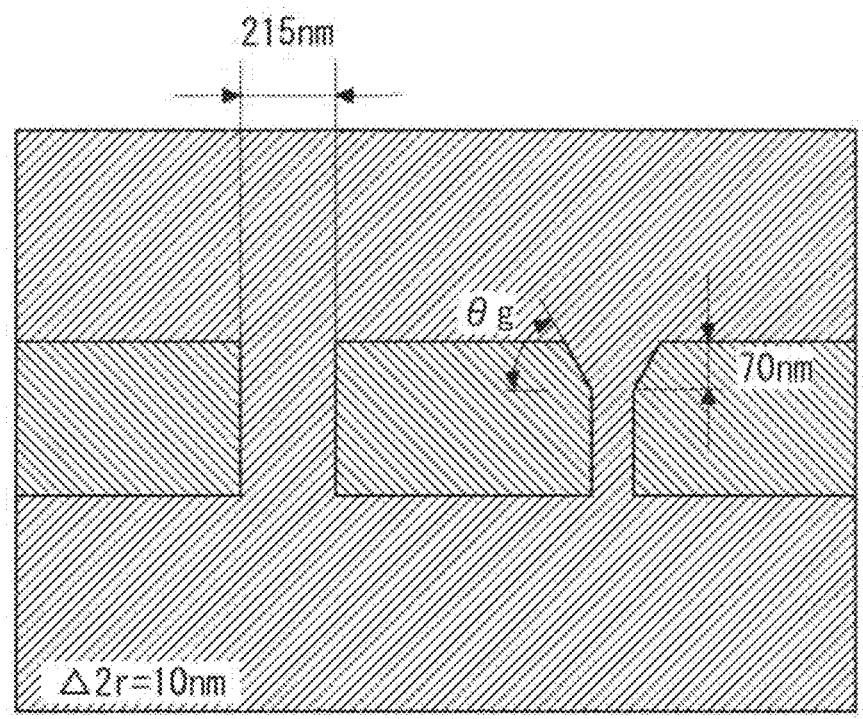
FIG. 17E is a diagram that illustrates an example where, in the context of in a side wall the cross-sectional shape of which is a stepped shape, the side walls of the small-diameter circular holes is configured through combination of an inclined wall and a perpendicular wall.

FIG. 17A indicates the normalized frequency a/k for wave number (2π/a), FIG. 17B indicates the group refractive index for wavelength (μm), FIG. 17C indicates the radiation coefficient (scattering loss) (dB/cm) for wavelength (μm), and FIG. 17D indicates the ratio of radiation Pupper/Plower for wavelength (μm). FIG. 17E illustrates the cross-sectional shape.

According to the characteristics of the ratio of radiation of FIG. 17D, a ratio of substantially 1.5:1 or higher can be obtained when the angle of inclination θg is 50° to 85° and, when the angle of inclination θg is 65° to 80°, a ratio of substantially 2:1 or higher is obtained.

5.2: Mode of Δa Dual Periodic Modulation (First Row), V-Shape Arrangement, and an Inclined Wall In the following description, an example mode is illustrated where, in the lattice array according to the V-shape arrangement, one periodic array is positionally deviated relative to the other periodic array in the first row, and the long and short grating pitches are repeated to configure the Δa dual periodic modulation, in addition to which, with regard to the circular holes of one periodic array of the Δa dual periodic modulation, the side wall defining the asymmetrical cross-sectional shape is provided as an inclined wall.

Referring to FIG. 18, Δa dual periodic modulation is performed only for the first low close to the waveguide, and the circular holes are arranged with repeated long and short grating pitches and, further, in the first row, the side walls of only the positionally-deviated circular holes or only the circular holes that were not positionally-deviated are provided as an inclined wall. Referring to FIG. 18, the section (a) is a cross-sectional view, and the section (b) of FIG. 18 is a schematic perspective view. In the example mode of FIG. 18, amongst the same-diameter circular holes arranged in the first row with the long and short grating pitches in the lattice array that is arranged in the V-shape, the side wall is configured as an inclined wall and the cross-sectional shape thereof is made asymmetrical only for the circular holes of one periodic array.

Figure 19:
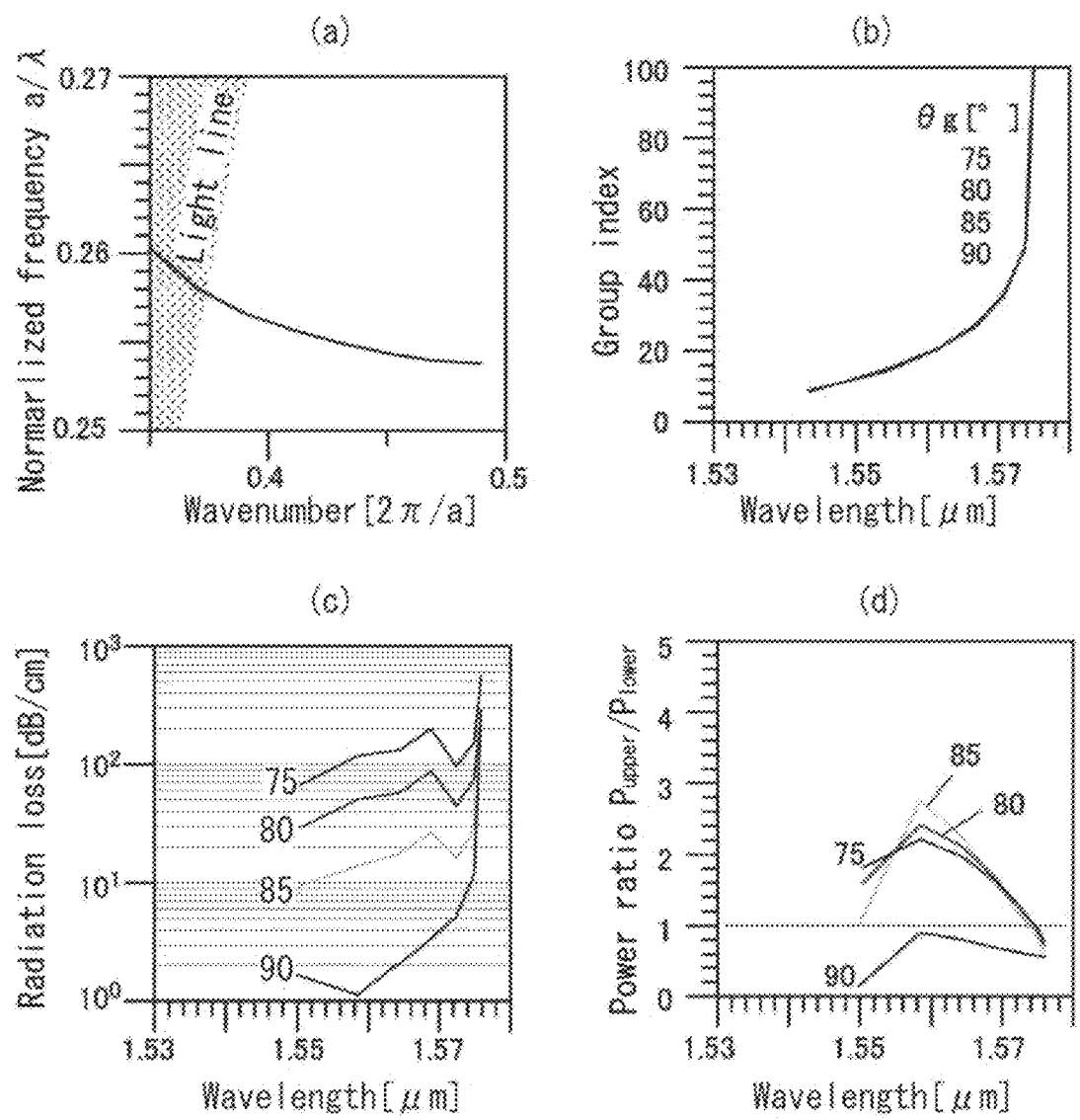
FIG. 19 is a diagram that illustrates characteristic data in the case where the angle of inclination θg is in the range of 75° to 90° in the same structure as in FIG. 18.
Figure 20A:
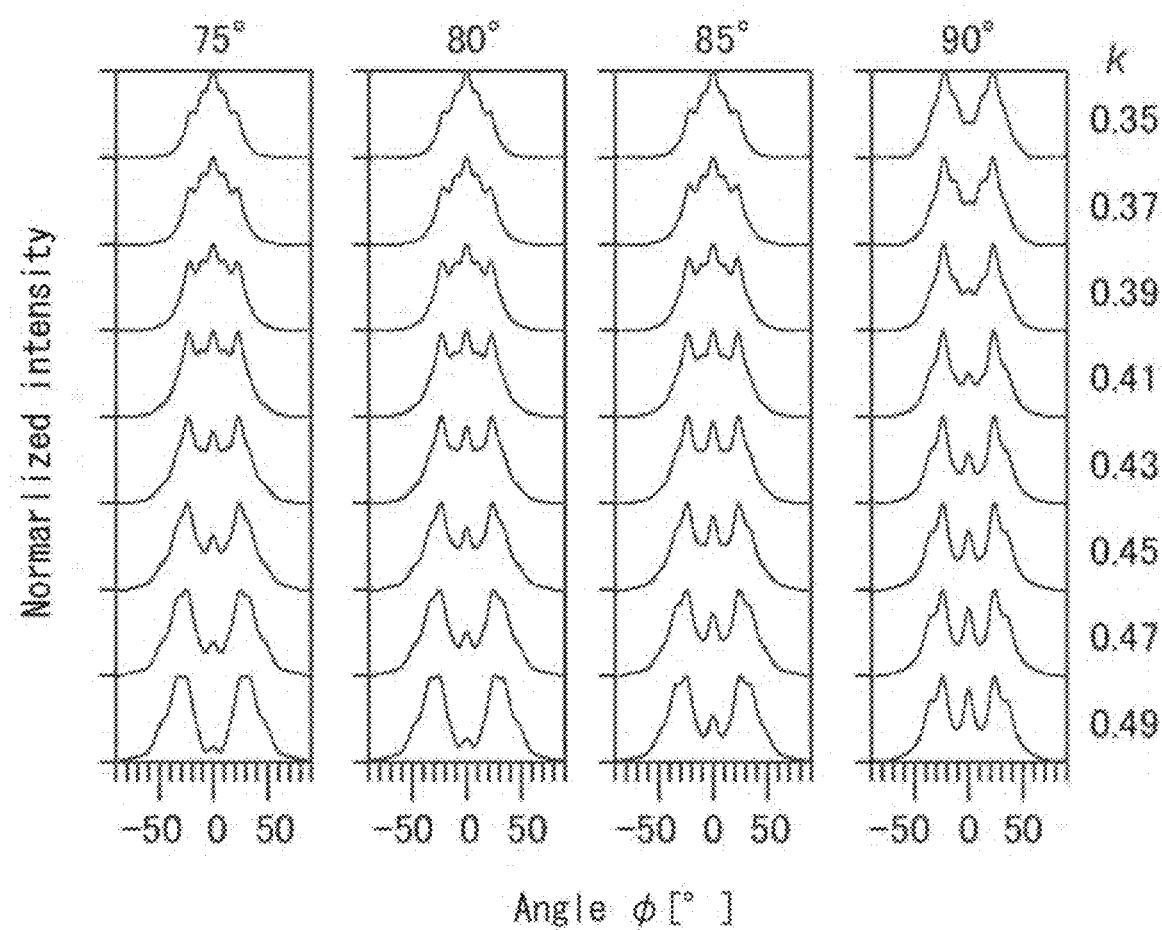
FIG. 20A is a diagram that illustrates characteristic data in the case where the angle of inclination θg is in the range of 75° to 90° in the same structure as in FIG. 18.
Figure 20B:
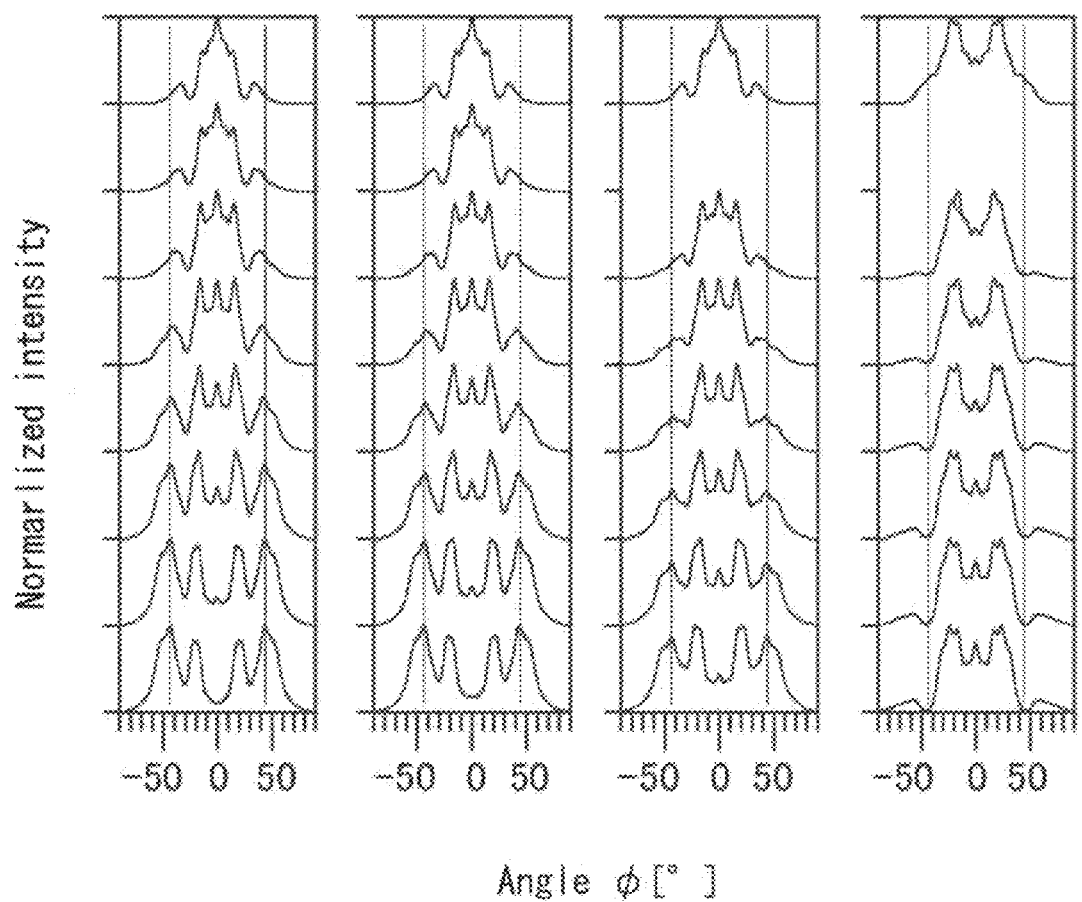
FIG. 20B is a diagram that illustrates characteristic data in the case where the angle of inclination θg is in the range of 75° to 90° in the same structure as in FIG. 18.

FIGS. 19, 20A, and 20B illustrate the cases where the angle of inclination θg is in the range of 75° to 90° in the same structure as in FIG. 18, where the section (a) of FIG. 19 indicates the normalized frequency a/k for wave number (2π/a), the section (b) of FIG. 19 indicates the group refractive index for wavelength (μm), the section (c) of FIG. 19 indicates the radiation coefficient (scattering loss) (dB/cm) for wavelength (μm), and the section (d) of FIG. 19 indicates the ratio of radiation Pupper/Plower for wavelength (μm).

According to the characteristics of the ratio of radiation of the section (d) of FIG. 19, a ratio of substantially 1:1 or higher can be obtained when the angle of inclination θg falls within the range of 75° to 85°.

FIGS. 20A and 20B illustrate the emitted beam pattern analysis (FFP: Far Field Pattern). FIG. 20A indicates the FFP pattern of the aperture distribution in air in monitor-A in the section (d) of FIG. 5, FIG. 20B indicates the FFP pattern of the aperture distribution in the cladded material in monitor-B in the section (d) of FIG. 5.

According to FIGS. 20A and 20B, in the case where the inclined wall whose angle of inclination θg falls within the range of 75 to 85°, the radiated light beams exhibit the tendency of monomodality as compared with the case where the angle of inclination θg is 90° (perpendicular wall). It should be noted that "k" of FIGS. 20A and 20B represents the wave number of light, change of which corresponds to the wavelength of the light is being changed or changing the deflection angle of the light in the traveling direction.

5.3: Range of Contribution of Asymmetry to Radiation

Next, in the configuration where an asymmetrical cross-sectional shape is provided by an inclined wall for the photonic waveguide subjected to the dual periodic modulation, the range of the arrangements that contribute to the radiation will be described.

Figure 21:
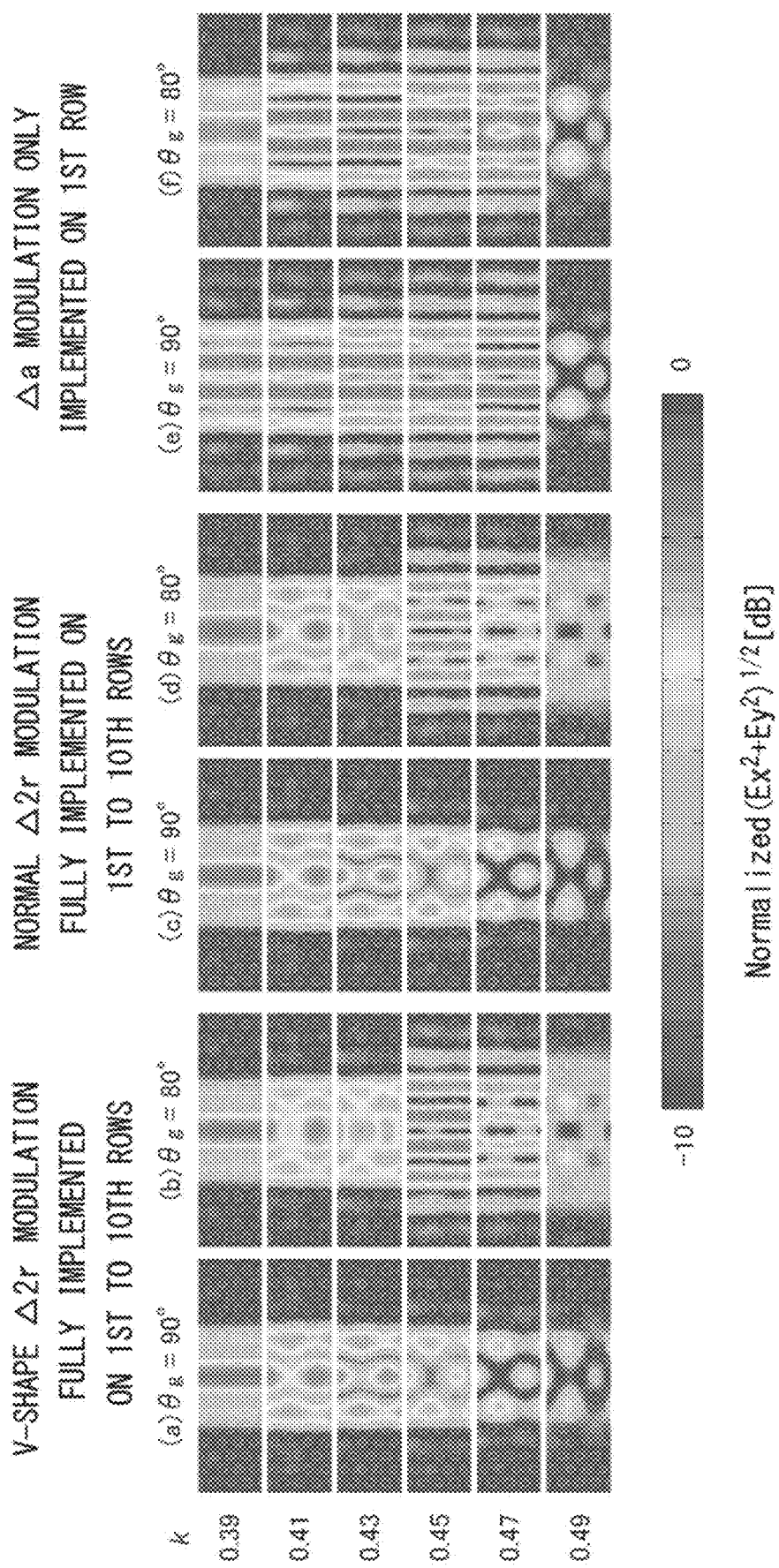
FIG. 21 is a diagram that illustrates the intensity distribution of radiation components in the case where the first to tenth rows of the lattice array is configured for dual periodic modulation, the side walls of the small-diameter circular holes are provided as inclined walls so as to define an asymmetrical cross-sectional shape.

FIG. 21 illustrates the intensity distribution of radiation components in the case where the first to tenth rows of the lattice array is configured as that which is subjected to the dual periodic modulation, where the side walls of the small-diameter circular holes are provided as inclined walls so as to define an asymmetrical cross-sectional shape.

In FIG. 21, the sections (a) and (b) illustrate the case where the first to tenth rows in the lattice array according to the V-shape arrangement are subjected to the Δ2r dual periodic modulation and the angle of inclination θg is set to 900 which corresponds to an angle of a perpendicular wall, and the case where the angle of inclination θg is set to 80°, the sections (c) and (d) of FIG. 21 illustrate the case where the first to tenth rows in the lattice array of normal transverse-row arrangement are subjected to the Δ2r dual periodic modulation and the angle of inclination θg is set to 900 which corresponds to an angle of a perpendicular wall, and the case where the angle of inclination θg is set to 80°, the sections (e) and (f) of FIG. 21 illustrate the case where only the first row in the lattice array is subjected to Δa dual periodic modulation and the angle of inclination θg is set to 90° which corresponds to an angle of a perpendicular wall, and the case where the angle of inclination θg is set to 80°.

The electric field strength distribution of radiation components of FIG. 21 is obtained by performing inverse Fourier transform on the intensity of the radiated beams, and thereby converting them into the mode pattern on the waveguide. This mode pattern serves as an indicator for determining in which of the modes the components contributing to the radiated beam are found. In every case of the sections (a) to (f) of FIG. 21, the mode patterns exist in the range of about three rows among the linear rows of the circular holes from the central waveguide to the outside, and this figure indicates that the dual periodic modulation work effectively within this range. It should be noted that, in FIG. 21, as the mode pattern where the wave number k is 0.39 and 0.41 are out of the range of use as a light deflector, the mode patterns where the wave number k is 0.43 to 0.49 are meaningful in the context of the light deflector.

As such, according to the electric field strength distribution of radiation components of the sections (a) to (f) of FIG. 21, the linear row in the propagation direction from the linear defect forming the waveguide to the third row contributes to the radiation without depending on the angle of inclination θg of the side wall.

(6. Monomodality)

In the following description, the beam shape of the radiated light beams resulting from the asymmetrical cross-sectional shape that is asymmetrical with respect to the thickness direction of the low refractive index parts will be described in the context of the cases of the Δ2r dual periodic modulation and the Δa dual periodic modulation.

6a: Δ2r Dual Periodic Modulation

Figure 22:
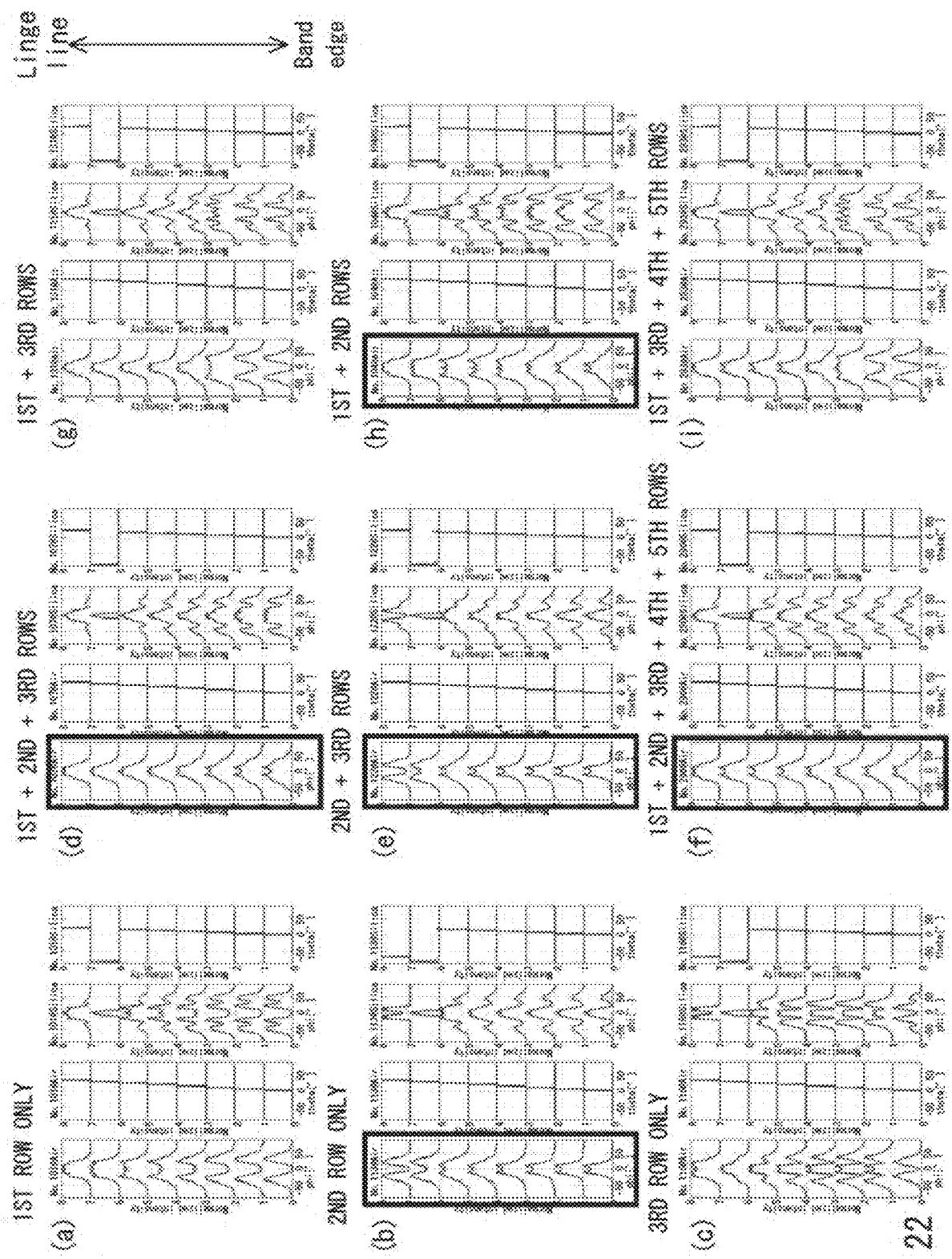
FIG. 22 is a diagram that illustrates the beam pattern observed when the rows of the circular holes of the lattice array is configured for Δ2r dual periodic modulation, and the angle of inclination θg of the side walls of the small-diameter circular holes is inclined by 85°.

FIG. 22 indicates the beam pattern (normalized intensity of the radiated light) observed when the Δ2r dual periodic modulation is introduced for various circular hole rows in the lattice array of circular holes and the angle of inclination θg of the side walls of the small-diameter circular holes is inclined by 85°. FIG. 22 illustrates, as the rows to which Δ2r dual periodic modulation is introduced, the examples of (a) only the first row, (b) only the second row, (c) only the third row, (d) the first to third rows, (e) the second and third rows, (f) the first to fifth rows, (g) the first and third rows, (h) the first and second rows, and (i) the first row as well as the third to fifth rows. In the sections (a) to (i) of FIG. 22, the left two subsections indicate the aperture distribution in air and the right two subsections indicate the aperture distribution in the cladded material. Also, in the sections (a) to (i) of FIG. 22, the normalized intensities of the radiated light in the z-direction and in the x-direction in FIG. 5 are indicated by phi and theta, respectively.

It should be noted that, among the beam patterns depicted in FIG. 22, as the radiation conditions of the first and second beam patterns from top are out of the range of use as a light deflector, the third and subsequent beam patterns from top are available.

In these examples, the examples of (b), (d), (e), and (f) enclosed by the frames indicate the radiated light beams exhibiting relatively strong monomodality. All of these examples depict the case where the dual periodic modulation is introduced on the second circular hole row.

Figure 23:
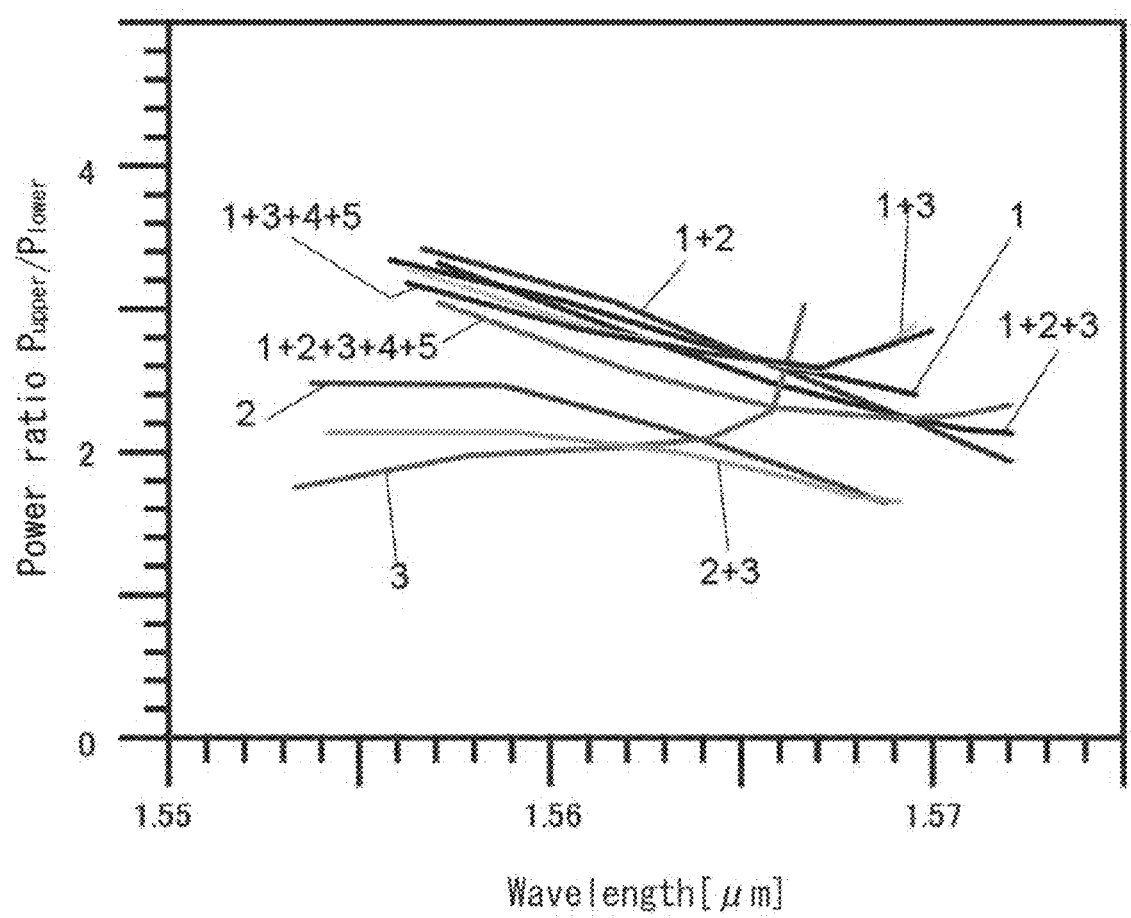
FIG. 23 is a diagram that illustrates ratio of radiation with respect to wavelength Pupper/Plower in relation to the examples illustrated in FIG. 22.

FIG. 23 illustrates, in the context of the examples illustrated in FIG. 22, the ratio of radiation with respect to wavelength Pupper/Plower. FIG. 23 indicates that, in the context of every configuration, the ratio of radiation is 2:1 to 3:1, and upward radiation about twice to three times as large as that can be obtained.

Also, according to FIGS. 22 and 23, by introduction of the dual periodic modulation of the second-row circular hole row, the ratio of radiation can be increased and unidirectional radiation can be improved while maintaining the beam shape at a favorable level.

6b: Δa Dual Periodic Modulation

Figure 24:
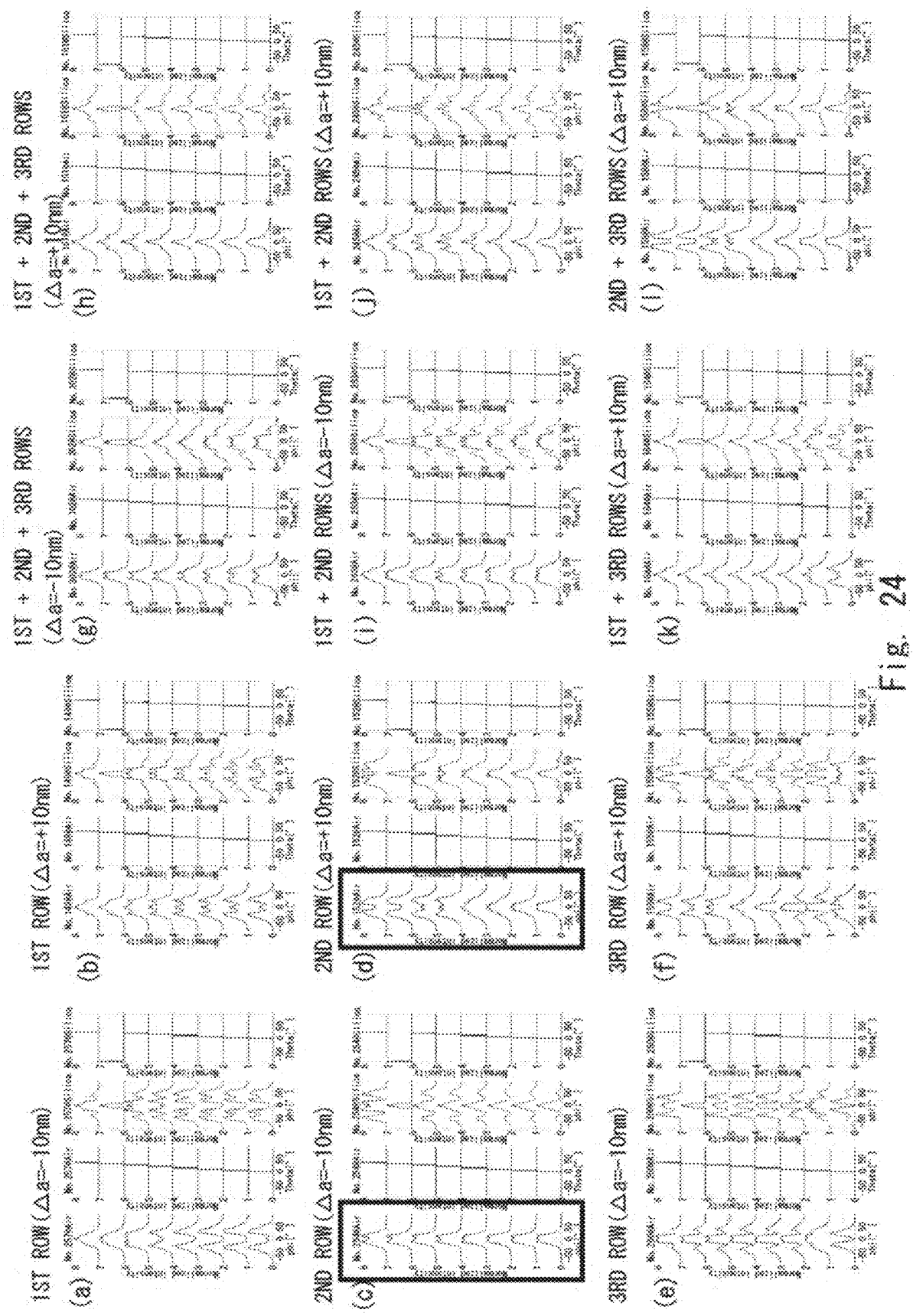
FIG. 24 is a diagram that illustrates the beam pattern observed when the rows of the circular holes of the lattice array is configured for Δa dual periodic modulation and the angle of inclination θg of the side walls of the small-diameter circular holes is inclined by 85°.

FIG. 24 illustrates the beam pattern observed when, in the lattice array of circular holes, Δa dual periodic modulation is introduced to various circular hole rows and the angle of inclination θg of the side walls of the small-diameter circular holes is set to 85°.

FIG. 24 illustrates, as the rows of introduction of Δa dual periodic modulation, the examples of (a) the first row (Δa=−10 nm), (b) the first row (Δa=+10 nm), (c) the second row (Δa=−10 nm), (d) the second row (Δa=+10 nm), (e) the third row (Δa=−10 nm), (f) the third row (Δa=+10 nm), (g) the first to third rows (Δa=−10 nm), (h) the first to third rows (Δa=+10 nm), (i) the first and second rows (Δa=−10 nm), (j) the first and second rows (Δa=+10 nm), (k) the first and third rows (Δa=+10 nm), and (l) the second and third rows (Δa=+10 nm).

In the sections (a) to (l) of FIG. 24, the left two subsections indicates the aperture distribution in air and the right two subsections indicate the aperture distribution in the cladded material, and the Δa shift direction is defined with the propagation direction used as the positive side. Also, in the sections (a) to (i) of FIG. 24, the normalized intensities of the radiated light in the z-direction and in the x-direction in FIG. 5 are indicated by φ (phi) and θ (theta), respectively. It should be noted that, among the beam patterns depicted in FIG. 24, as radiation conditions of the first and second beam patterns from top are out of the range of use as a light deflector, the third and subsequent beam patterns from top are available.

In these examples, the example where the dual periodic modulation is introduced for only the second row of the sections (c) and (d) enclosed by the frames indicates that this is close to radiated light beams having monomodality less dependent upon the wave number.

(7. Multiple Period Adjustment by Dual-Periodic Adjustment Introduced to Even Rows)

In the following description, multiple period adjustment will be described where, in addition to the above-described Δ2r dual-periodic adjustment or the Δa dual-periodic adjustment, the aperture diameter of the even-number lattice rows in the propagation direction is dual-periodically adjusted.

7a: Mode of Δ2r Dual Periodic Modulation, Inverted-V-Shape Arrangement, and Dual Periodicity Introduced to Even Rows FIGS. 25, 26A, and FIG. 26B indicate examples of multiple periodic modulation in which, in the Δ2r dual periodic modulation and the lattice array of inverted the V-shape arrangement, the side walls of the small-diameter circular holes is provided as an inclined wall having an angle of inclination θg of 80° and, further, the aperture diameter of the even-number lattice rows in the propagation direction is dual-periodically adjusted.

In FIG. 25, the section (a) indicates the normalized frequency a/k for wave number (2π/a), the section (b) indicates the group refractive index for wavelength (m), the section (c) indicates the radiation coefficient (scattering loss) (dB/cm) for wavelength (m), the section (d) indicates the ratio of radiation Pupper/Plower for wavelength (m).

Figure 26A:
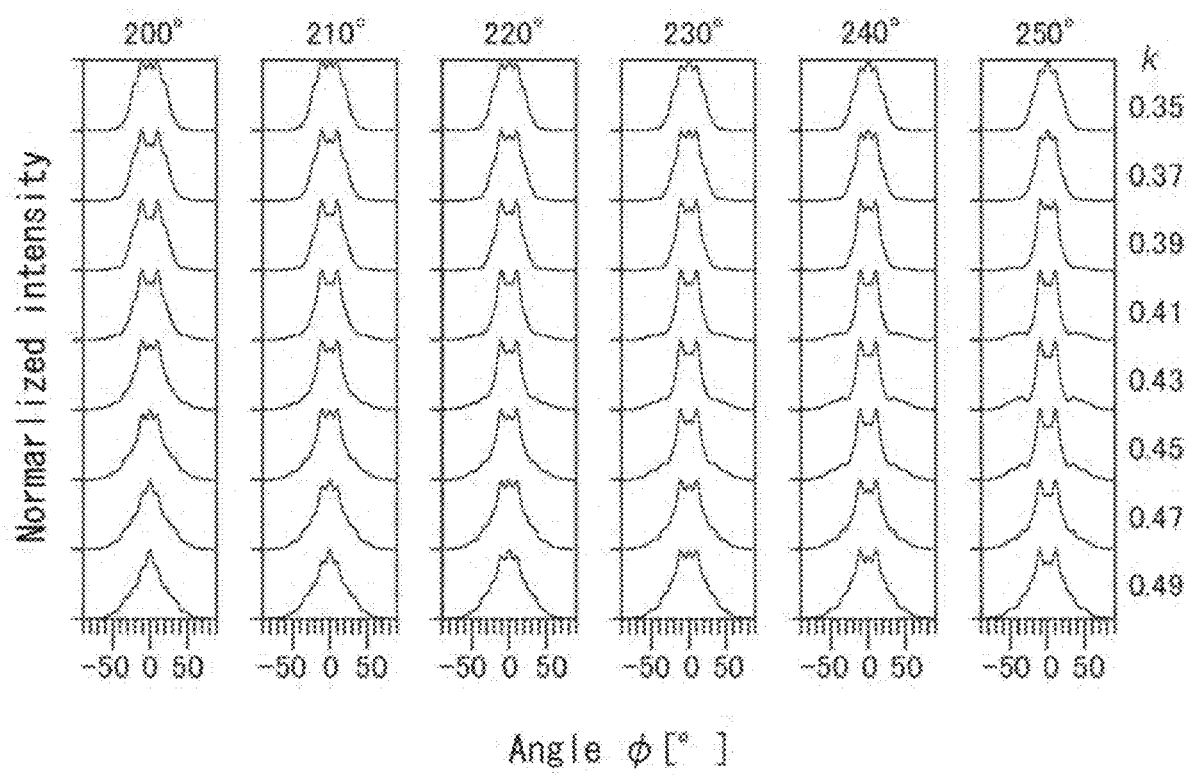
FIG. 26A is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of inverted the V-shape arrangement.
Figure 26B:
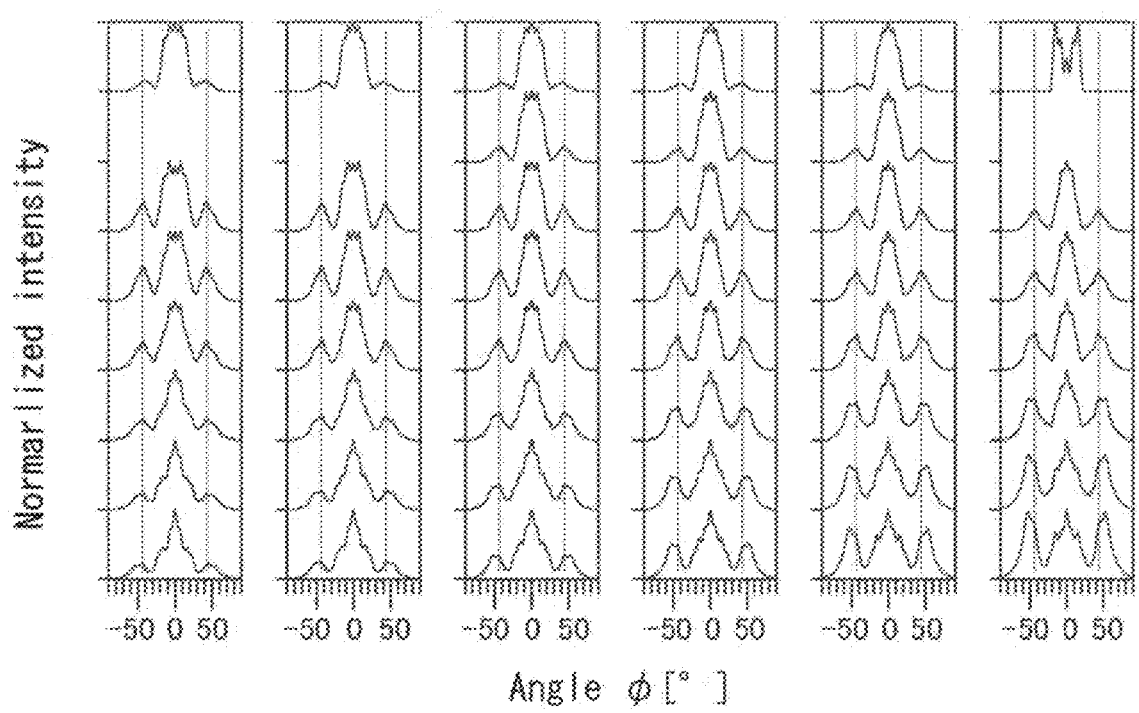
FIG. 26B is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of inverted the V-shape arrangement.

FIGS. 26A and 26B illustrate the emitted beam pattern analysis (FFP: Far Field Pattern). FIG. 26A indicates the FFP pattern of the aperture distribution in air in monitor-A in (d) of FIG. 5, FIG. 26B indicates the FFP pattern of the aperture distribution in the cladded material in monitor-B in (d) of FIG. 5.

In the multiple period adjustment, in addition to the dual-periodic adjustment, further, in the circular holes arranged in a transverse row, the aperture diameter of the even-number lattice rows in the propagation direction are dual-periodically enlarged and reduced to perform the period adjustment thereon.

In the dual-periodic adjustment of the lattice array illustrated in FIG. 25, the small-diameter circular holes and the large-diameter circular holes are arranged in an inverted-V-shape, the side walls of the small-diameter circular holes is provided as an inclined wall and thereby unidirectional radiation property is imparted to the radiated light beams. In this lattice array, with regard to the rows of the small-diameter and large-diameter circular holes aligned in the direction of one transverse rows that is orthogonal to the propagation direction, the aperture diameter of the even-number lattice rows in the propagation direction are dual-periodically enlarged and reduced to perform the third period adjustment thereon. By virtue of this, in addition to the dual-periodic adjustment, multiple period adjustment is performed in which the aperture diameter of the even-number lattice rows in the propagation direction is dual-periodically adjusted.

In the lattice array depicted in FIG. 25, amongst the series of rows of the small-diameter and large-diameter circular holes aligned transversely in one row, with regard to the circular holes with the hole diameter of the circular holes enlarged or reduced, the circumference of the circular holes is indicated by a thick line.

It should be noted that, in the lattice array, when the grating constant of the same-diameter circular holes is "a," then the grating constant of the even-number lattice rows in the propagation direction agrees with the original grating constant a of the photonic crystal.

According to the characteristics of the ratio of radiation of the section (d) of FIG. 25, in the same manner as in the case of the ratio of radiation where the side wall is provided as an inclined wall as depicted in the section (d) of FIG. 8, a substantially 2:1 ratio can be obtained when the angle of inclination θg falls within the range of 75° to 85°.

FIGS. 26A and 26B illustrate the radiated light beams observed when the small and large diameters prior to the adjustment are set to 205 nm and 215 nm, respectively, and the hole diameter 2rg of the large-diameter circular holes on which the diameter adjustment is performed is set to 200 nm to 250 nm.

FIGS. 26A and 26B indicate that, if the dual-periodic hole diameter adjustment of the even-number lattice rows is performed, the beam shape of the radiated light beams is made monomodal as compared with a case where the dual-periodic hole diameter adjustment is not performed on the holes pertaining to the even-number rows with the side wall being an inclined wall (the example depicted in FIG. 8).

Also, the radiation coefficient (scattering loss) of the section (c) of FIG. 25 and the ratio of radiation Pupper/Plower of the section (d) of FIG. 25 indicate that the ratio of upward and downward radiation can be adjusted while maintaining the radiation coefficient with respect to wavelength change.

7b: Mode of Δ2r Dual Periodic Modulation, Normal Transverse-Row Arrangement, and Dual Periodicity of the Aperture Diameter of Even-Number Lattice Rows FIGS. 27, 28A, and 28B illustrates an example where, in the Δ2r dual periodic modulation and the lattice array of normal transverse-row arrangement, the side walls of the small-diameter circular holes is provided as an inclined wall whose angle of inclination θg is 80° and, further, the aperture diameter of the even-number lattice rows in the propagation direction is dual-periodically adjusted multiple periodic modulation. Δ2r is 10 nm.

The section (a) of FIG. 27 indicates the normalized frequency a/k for wave number (2π/a), the section (b) of FIG. 27 indicates the group refractive index for wavelength (μm), the section (c) of FIG. 27 indicates the radiation coefficient (scattering loss) (dB/cm) for wavelength (μm), the section (d) of FIG. 27 indicates the ratio of radiation Pupper/Plower for wavelength (μm).

Figure 28A:
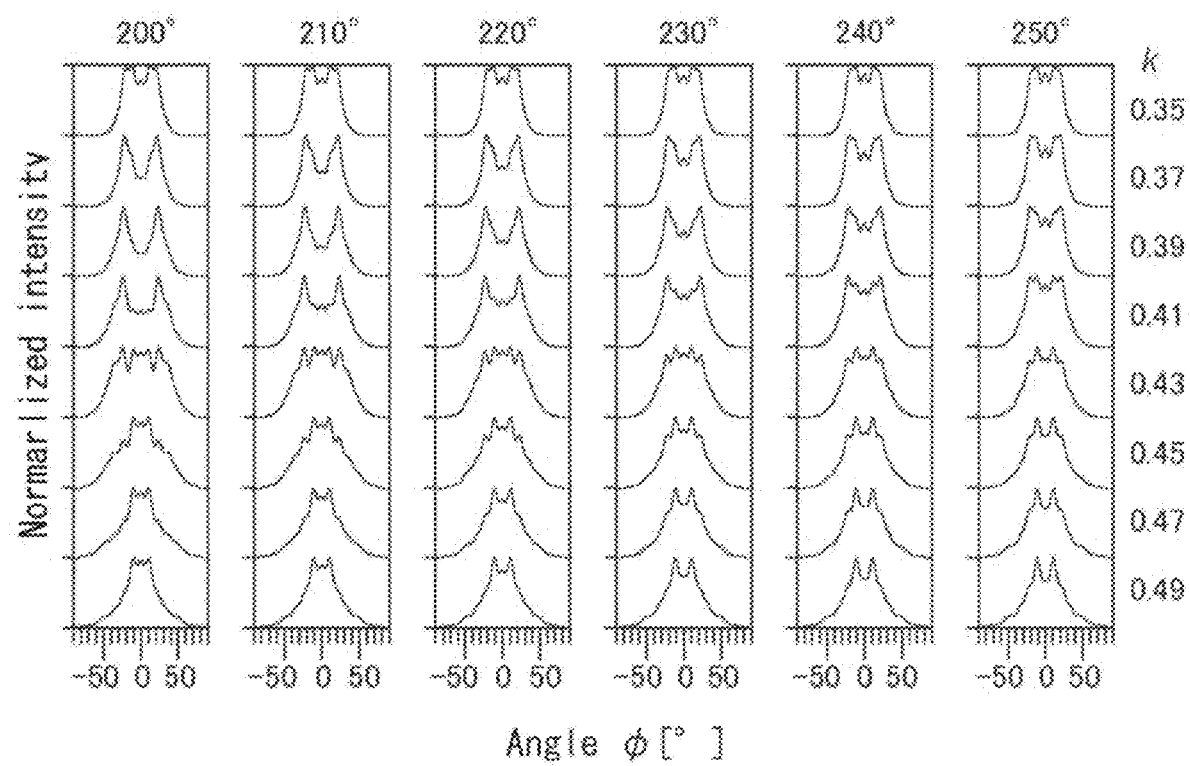
FIG. 28A is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of normal transverse-row arrangement.
Figure 28B:
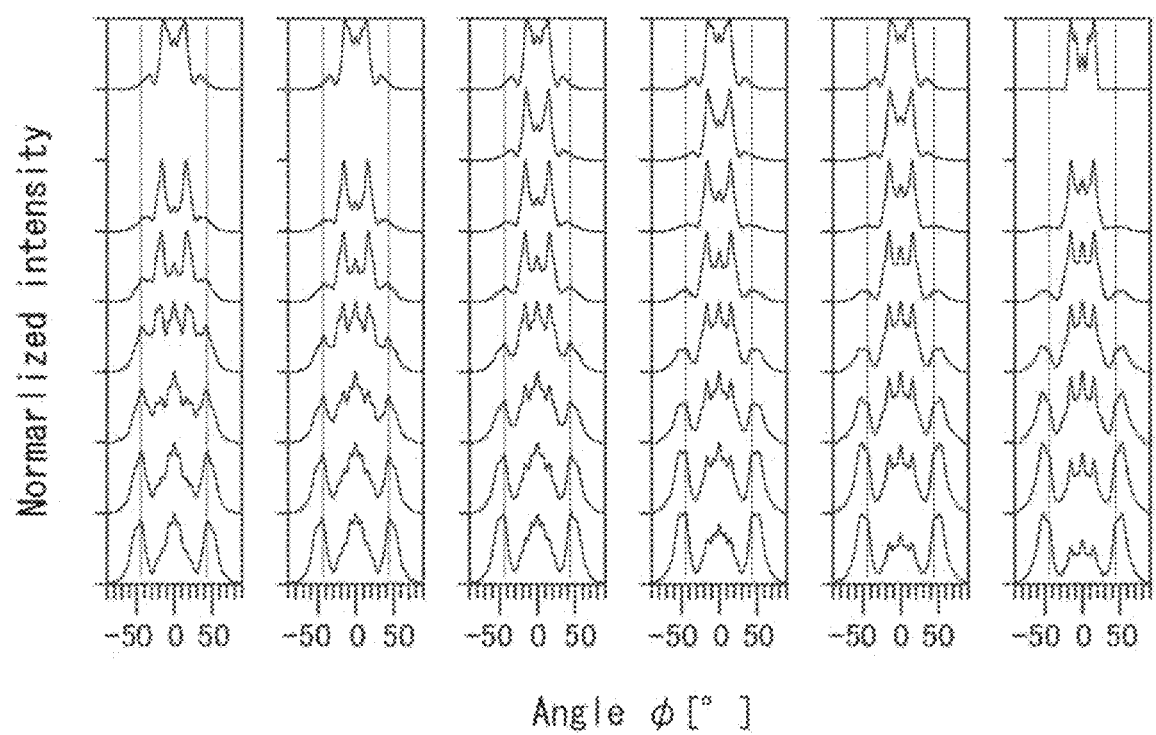
FIG. 28B is a diagram that illustrates an example of multiple periodic modulation where the side walls of the small-diameter circular holes are provided as inclined walls, the aperture diameter of the even-number lattice rows in the propagation direction is dual-periodically adjusted in the Δ2r dual periodic modulation and the lattice array of normal transverse-row arrangement.

FIGS. 28A and 28B illustrate the emitted beam pattern analysis (FFP: Far Field Pattern). FIG. 28A indicates the FFP pattern of the aperture distribution in air in monitor-A in FIG. 5(d), and FIG. 28B indicates the FFP pattern of the aperture distribution in the cladded material in monitor-B in FIG. 5(d).

In the multiple period adjustment, in addition to the dual-periodic adjustment, further, in the circular holes arranged in a transverse row, the aperture diameter of the even-number lattice rows in the propagation direction are dual-periodically enlarged and reduced to perform the period adjustment thereon.

In the dual-periodic adjustment of the lattice array illustrated in FIG. 27, the small-diameter circular holes and the large-diameter circular holes are arranged in normal transverse rows, and the side walls of the small-diameter circular holes is provided as an inclined wall to impart unidirectional radiation property to the radiated light beam. In this lattice array, with regard to the rows of the small-diameter and large-diameter circular holes aligned in the transverse direction orthogonal to the propagation direction, the aperture diameter of the even-number lattice rows in the propagation direction are dual-periodically enlarged and reduced to perform the third period adjustment thereon. By virtue of this, in addition to the dual-periodic adjustment, multiple period adjustment is performed in which the aperture diameter of the even-number lattice rows in the propagation direction is dual-periodically adjusted.

In the lattice array depicted in FIG. 27, amongst the series of rows of small-diameter and large-diameter circular holes aligned transversely in one row, with regard to the circular holes with the hole diameter of the circular holes enlarged or reduced, the circumference of the circular holes is indicated by a thick line.

It should be noted that, in the lattice array, when the grating constant of the same-diameter circular holes is "a," then the lattice period of the even-number lattice rows in the propagation direction agrees with the grating constant a.

The radiation coefficient (scattering loss) of the section (c) of FIG. 27 and the ratio of radiation Pupper/Plower of the section (d) of FIG. 27 indicate that the ratio of upward and downward radiation can be adjusted while maintaining the radiation coefficient with respect to wavelength change.

FIGS. 28A and 28B show the radiated light beams observed when the small and large diameters prior to the adjustment are 205 nm and 215 nm, respectively, and the hole diameter 2rg of the large-diameter circular holes on which the diameter adjustment is performed is set to 200 nm to 250 nm.

7c: Mode of Δa Dual Periodic Modulation, the First Row, and Dual-Periodic Mode of Aperture Diameter of and Even-Number Lattice Rows FIGS. 29, 30A, and 30B illustrates an example of multiple periodic modulation where, in the lattice array of normal transverse-row arrangement and Δa dual periodic modulation, only the first row is shifted, the side wall of the shifted circular holes is provided as an inclined wall whose angle of inclination θg is 80°, and further, the lattice period of the even-number lattice rows in the propagation direction is dual-periodically adjusted.

Figure 29:
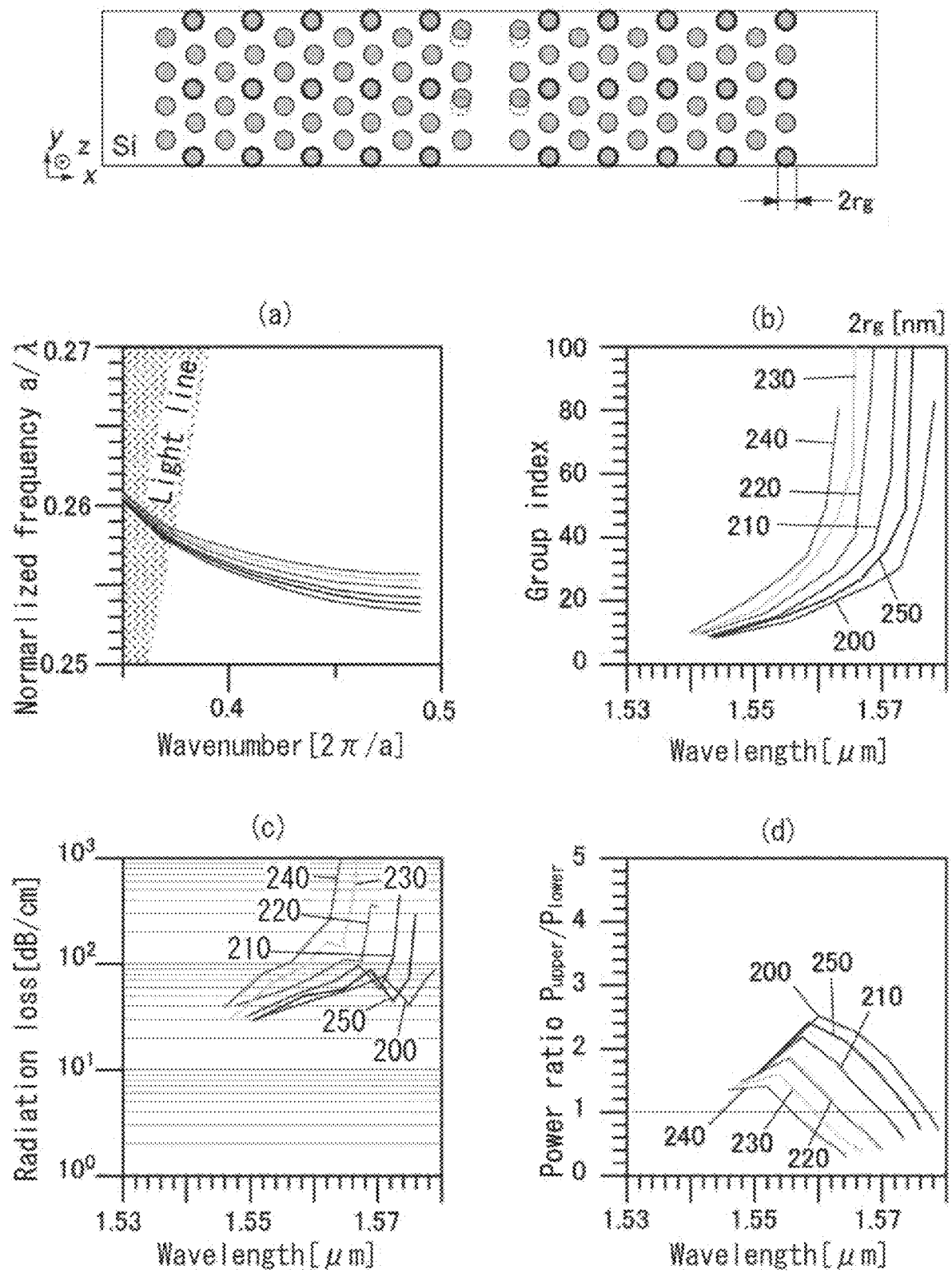
FIG. 29 is a diagram that illustrates an example of multiple periodic modulation where, in the lattice array of normal transverse-row arrangement and Δa dual periodic modulation, only the first row is shifted, the side walls of the circular holes are provided as an inclined wall, the aperture diameter of the even-number lattice rows in the propagation direction is dual-periodically adjusted.

In FIG. 29, the section (a) indicates the normalized frequency a/for wave number (2π/a), the section (b) of FIG. 29 indicates the group refractive index for wavelength (m), the section (c) of FIG. 29 indicates the radiation coefficient (scattering loss) (dB/cm) for wavelength (m), and the section (d) of FIG. 29 indicates the ratio of radiation Pupper/Plower for wavelength (μm).

Figure 30A:
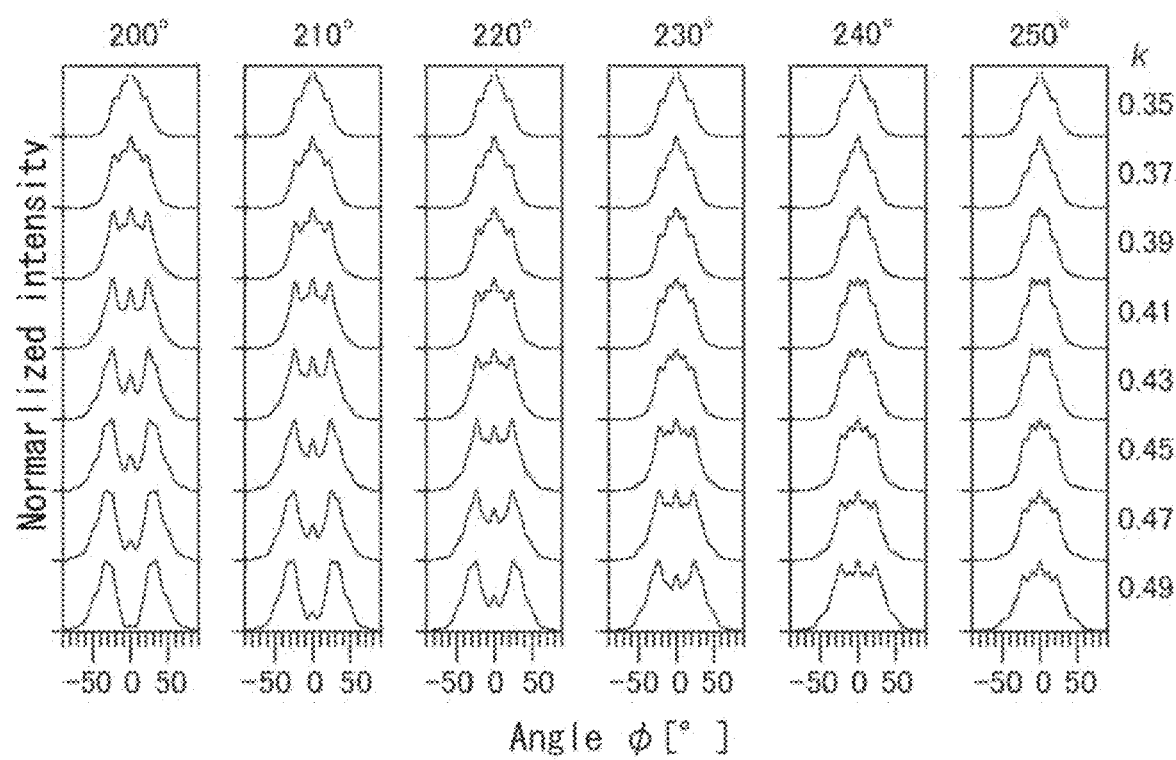
FIG. 30A is a diagram that illustrates an example of multiple periodic modulation where, in the lattice array of normal transverse-row arrangement and Δa dual periodic modulation, only the first row is shifted, the side walls of the circular holes are provided as an inclined wall, and the aperture diameter of the even-number lattice rows in the propagation direction is dual-periodically adjusted.
Figure 30B:
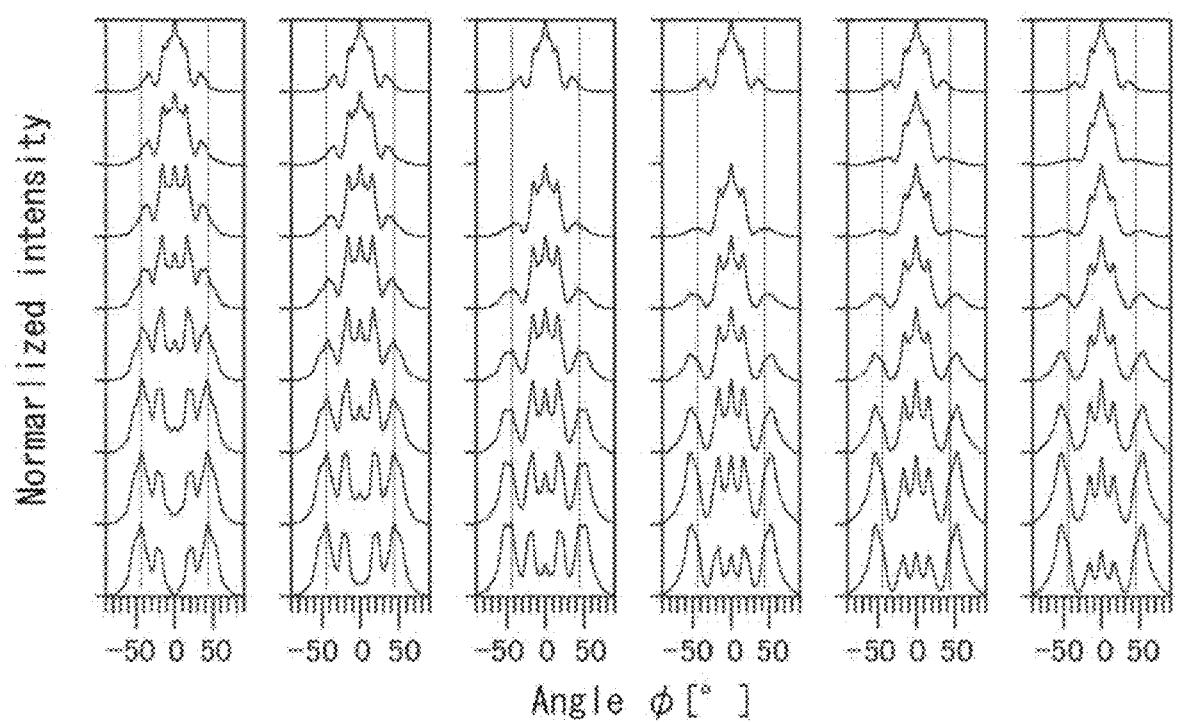
FIG. 30B is a diagram that illustrates an example of multiple periodic modulation where, in the lattice array of normal transverse-row arrangement and Δa dual periodic modulation, only the first row is shifted, the side walls of the circular holes are provided as an inclined wall, and the aperture diameter of the even-number lattice rows in the propagation direction is dual-periodically adjusted.

FIGS. 30A and 30B illustrate the emitted beam pattern analysis (FFP: Far Field Pattern). FIG. 30A indicates the FFP pattern of the aperture distribution in air in monitor-A in (d) of FIG. 5, and FIG. 30B indicates the FFP pattern of the aperture distribution in the cladded material in monitor-B in (d) of FIG. 5.

In the multiple period adjustment, in addition to the dual-periodic adjustment that shifts the linear arrangement of the circular holes from the waveguide to the first row by the amount of Δa, further, in the circular holes arranged in a transverse row, the aperture diameter of the even-number lattice rows in the propagation direction are dual-periodically enlarged and reduced to perform the period adjustment thereon.

In the dual-periodic adjustment of the lattice array illustrated in FIG. 29, the small-diameter circular holes and the large-diameter circular holes are arranged and arranged in normal transverse rows, and the side walls of the small-diameter circular holes is provided as an inclined wall to impart unidirectional radiation property to the radiated light beam. In this lattice array, with regard to the rows of the small-diameter and large-diameter circular holes aligned in the transverse direction orthogonal to the propagation direction, the aperture diameter of the even-number lattice rows in the propagation direction are dual-periodically enlarged and reduced to perform the third period adjustment thereon. By virtue of this, in addition to the dual-periodic adjustment, multiple period adjustment is performed in which the aperture diameter of the even-number lattice rows in the propagation direction is dual-periodically adjusted.

In the lattice array depicted in FIG. 29, amongst the series of rows of small-diameter and large-diameter circular holes aligned transversely in one row, with regard to the circular holes with the hole diameter of the circular holes enlarged or reduced, the circumference of the circular holes is indicated by a thick line.

It should be noted that, in the lattice array, when the grating constant of the same-diameter circular holes is "a," then the lattice period of the even-number lattice rows in the propagation direction agrees with the grating constant a.

The radiation coefficient (scattering loss) of the section (c) of FIG. 29 and the ratio of radiation Pupper/Plower of the section (d) of FIG. 29 indicate that the ratio of upward and downward radiation can be adjusted while maintaining the radiation coefficient with respect to wavelength change.

FIGS. 30A and 30B illustrate radiated light beams observed when the small and large diameters prior to the adjustment are 205 nm and 215 nm, respectively, and the hole diameter 2rg of the large-diameter circular holes on which the diameter adjustment is performed is set to 200 nm to 250 nm.

Figure 31:
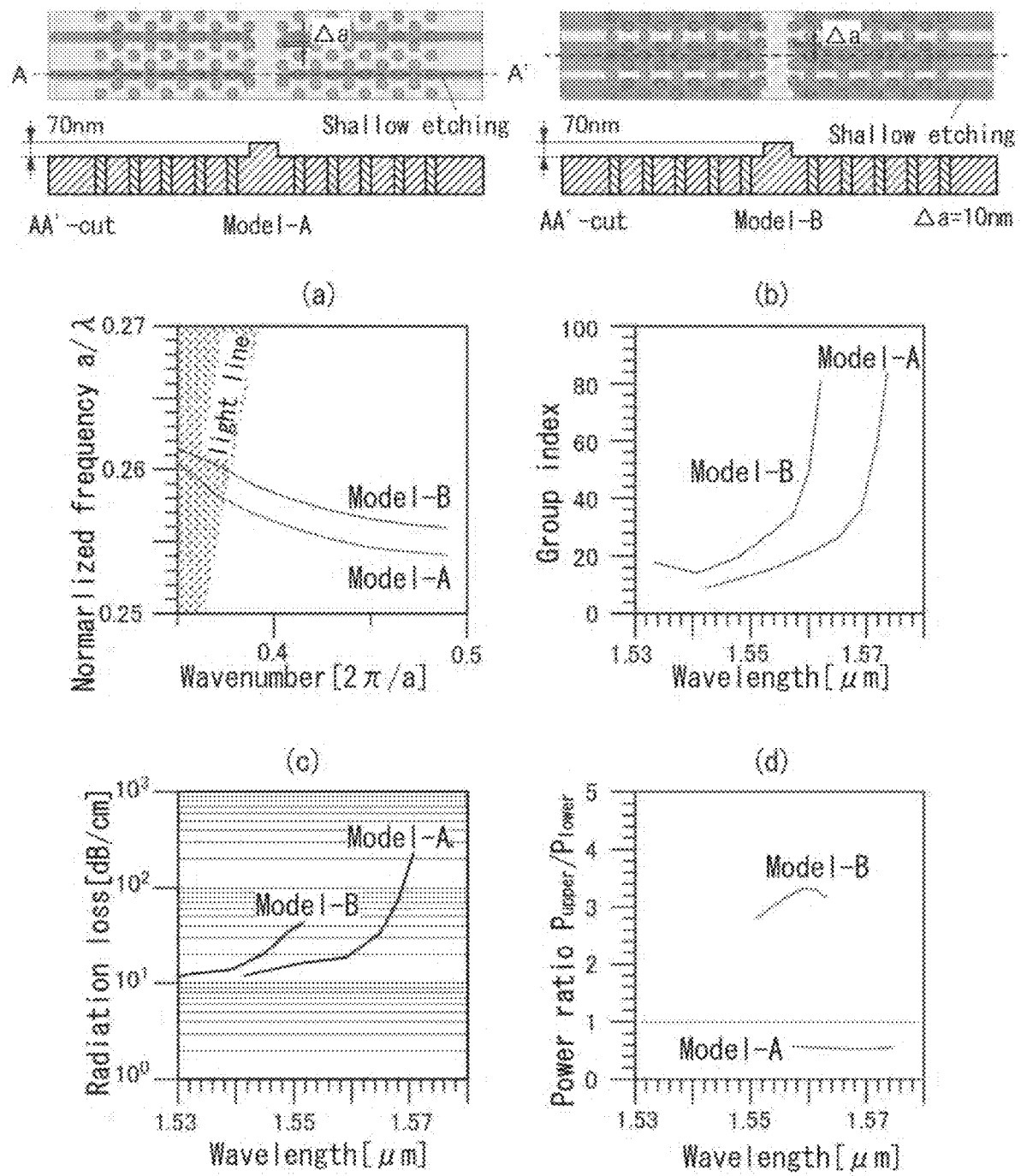
FIG. 31 is a diagram that illustrates an example of multiple periodic modulation where, in the lattice array of normal transverse-row arrangement and Δa dual periodic modulation, only the first row is shifted, the aperture diameter of the even-number lattice rows in the propagation direction is period-adjusted by a shallowly patterned diffraction grating that extends through the dual-periodic circular holes.
Figure 32A:
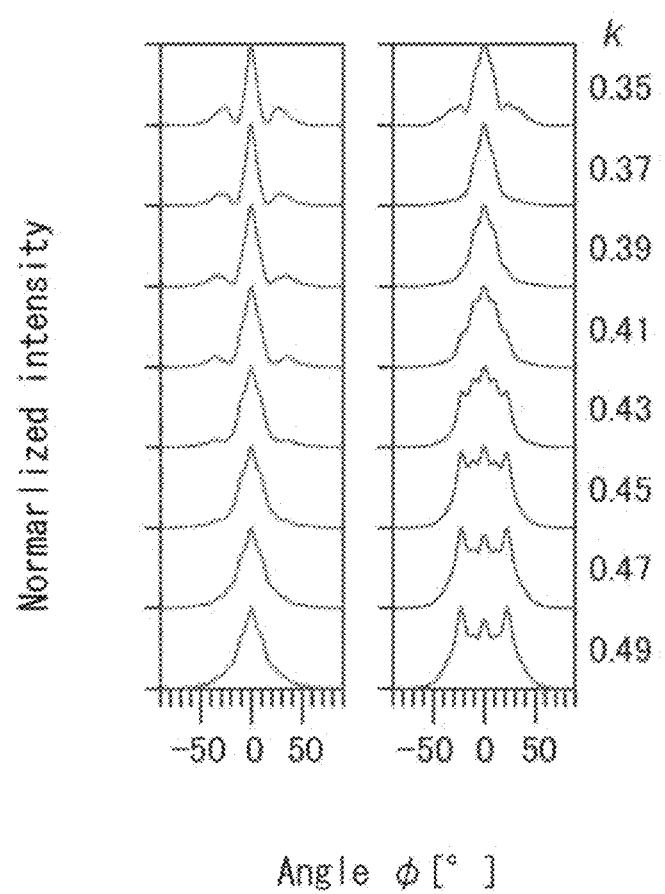
FIG. 32A is a diagram that illustrates an example of multiple periodic modulation where, in the lattice array of normal transverse-row arrangement and Δa dual periodic modulation, only the first row is shifted, period adjustment is performed by a shallowly patterned diffraction grating that extends through the dual-periodic circular holes residing on the even-number lattice rows in propagation direction.
Figure 32B:
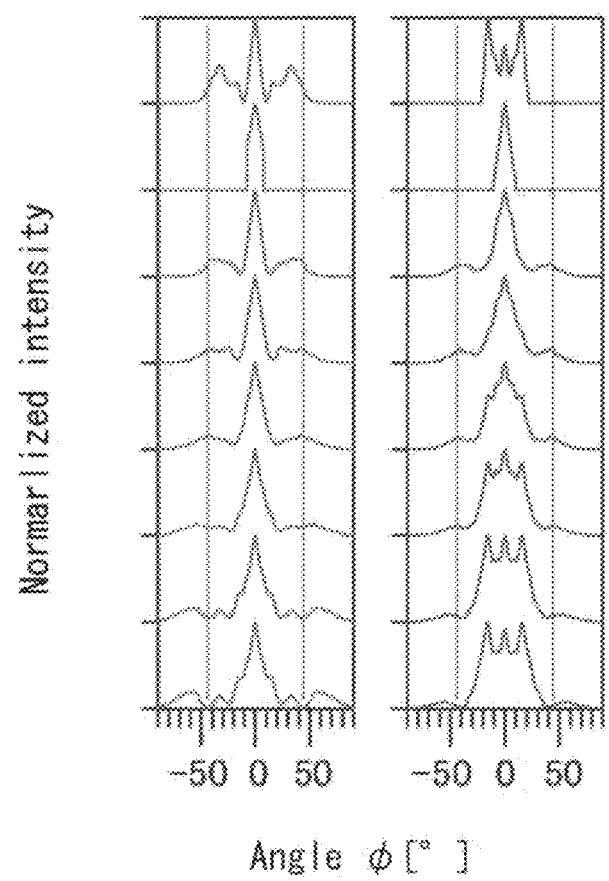
FIG. 32B is a diagram that illustrates an example of multiple periodic modulation where, in the lattice array of normal transverse-row arrangement and Δa dual periodic modulation, only the first row is shifted, and period adjustment is performed by the shallowly patterned diffraction grating that extends through the dual-periodic circular holes residing on the even-number lattice rows in propagation direction.

7d: Δa Dual Periodic Modulation, the First Row, and Dual-Periodic Diffraction Grating (Shallowly Patterned Diffraction Grating) Penetrating the Circular Holes of Even-Number Rows FIGS. 31, 32A, and 32B illustrate an example where, in the lattice array of normal transverse-row arrangement and Δa dual periodic modulation, multiple periodic modulation is performed by shifting only the first row by the amount of Δa and thereby perform dual-periodic adjustment and further performing the period adjustment by a shallowly patterned diffraction grating penetrating the dual-periodic circular holes of the even-number lattice rows in the propagation direction.

With regard to the shallowly patterned diffraction grating, the diffraction grating is configured by shallowly cutting the upper surface of the high refractive-index member and the low refractive index parts constituting the lattice array by performing etching thereon. FIG. 31 illustrates two models, i.e., Model-A and Model-B of the shallowly patterned diffraction grating. With regard to the Model-A, the width of one row in the propagation direction of the diffraction grating corresponds to the transverse one row of the circular holes, and the rows of the diffraction grating are arranged at dual-periodic intervals. Also, with regard to Model-B, the width of one row in the propagation direction of the diffraction grating corresponds to two transverse rows of the circular holes, and the rows of the diffraction grating are arranged at dual-periodic intervals. Model-A and Model-B have such a relationship with each other that the cutting patterns are inverted.

In Model-A and Model-B, the dark shaded areas indicate the shallowly patterned portions. The depth of cutting is, for example, 70 nm. Also, here, the shift Δa of the Δa dual-periodic adjustment is 10 nm.

In the multiple period adjustment of the lattice array illustrated in FIG. 31, in addition to the dual-periodic adjustment in which the linear arrangement of the circular holes from the waveguide to the first row are shifted by the amount of Δa, further, period adjustment is performed by shallowly patterned diffraction grating penetrating the dual-periodic circular holes of the even-number lattice rows extending in the propagation direction. By virtue of this, in addition to the dual-periodic adjustment, multiple period adjustment by the diffraction grating penetrating the dual-periodic circular holes of the extending-along even-number lattice rows is performed.

In FIG. 31, the section (a) indicates the normalized frequency a/for wave number ($2\pi/a$), the section (b) of FIG. 31 indicates the group refractive index for wavelength (m), the section (c) of FIG. 31 indicates the radiation coefficient (scattering loss) (dB/cm) for wavelength ($\mu$m), and the section (d) of FIG. 31 indicates the ratio of radiation Pupper/Plower for wavelength ($\mu$m).

FIGS. 32A and 32B illustrate the emitted beam pattern analysis (FFP: Far Field Pattern). FIG. 32A indicates the FFP pattern of the aperture distribution in air in monitor-A in the section (d) of FIG. 5, FIG. 32B indicates the FFP pattern of the aperture distribution in the cladded material in monitor-B in the section (d) of FIG. 5. In FIGS. 32A and 32B, the left portion indicates the aperture distribution in air and the right portion indicates the aperture distribution in the cladded material.

The radiation coefficient (scattering loss) of the section (c) of FIG. 31 and the ratio of radiation Pupper/Plower of the section (d) of FIG. 31 indicate that the ratio of upward and downward radiation can be adjusted while maintaining the radiation coefficient with respect to wavelength change.

According to the ratio of radiation of the section (d) of FIG. 31, it will be appreciated that the ratio of radiation is inverted between Model-A and Model-B as a result of the inverted cutting pattern, and that back reflection is performed in Model-B. Also, according to the emitted beam patterns of FIGS. 32A and 32B, it will be appreciated that favorable monomodal beams can be obtained in the back reflection of Model-B as well.

(8. Shallowly Patterned Diffraction Grating)

An example of shallowly patterned diffraction grating will be described using FIGS. 33A to 35.

Figure 33A:
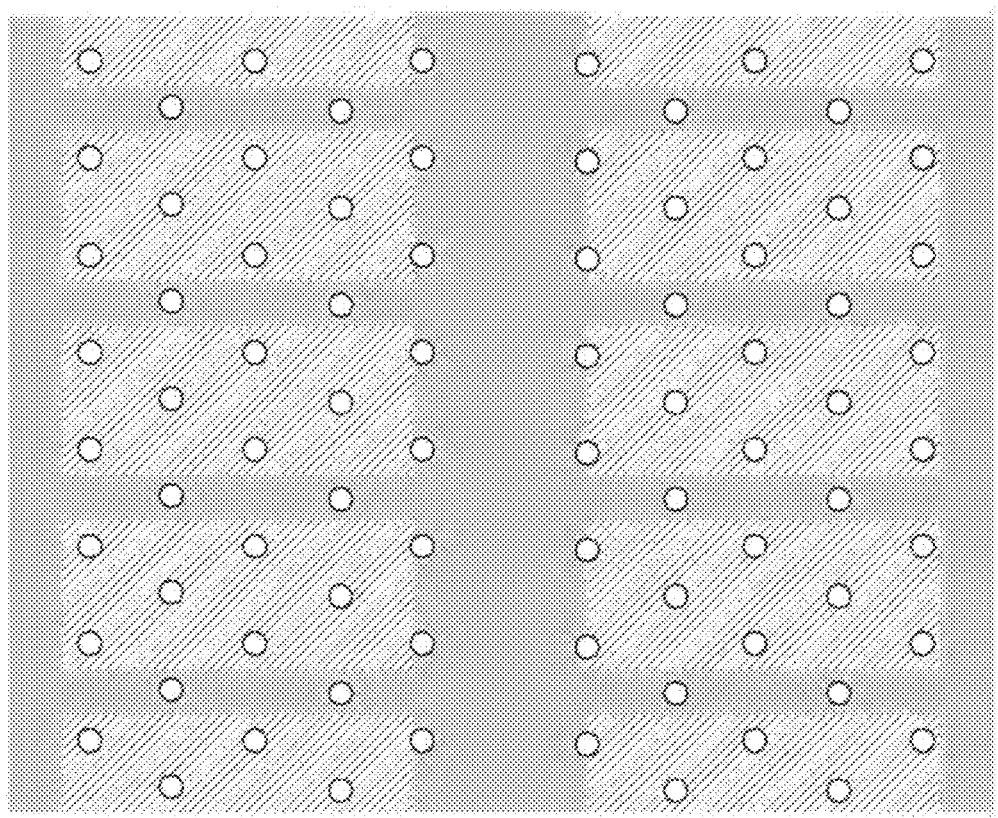
FIG. 33A is a diagram for explanation of the shallowly patterned diffraction grating.
Figure 33B:
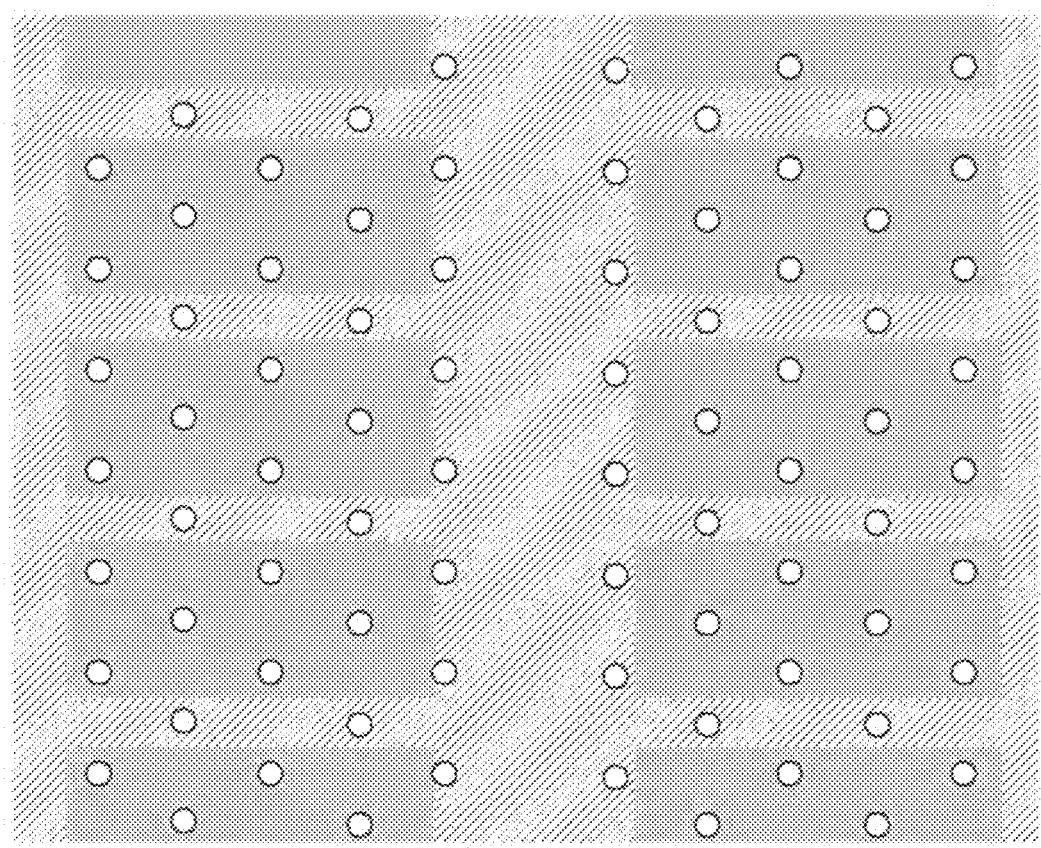
FIG. 33B is a diagram for explanation of the shallowly patterned diffraction grating.
Figure 34:
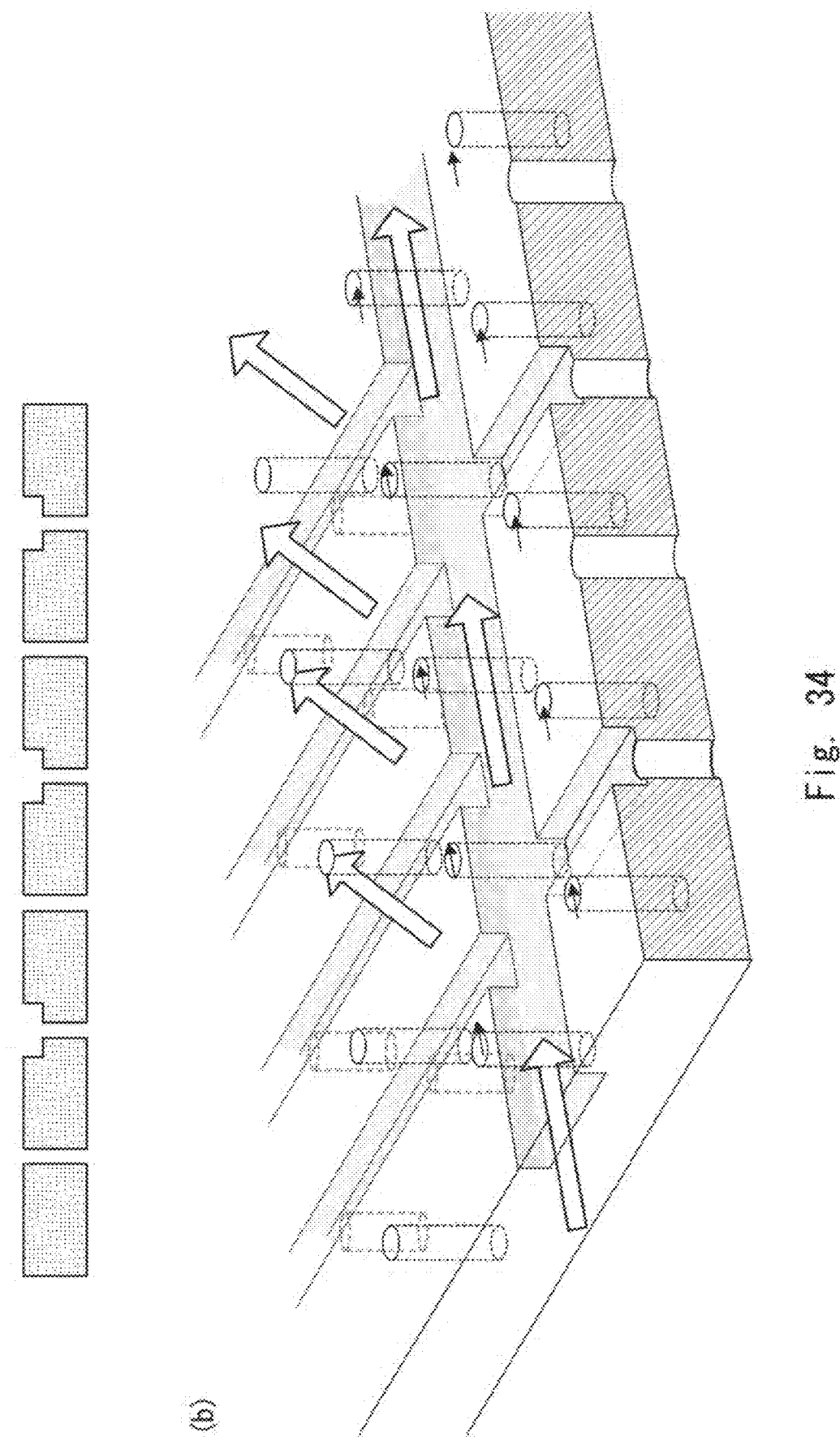
FIG. 34 is a diagram that illustrates a shallowly patterned diffraction grating that is shallowly patterned in a transverse direction orthogonal to the propagation direction.

FIGS. 33A and 33B illustrate shallowly patterned diffraction grating, and the surface indicated by the shaded portion is shallowly cut to form the shallowly patterned portion. In FIGS. 33A and 33B, the shallowly patterned portion is indicated by a filled pattern shape and the portion that is not shallowly patterned is indicated by a hatched pattern shape. FIGS. 33A and 33B illustrate states where the shallowly patterned portion is inverted with respect to each other. FIG. 34 is a perspective view of the shallowly patterned diffraction grating of FIG. 33A.

Figure 35:
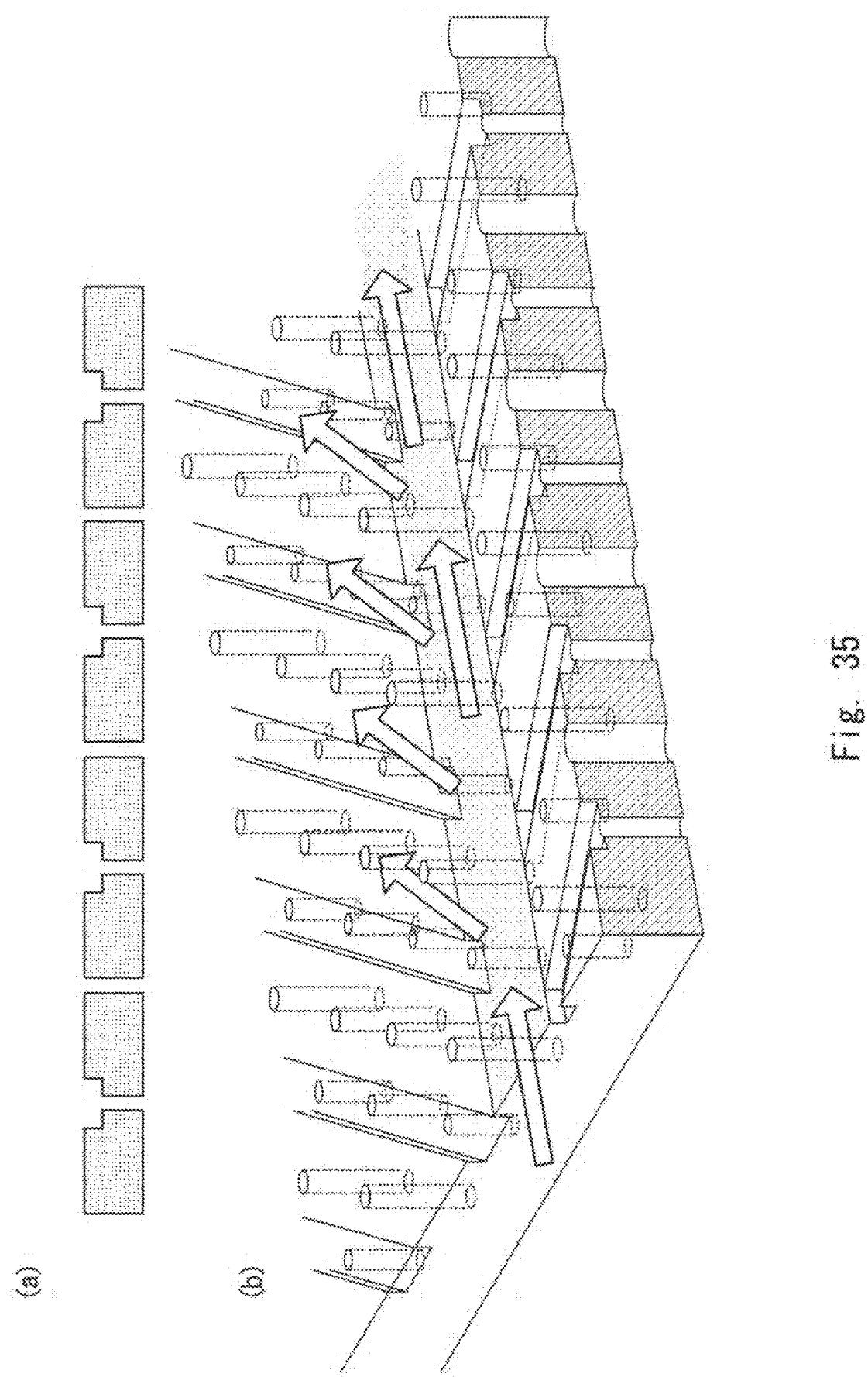
FIG. 35 is a diagram that illustrates a shallowly patterned diffraction grating that is shallowly patterned in an oblique direction that is oblique with respect to the propagation direction.
Figure 36A:
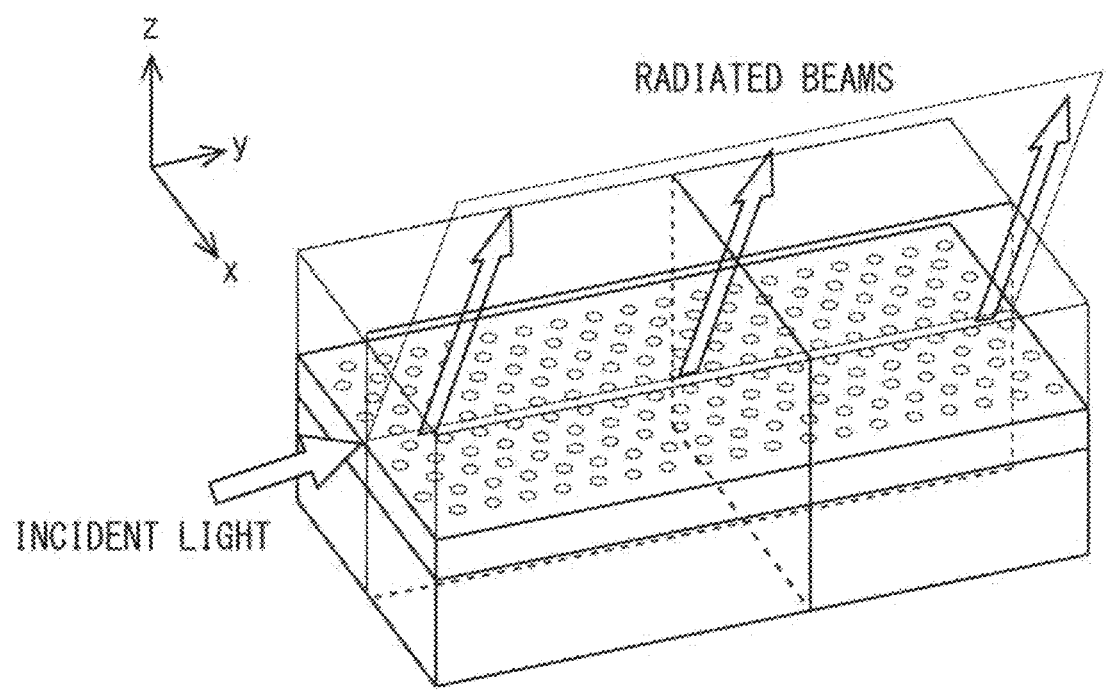
FIG. 36A is a diagram for explanation of an overview of the device structure with a diffraction mechanism introduced in the photonic crystal waveguide and the radiated light beam.
Figure 36B:
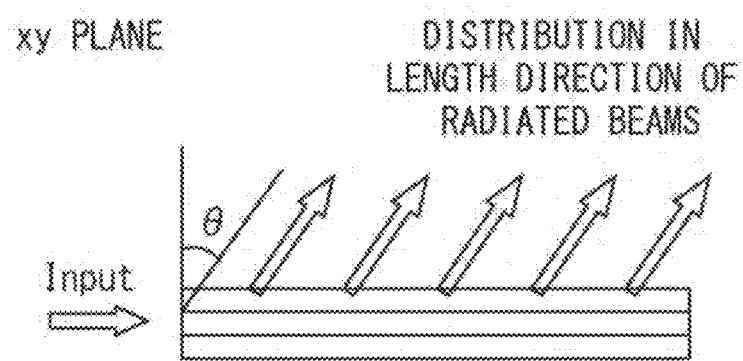
FIG. 36B is a diagram for explanation of an overview of the device structure with a diffraction mechanism introduced in the photonic crystal waveguide and the radiated light beam.
Figure 36C:
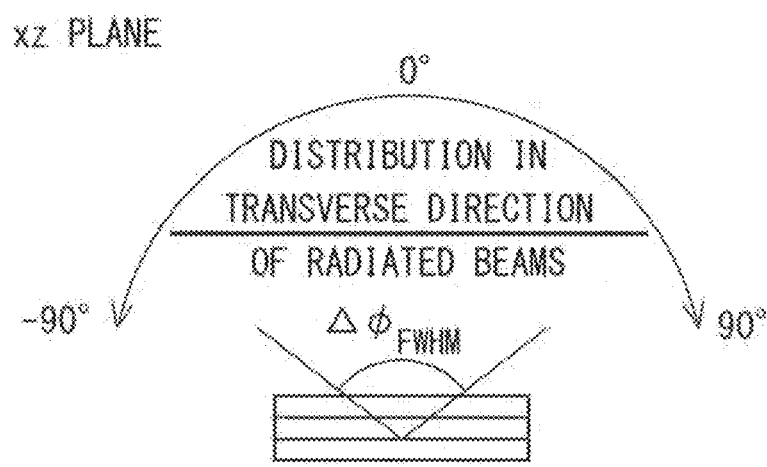
FIG. 36C is a diagram for explanation of an overview of the device structure with a diffraction mechanism introduced in the photonic crystal waveguide and the radiated light beam.
Figure 37A:
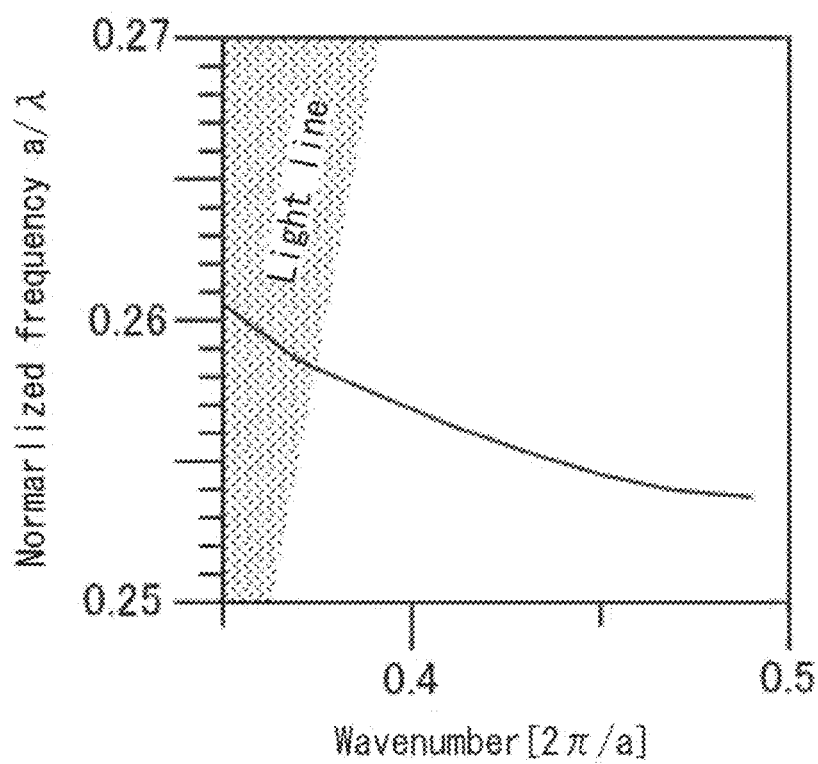
FIG. 37A is a diagram that illustrates an example of the dual periodic structure of the V-shape arrangement of a conventional photonic crystal waveguide whose cross-sectional shape is symmetrical with respect to the thickness direction of the waveguide.
Figure 37B:
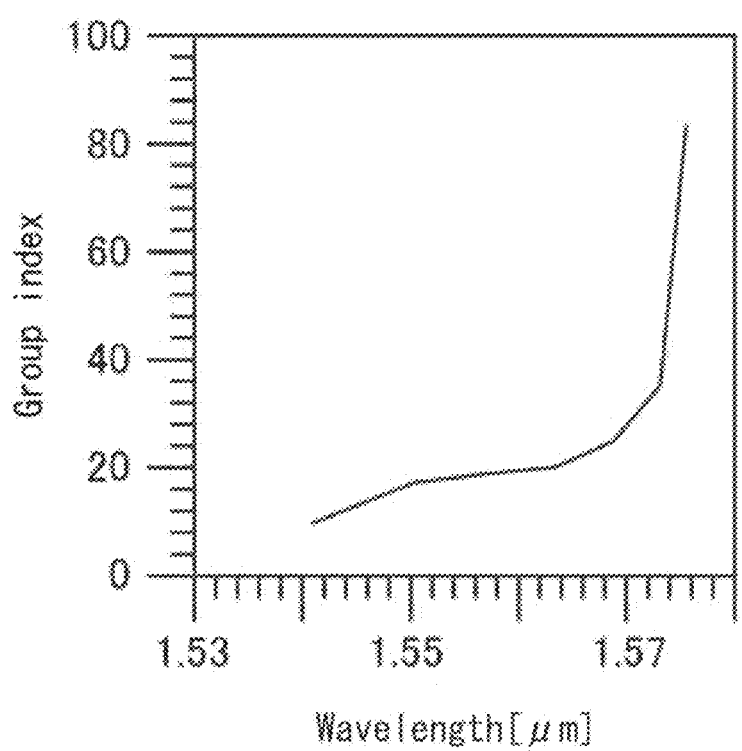
FIG. 37B is a diagram that illustrates an example of the dual periodic structure of the V-shape arrangement of a conventional photonic crystal waveguide whose cross-sectional shape is symmetrical with respect to the thickness direction of the waveguide.
Figure 37C:
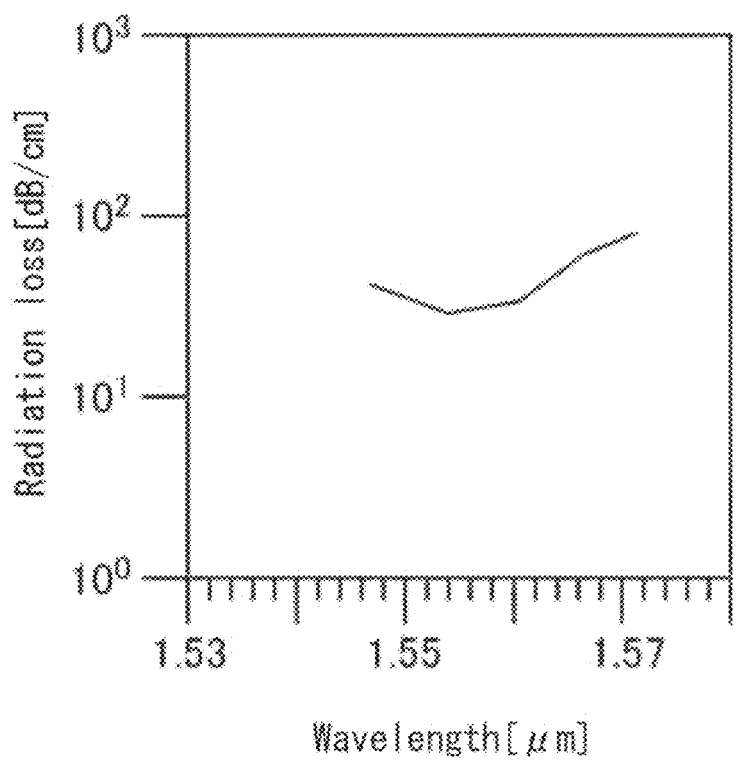
FIG. 37C is a diagram that illustrates an example of the dual periodic structure of the V-shape arrangement of a conventional photonic crystal waveguide whose cross-sectional shape is symmetrical with respect to the thickness direction of the waveguide.
Figure 37D:
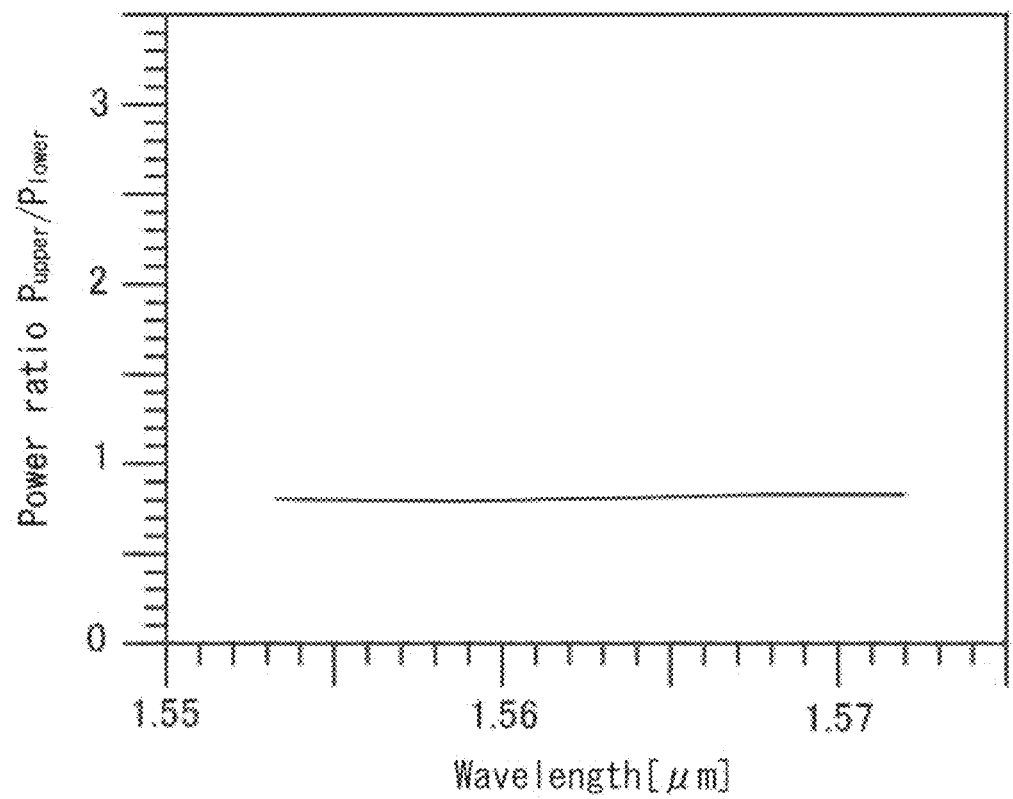
FIG. 37D is a diagram that illustrates an example of the dual periodic structure of the V-shape arrangement of a conventional photonic crystal waveguide whose cross-sectional shape is symmetrical with respect to the thickness direction of the waveguide.
Figure 37E:
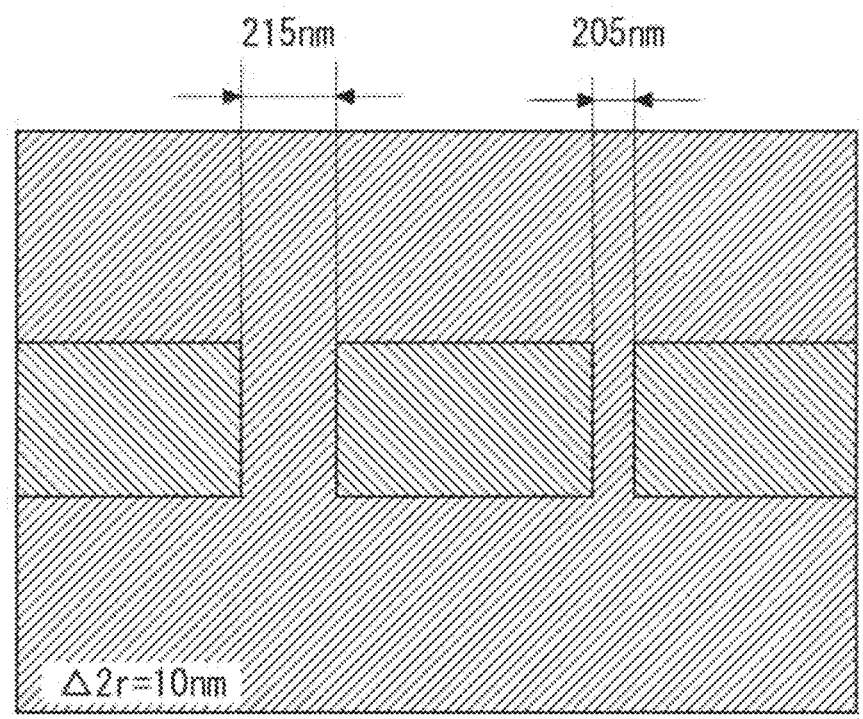
FIG. 37E is a diagram that illustrates an example of the dual periodic structure of the V-shape arrangement of a conventional photonic crystal waveguide whose cross-sectional shape is symmetrical with respect to the thickness direction of the waveguide.
Figure 38A:
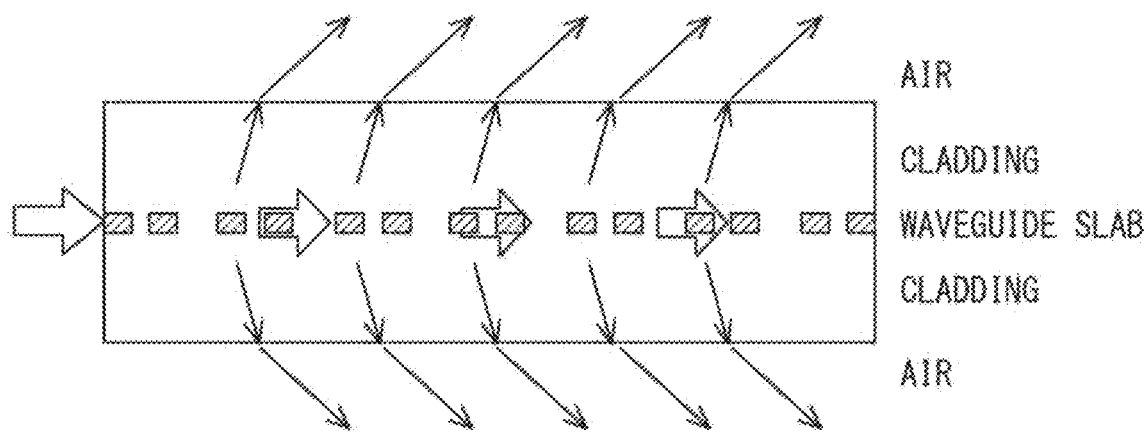
FIG. 38A is a diagram for explanation of light radiation of photonic crystal waveguide having an up-and-down symmetrical structure.
Figure 38B:
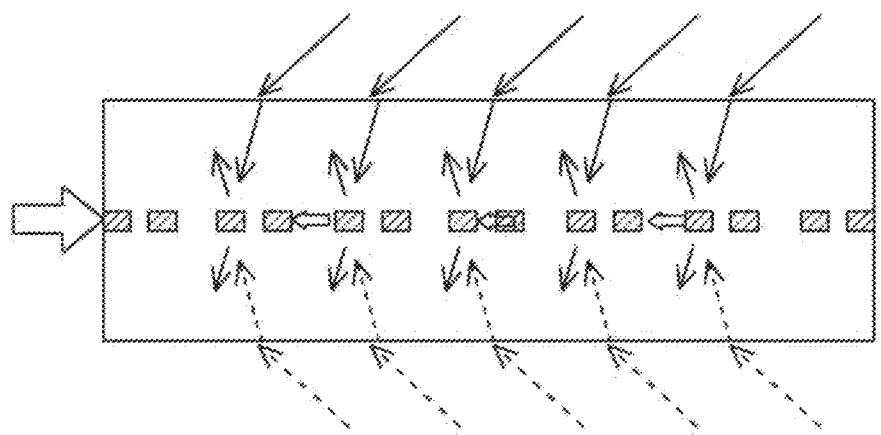
FIG. 38B is a diagram for explanation of light radiation of photonic crystal waveguide having the up-and-down symmetrical structure.
Figure 38C:
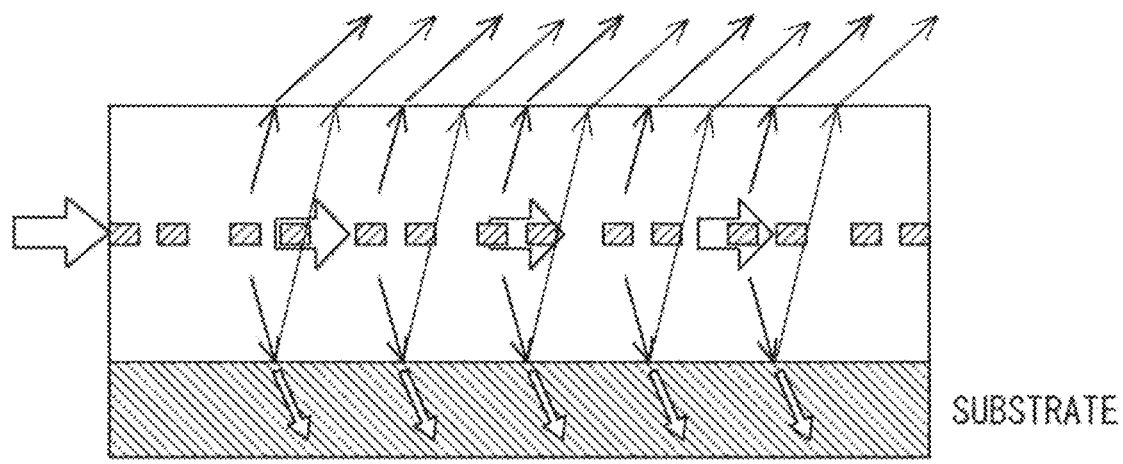
FIG. 38C is a diagram for explanation of light radiation of photonic crystal waveguide having the up-and-down symmetrical structure.

FIG. 34 illustrates shallowly patterned diffraction grating shallowly patterned in a transverse direction orthogonal to the propagation direction, and FIG. 35 illustrates shallowly patterned diffraction grating shallowly patterned in the oblique direction that is oblique with respect to the propagation direction.

It should be noted that, the present invention is not limited to the above-described embodiments. Various modifications may be made based on the purport of the present invention and such modified embodiments are not excluded from the scope of the present invention.

INDUSTRIAL APPLICABILITY

In the above-described examples, Si is envisaged as the high refractive-index member constituting the photonic crystal waveguide of the light deflection device and accordingly light in the near-infrared wavelength range is used, but the technique can be implemented using visible light materials as the high refractive-index member constituting the light deflection device. Also, the light deflection device of the present invention can be installed in automobiles, drones, robots, etc., and can be installed in PCs and smartphones to be implemented on 3D scanners that can readily capture images of the surrounding environment, monitoring systems, optical switching and spatial matrix optical switches for data centers, etc.

This application claims priority based on Japanese Patent Application No. 2017-160825 filed on Aug. 24, 2017, disclosure of which is incorporated herein in its entirety.

REFERENCE SIGNS LIST a grating constant
k wave number
$\Delta a$ shift
$\Delta 2r$ diameter difference
$\theta g$ angle of inclination
1 light deflection device
2 photonic crystal waveguide
$2r1$ diameter
$2r2$ diameter
$2rg$ hole diameter
3 lattice array
10 high refractive-index member
11 low refractive index parts
12 waveguide core
13 clad
14 BOX
15 substrate
20 circular holes
21 small-diameter circular holes
22 large-diameter circular holes

The invention claimed is:

1. A light deflection device comprising a photonic crystal waveguide having a lattice array with low refractive index parts periodically arranged in a surface of a high refractive-index member, the lattice array constituting the waveguide, wherein
the lattice array includes a dual-periodic structure including a first periodic array and a second periodic array different from each other in periodic arrangement of the low refractive index parts, and
the low refractive index parts have an asymmetrical cross-sectional shape with reference to a thickness direction in at least either of the first and second periodic arrays of the dual-periodic structure, and thereby increasing intensity of radiation of light in one direction of a thickness directions, the light propagating through waveguide core formed in the lattice array.

2. The light deflection device according to claim 1, wherein side walls of the low refractive index parts having the asymmetrical cross-sectional shape each have a wall shape of either an inclined wall or a stepped wall in a thickness direction, the stepped wall being defined by at least two walls selected from the group consisting of an inclined wall, a perpendicular wall, and a horizontal wall.

3. The light deflection device according to claim 1, wherein the dual-periodic structure is configured such that:
circular holes having different diameters are arranged in the low refractive index parts of the first periodic array and the second periodic array;
the circular holes are arranged at predetermined intervals in a propagation direction of the waveguide comprising the periodic arrays;
the circular holes of the first periodic array and the circular holes of the second periodic array are alternately arranged in rows extending in the propagation direction of the waveguide; and
out of large-diameter and small-diameter circular holes differing from each other in diameter, the small-diameter circular holes have an asymmetrical cross-sectional shape.

4. The light deflection device according to claim 1, wherein the dual-periodic structure is configured such that:
circular holes having different diameters are arranged in the low refractive index parts of the first periodic array and the second periodic array;
the circular holes are arranged at predetermined intervals in a propagation direction of the waveguide comprising the periodic arrays;
the circular holes of the first periodic array and the circular holes of the second periodic array are alternately arranged in rows extending in the propagation direction of the waveguide; and
out of large-diameter and small-diameter circular holes differing from each other in diameter, the large-diameter circular holes have an asymmetrical cross-sectional shape.

5. The light deflection device according to claim 1, wherein the dual-periodic structure is configured such that:
the circular holes having the different diameters are arranged in the low refractive index parts of the first periodic array and the second periodic array;
the circular holes are arranged at predetermined intervals in a propagation direction of the waveguide comprising the periodic arrays;
the circular holes of the first periodic array and the circular holes of the second periodic array are alternately arranged in rows extending in the propagation direction of the waveguide; and
large-diameter and small-diameter circular holes differing from each other in diameter have an asymmetrical cross-sectional shape.

6. The light deflection device according to claim 1, wherein the dual-periodic structure is configured such that:
the circular holes having different diameters are arranged in the low refractive index parts of the first periodic array and the second periodic array, the circular holes being arranged at predetermined intervals in the propagation direction of a waveguide of the periodic arrays;
the circular holes of the first periodic array and the circular holes of the second periodic array are alternately arranged in the same row extending in the propagation direction of the waveguide; and circular holes of either periodic array of the first periodic array and the second periodic array have an asymmetrical cross-sectional shape.

7. The light deflection device according to claim 3, wherein the periodic array of the circular holes having the asymmetrical cross-sectional shape is a second-row periodic array from a line defect devoid of the circular holes among the rows in the propagation direction of the waveguide.

8. The light deflection device according to claim 3, wherein, among the circular holes provided in the lattice array, dual-periodic circular holes of even-number lattice rows in the propagation direction of the waveguide have a diameter enlarged or reduced as compared with the circular holes in other locations.

9. The light deflection device according to claim 2, wherein the perpendicular wall surface is a side wall of a groove formed by removing part of the surfaces of a plurality of the low refractive index parts having an asymmetrical cross-sectional shape and the high refractive-index member.

\* \* \* \* \*